United States Patent
Marutani et al.

(10) Patent No.: US 10,951,863 B2
(45) Date of Patent: Mar. 16, 2021

(54) REFRIGERATOR, CAMERA DEVICE, REFRIGERATOR DOOR POCKET, AND HOME APPLIANCE NETWORK SYSTEM

(71) Applicant: Toshiba Lifestyle Products & Services Corporation, Tokyo (JP)

(72) Inventors: Yuuki Marutani, Tokyo (JP); Kazuhiro Furuta, Tokyo (JP); Hirokazu Izawa, Tokyo (JP); Kota Watanabe, Tokyo (JP); Ryo Kawada, Tokyo (JP)

(73) Assignee: TOSHIBA LIFESTYLE PRODUCTS & SERVICES CORPORATION, Tokyo (JP)

( * ) Notice: Subject to any disclaimer, the term of this patent is extended or adjusted under 35 U.S.C. 154(b) by 68 days.

(21) Appl. No.: 14/776,733

(22) PCT Filed: Mar. 11, 2014

(86) PCT No.: PCT/JP2014/056327
§ 371 (c)(1),
(2) Date: Sep. 14, 2015

(87) PCT Pub. No.: WO2014/142120
PCT Pub. Date: Sep. 18, 2014

(65) Prior Publication Data
US 2016/0057394 A1    Feb. 25, 2016

(30) Foreign Application Priority Data

Mar. 12, 2013  (JP) .............................. JP2013-049073
Jul. 16, 2013  (JP) .............................. JP2013-147562
(Continued)

(51) Int. Cl.
  *H04N 7/18*    (2006.01)
  *H04N 1/00*    (2006.01)
(Continued)

(52) U.S. Cl.
  CPC ............. *H04N 7/183* (2013.01); *F25D 23/04* (2013.01); *F25D 23/12* (2013.01); *H04N 1/00095* (2013.01); *F25D 2500/06* (2013.01)

(58) Field of Classification Search
  CPC ...... F25D 23/04; F25D 23/12; F25D 2500/06; H04N 1/00095; H04N 7/183
(Continued)

(56) References Cited

U.S. PATENT DOCUMENTS 3,982,801 A    9/1976    Heidorn et al.
5,913,584 A    6/1999    Swindell et al.
(Continued)

FOREIGN PATENT DOCUMENTS

CN    1209153    2/1999
CN    1175285    11/2004
(Continued)

OTHER PUBLICATIONS

International Search Report issued in PCT/JP2014/056326 dated Jun. 17, 2014 with English Language translation.
(Continued)

*Primary Examiner* — Joon Kwon
(74) *Attorney, Agent, or Firm* — DLA Piper LLP US

(57) ABSTRACT

A refrigerator (1) is provided with an image capturing camera 18 (image capturing unit) configured to capture an image of an interior of a storage chamber (such as a refrigeration chamber 3); and a communication portion (52) (communication unit) configured to transmit image of the interior of the storage chamber captured by the image capturing camera (18) to an external device.

14 Claims, 57 Drawing Sheets

(30) Foreign Application Priority Data

Oct. 30, 2013 (JP) .............................. JP2013-225437
Feb. 28, 2014 (JP) .............................. JP2014-038461

(51) Int. Cl.
*F25D 23/04* (2006.01)
*F25D 23/12* (2006.01)

(58) Field of Classification Search
USPC ....................................................... 348/143
See application file for complete search history.

(56) References Cited

U.S. PATENT DOCUMENTS

| | | | |
|---|---|---|---|
| 6,919,795 | B2 | 7/2005 | Roseen |
| 7,853,142 | B2 | 12/2010 | Meyers |
| 8,756,942 | B2 * | 6/2014 | Min ........................ F25D 29/00 62/125 |
| 2002/0066279 | A1 | 6/2002 | Kiyomatsu |
| 2002/0167589 | A1 * | 11/2002 | Schofield ............ G08G 1/0175 348/135 |
| 2002/0196360 | A1 * | 12/2002 | Miyadera ........... H04N 1/00127 348/373 |
| 2003/0164754 | A1 | 9/2003 | Roseen |
| 2006/0096303 | A1 | 5/2006 | Kavounas |
| 2006/0174641 | A1 * | 8/2006 | Liu ......................... F25D 29/00 62/246 |
| 2006/0237427 | A1 * | 10/2006 | Logan ................ E05B 47/0002 219/401 |
| 2007/0070240 | A1 * | 3/2007 | Oya ................... H04N 5/23203 348/375 |
| 2007/0152076 | A1 | 7/2007 | Chiang |
| 2007/0175993 | A1 * | 8/2007 | Kaneko ................... G06F 21/78 235/439 |
| 2007/0188621 | A1 * | 8/2007 | Kitagawa ........... H04N 1/00127 348/211.99 |
| 2008/0307818 | A1 | 12/2008 | Min |
| 2010/0024462 | A1 | 2/2010 | Kamisako |
| 2010/0170278 | A1 | 7/2010 | Min |
| 2010/0170289 | A1 * | 7/2010 | Graziano ............... H04N 7/181 62/449 |
| 2010/0223944 | A1 | 9/2010 | Tsujimoto |
| 2010/0283573 | A1 | 11/2010 | Yum et al. |
| 2011/0233289 | A1 | 9/2011 | Bortoletto et al. |
| 2012/0023971 | A1 | 2/2012 | Min |
| 2012/0260683 | A1 | 10/2012 | Cheon et al. |
| 2012/0265348 | A1 * | 10/2012 | Kim ...................... F25D 17/042 700/275 |
| 2013/0015753 | A1 | 1/2013 | Son et al. |
| 2014/0042886 | A1 | 2/2014 | Baldo |
| 2014/0137587 | A1 | 5/2014 | Hitzelberger |
| 2014/0139710 | A1 | 5/2014 | Chen |
| 2014/0192182 | A1 * | 7/2014 | Wait ...................... G06Q 30/00 348/121 |
| 2014/0252091 | A1 | 9/2014 | Morse |
| 2014/0293060 | A1 | 10/2014 | Ryu |
| 2014/0300265 | A1 | 10/2014 | Lee |
| 2014/0320647 | A1 * | 10/2014 | Seo ........................ F25D 29/00 348/143 |
| 2015/0059374 | A1 | 3/2015 | Hebei |
| 2015/0201166 | A1 * | 7/2015 | Glickman ............. B25H 3/028 348/159 |
| 2015/0211783 | A1 | 7/2015 | Marutani |
| 2015/0260449 | A1 | 9/2015 | Furuta |
| 2015/0260450 | A1 | 9/2015 | Marutani |
| 2016/0047587 | A1 | 2/2016 | Sasaki |

FOREIGN PATENT DOCUMENTS

| | | |
|---|---|---|
| CN | 2811883 | 8/2006 |
| CN | 20048027572 | 11/2006 |
| CN | 101490599 | 7/2009 |
| CN | 101995141 | 3/2011 |
| CN | 102003864 | 4/2011 |
| CN | 102032740 | 4/2011 |
| CN | 102150079 | 8/2011 |
| CN | 102183120 | 9/2011 |
| CN | 102261788 | 11/2011 |
| CN | 102741633 | 10/2012 |
| CN | 102753920 | 10/2012 |
| CN | 2478043 Y | 2/2020 |
| EP | 1 662 218 | 5/2006 |
| EP | 0816466 | 5/2006 |
| JP | 2-44327 | 2/1990 |
| JP | H08-49958 | 2/1996 |
| JP | H09-0222538 | 8/1997 |
| JP | H11-177858 | 7/1999 |
| JP | H11-337252 | 12/1999 |
| JP | 2000-131747 | 5/2000 |
| JP | 2001-133119 | 5/2001 |
| JP | 2001-317858 | 11/2001 |
| JP | 2002-81818 | 3/2002 |
| JP | 2002-243335 | 8/2002 |
| JP | 2002-267337 | 9/2002 |
| JP | 2002-295962 | 10/2002 |
| JP | 2002-340471 | 11/2002 |
| JP | 2003-004366 | 1/2003 |
| JP | 2003004366 A * | 1/2003 |
| JP | 2003-042626 | 2/2003 |
| JP | 2003-207258 | 7/2003 |
| JP | 2004-183987 | 7/2004 |
| JP | 2005-030607 | 2/2005 |
| JP | 2005-156107 | 6/2005 |
| JP | 2005-265243 | 9/2005 |
| JP | 2005-315479 | 11/2005 |
| JP | 2006-046771 | 2/2006 |
| JP | 2006-084132 | 3/2006 |
| JP | 2007-046833 | 2/2007 |
| JP | 2007-046834 | 2/2007 |
| JP | 2007-113818 | 5/2007 |
| JP | 2007-132543 | 5/2007 |
| JP | 2008-075925 | 4/2008 |
| JP | 2008-104077 | 5/2008 |
| JP | 2009-147704 | 7/2009 |
| JP | 2009-250602 | 10/2009 |
| JP | 2011-021865 | 2/2011 |
| JP | 2011-069499 | 4/2011 |
| JP | 2011-226760 | 11/2011 |
| JP | 2012-032009 | 2/2012 |
| JP | 2012-078086 | 4/2012 |
| JP | 2012-107770 | 6/2012 |
| JP | 2012-193873 A | 10/2012 |
| JP | 2012-220186 | 11/2012 |
| JP | 2012-220942 | 11/2012 |
| JP | 2012-226748 | 11/2012 |
| JP | 2012-251722 | 12/2012 |
| JP | 2012-251724 | 12/2012 |
| JP | 2013-024506 | 2/2013 |
| JP | 2014-196845 | 10/2014 |
| JP | 2014-209047 | 11/2014 |
| KR | 2000-0009521 | 6/2000 |
| KR | 10-2004-0083784 | 10/2004 |
| KR | 2006-0095419 | 8/2006 |
| KR | 10-2006-0099985 | 9/2006 |
| KR | 10-2012-0075825 | 7/2012 |
| TW | 233858 | 11/1994 |
| TW | 313630 | 8/1997 |
| TW | 587149 | 5/2004 |
| TW | M287928 | 2/2006 |
| TW | 200617334 | 6/2006 |
| TW | 201217731 | 5/2012 |
| TW | 2016-27621 | 8/2016 |
| WO | WO 2005/015510 | 2/2005 |
| WO | WO 2012/091256 | 7/2012 |
| WO | WO 2012091256 | 7/2012 |
| WO | WO 2012/153515 | 11/2012 |

OTHER PUBLICATIONS

English Language Abstract and Translation for JP 2002-340471 published Nov. 27, 2002.

(56) References Cited

OTHER PUBLICATIONS

English Language Abstract and Translation for JP 2008-104077 published May 1, 2008.
English Language Abstract and Translation for JP 2003-207258 published Jul. 25, 2003.
English Language Abstract and Translation for JP 2012-078086 published Apr. 19, 2012.
English Language Abstract and Translation for JP 2012-032009 published Feb. 16, 2012.
English Language Abstract and Translation for JP 2003-004366 published Jan. 1, 2003.
English Language Abstract and Translation for JP H09-222538 published Aug. 26, 1997.
English Language Abstract and Translation for JP 2011-226760 published Nov. 10, 2011.
English Language Abstract and Translation for JP 2012-226748 published Nov. 15, 2012.
English Language Abstract and Translation for JP 2002-243335 published Aug. 28, 2002.
English Language Abstract and Translation for JP 2012-251724 published Dec. 20, 2012.
Taiwanese Office Action issued in 103108282 dated Dec. 2, 2015 with English Language Translation.
International Search Report issued in PCT/JP2014/056325 dated Jun. 17, 2014 with English Language translation.
English Language Abstract and Translation for JP 2007-46834 published Feb. 22, 2007.
English Language Abstract and Translation for JP 2011-69499 published Apr. 7, 2011.
Taiwanese Office Action issued in 103108275 dated Jul. 9, 2015 with English Language Translation.
English Language Abstract and Translation for CN 2011-101995141 published Mar. 30, 2011.
International Search Report issued in PCT/JP2014/056327 dated Jun. 24, 2014.
English Language Abstract and Translation for JP 2002-267337 published Sep. 18, 2002.
English Language Abstract and Translation for JP 2009-147704 published Jul. 2, 2009.
English Language Abstract and Translation for JP 2011-021865 published Feb. 3, 2011.
English Language Abstract and Translation for JP 2003-042626 published Feb. 13, 2003.
English Language Abstract and Translation for JP 2007-113818 published May 10, 2007.
English Language Abstract and Translation for JP 2007-046833 published Feb. 22, 2007.
English Language Abstract and Translation for JP 2007-132543 published May 31, 2007.
English Language Abstract and Translation for JP 2008-075925 published Apr. 3, 2008.
English Language Abstract and Translation for JP 2012-220186 published Nov. 12, 2012.
English Language Abstract and Translation for JP 2005-265243 published Sep. 29, 2005.
Taiwanese Office Action issued in TW 103108277 dated Mar. 7, 2016 with English Language Translation.
U.S. Appl. No. 14/776,728 electronically captured on May 16, 2016.
U.S. Appl. No. 14/776,729 electronically captured on May 16, 2016.
Japanese Office Action issued in JP 2014-038459 dated Nov. 7, 2017.
Taiwan Office Action issued in TW 10621168720 dated Nov. 16, 2017.
Korean Office Action issued in KR 10-2015-7028146 dated Jun. 22, 2016 with English Language Translation.
Korean Office Action issued in KR 10-2015-7028150 dated Jun. 20, 2016 with English Language Translation.
Chinese Office Action issued in CN 201480014441.5 dated Jun. 2, 2016 with English Language Translation.
Chinese Office Action issued in CN 201480014042.9 dated Jul. 4, 2016 with English Language Translation.
Chinese Office Action issued in CN 201480014316.4 dated Jul. 5, 2016 with English Language Translation.
Korean Office Action issued in KR 10-2015-7028146 dated Feb. 2, 2017.
European Office Action issued in EP 14765282.0 dated Nov. 22, 2016.
European Office Action issued in EP 14764830.7 dated Nov. 24, 2016.
European Office Action issued in EP 14763567.6 dated Nov. 22, 2016.
U.S. Appl. No. 14/776,728 electronically captured on Jan. 19, 2018 (May 16, 2016 to Jan. 19, 2018).
U.S. Appl. No. 14/776,729 electronically captured on Jan. 19, 2018 (May 16, 2016 to Jan. 19, 2018).
U.S. Appl. No. 14/776,728, filed Feb. 18, 2016, Pending.
U.S. Appl. No. 14/776,729, filed Feb. 4, 2016, Pending.
U.S. Appl. No. 14/776,728 electronically captured on Mar. 11, 2019 (Dec. 27, 2018-Mar. 11, 2019).
Korean Office Action issued in KR 10-2017-7011992 dated Mar. 26, 2016.
European Office Action issued in Application No. 14 765 282 dated Apr. 5, 2019.
Chinese Office Action issued in Application No. 201710251398 dated Apr. 15, 2019.
Japanese Office Action issued in Application No. 2019-040541 dated Jun. 4, 2019.
Japanese Office Action issued in Application No. 2019-082853 dated Jun. 4, 2019.
U.S. Appl. No. 14/776,728 electronically captured on Jun. 27, 2019 (May 20, 2019 to Jun. 27, 2019).
Chinese Office Action in Application No. 201710251390 dated May 8, 2019.
Chinese Office Action in Application No. 201710251444 dated May 27, 2019.
Chinese Office Action in Application No. 201710251344 dated Jun. 5, 2019.
Office Action in Taiwanese Application No. 10820744100 dated Aug. 6, 2019.
Office Action in Korean Application No. 10-2017-7011992 dated Sep. 16, 2019.
Office Action in Japanese Application No. 2018-154013 dated Oct. 1, 2019.
Office Action in Japanese Application No. 2019-082853 dated Oct. 8, 2019.
U.S. Appl. No. 14/776,728 electronically captured on Nov. 5, 2019 (Aug. 6, 2019 to Nov. 6, 2019).
Japanese Office Action issued in JP 2014-038461 dated Feb. 13, 2018.
Taiwan Office Action issued in TW 10720121180 dated Feb. 8, 2018.
English Language Abstract of JP 2002-81818 issued Mar. 22, 2002.
English Language Abstract of JP 2004-183987 issued Jul. 2, 2004.
English Language Abstract of TW 313630 issued Aug. 21, 1997.
English Language Abstract of TW 587149 issued May 11, 2004.
U.S. Appl. No. 14/776,728 electronically captured on May 7, 2018 (Feb. 8, 2018-May 7, 2018).
Japanese Office Action issued in JP 2014-038459 dated May 15, 2018.
U.S. Appl. No. 14/776,728 electronically captured on Aug. 13, 2018 (May 7, 2018-Aug. 13, 2018).
U.S. Appl. No. 14/776,728 electronically captured on Feb. 24, 2020.
U.S. Appl. No. 15/974,952 electronically captured on Feb. 24, 2020.
Chinese Office Action in CN Application No. 201710140595.4 dated Dec. 27, 2019.
Chinese Office Action in CN Application No. 201710140454.2 dated Dec. 30, 2019.
Chinese Office Action in CN Application No. 201710251444.6 dated Jan. 20, 2020.
Korean Office Action in KR Application No. 10-2018-7027430 dated Jan. 20, 2020.

(56) References Cited

OTHER PUBLICATIONS

Korean Office Action in KR Application No. 10-2018-7010793 dated Jan. 21, 2020.
Chinese Office Action in CN Application No. 201710251293.4 dated Apr. 9, 2020.
Chinese Office Action in CN Application No. 201710140562.X dated Apr. 16, 2020.
Chinese Office Action in CN Application No. 201710140670.7 dated Apr. 17, 2020.
Chinese Office Action in CN Application No. 201710140595.4 dated Apr. 21, 2020.
Chinese Office Action in CN Application No. 201710140546.0 dated Apr. 21, 2020.
Chinese Office Action in CN Application No. 201710251390.3 dated Apr. 27, 2020.
Taiwan Office Action in TW Application No. 10920399750 dated Apr. 29, 2020.
Korean Office Action in KR Application No. 10-2020-7006879 dated May 19, 2020.
Japanese Office Action in JP Application No. 2019-106095 dated Apr. 21, 2020.
Chinese Office Action in CN Application No. 201710251398.X dated Jun. 3, 2020.
Chinese Office Action in CN Application No. 201710251444.6 dated Jun. 9, 2020.
Chinese Office Action in CN Application No. 201710140454.2 dated Apr. 21, 2020.
U.S. Appl. No. 14/776,728 electronically captured on Jul. 10, 2020 (Feb. 25, 2020 to Aug. 25, 2020).
U.S. Appl. No. 15/974,952 electronically captured on Jun. 30, 2020(Feb. 25, 2020 to Aug. 25, 2020).
Korean Office Action issued in KR 2020-04842227 dated Jul. 16, 2020.
Chinese Office Action issued in CN 2017-10140670 dated Aug. 7, 2020.
Chinese Office Action issued in CN 2019-0116056 dated Jul. 2, 2020.
Chinese Office Action issued in CN CN 2019-0116096 dated Jul. 3, 2020.
U.S. Appl. No. 15/974,952 electronically captured on Sep. 30, 2020 (Sep. 28, 2020-present).
U.S. Appl. No. 14/776,728 electronically captured on Dec. 27, 2018 (Sep. 27, 2018-Dec. 27, 2018).
Chinese Office Action issued in CN 2019-0116080 dated Aug. 31, 2020.
Chinese Office Action issued in CN 2019-0116150 dated Jul. 3, 2020.
Chinese Office Action issued in CN 2019-0116249 dated Jul. 2, 2020.
Japanese Office Action issued in JP 2019-182095 dated Oct. 20, 2020.
Japanese Office Action issued in JP 2020-000273 dated Sep. 8, 2020.
Chinese Office Action issued in CN 2017-10140546 dated Aug. 7, 2020 .
Chinese Office Action issued in CN 2017-10251293 dated Nov. 11, 2020.
Chinese Office Action issued in CN 2017-10251390 dated Sep. 27, 2020.
Japanese Office Action issued in JP 2020-000273 dated Dec. 15, 2020.
Non-Final Office Action issued in U.S. Appl. No. 15/974,952 dated Jan. 21, 2021.

* cited by examiner

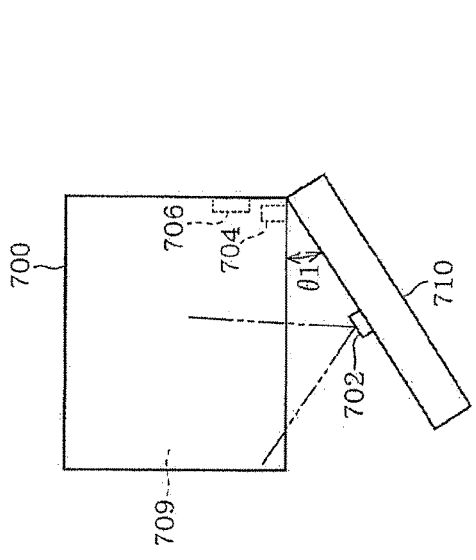
FIG. 31A  FIG. 31B  FIG. 31C
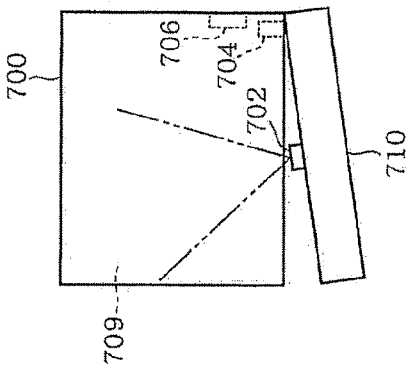
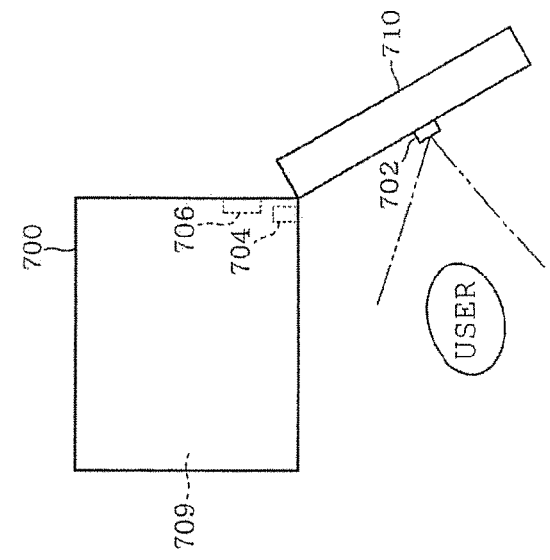
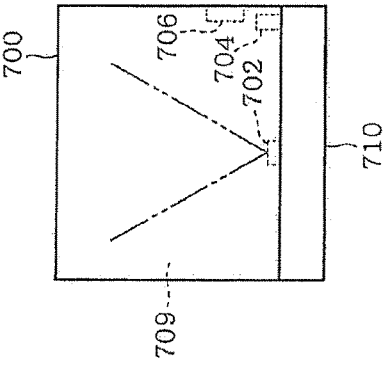
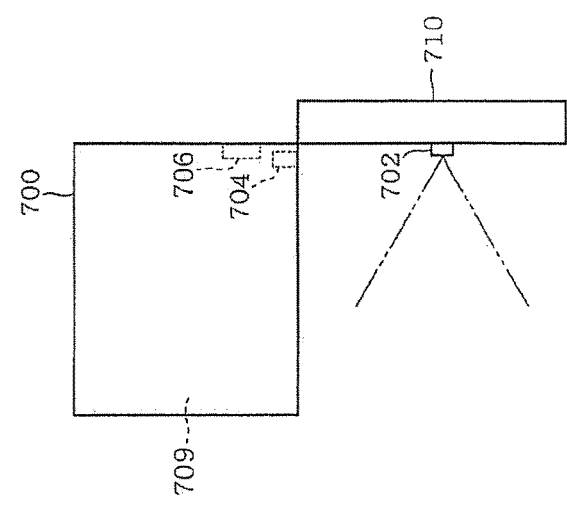
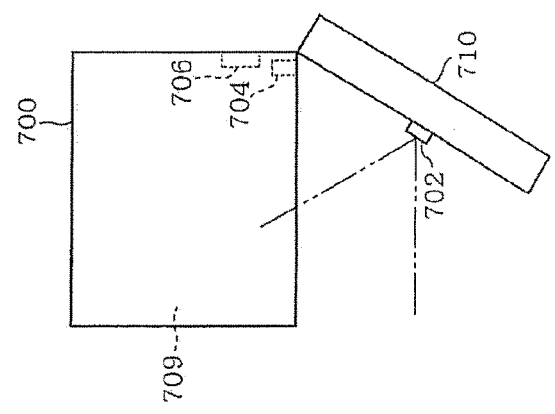
FIG. 31D  FIG. 31E  FIG. 31F

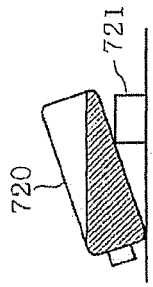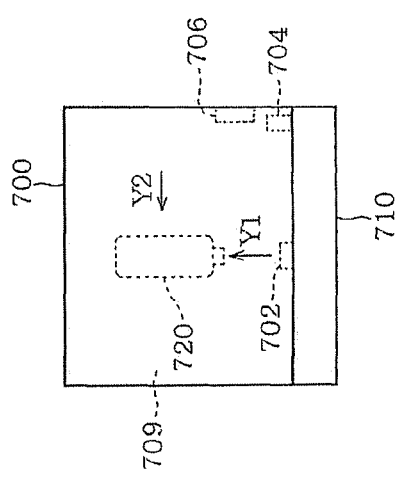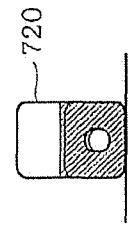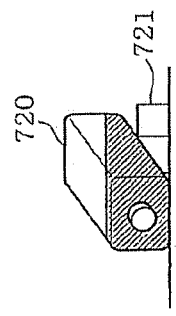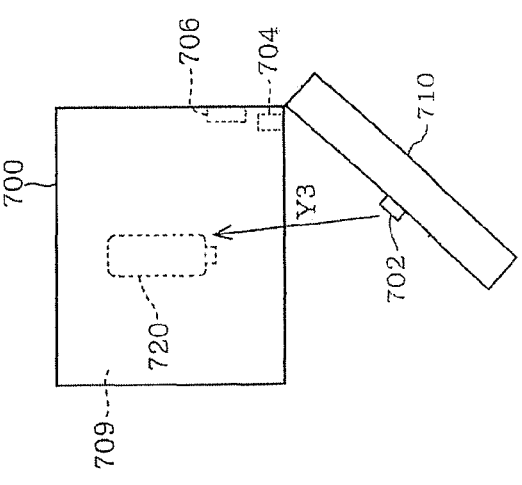

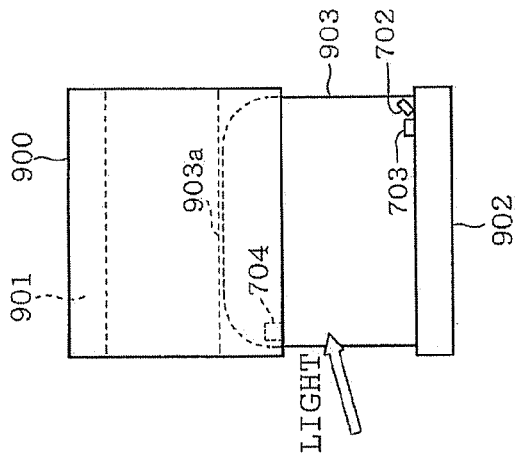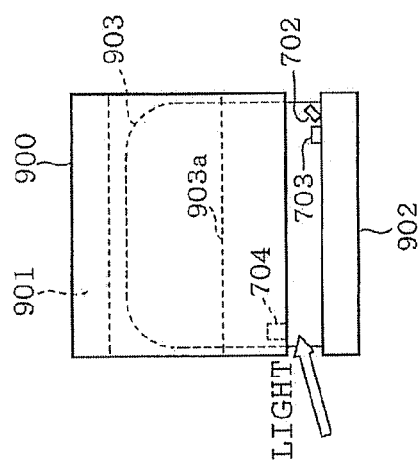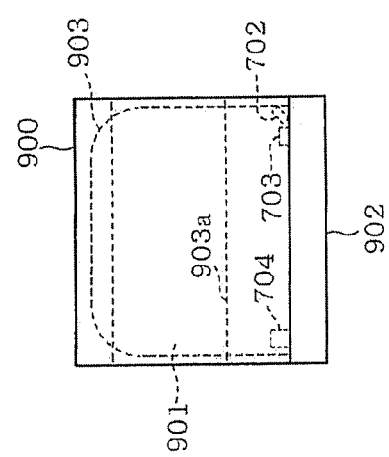

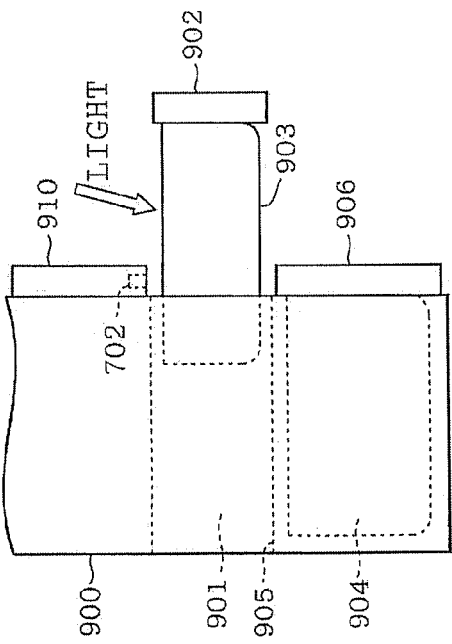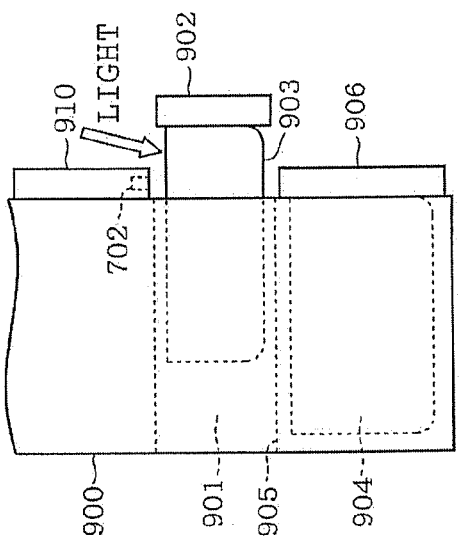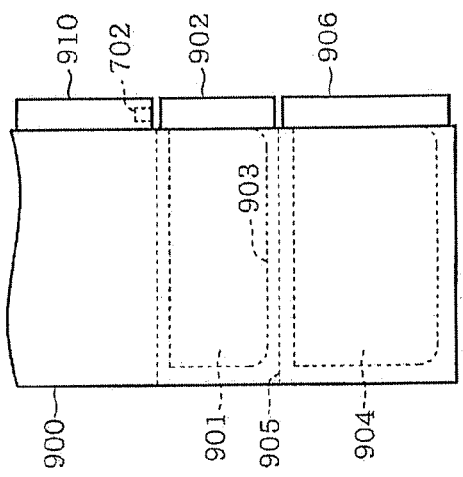

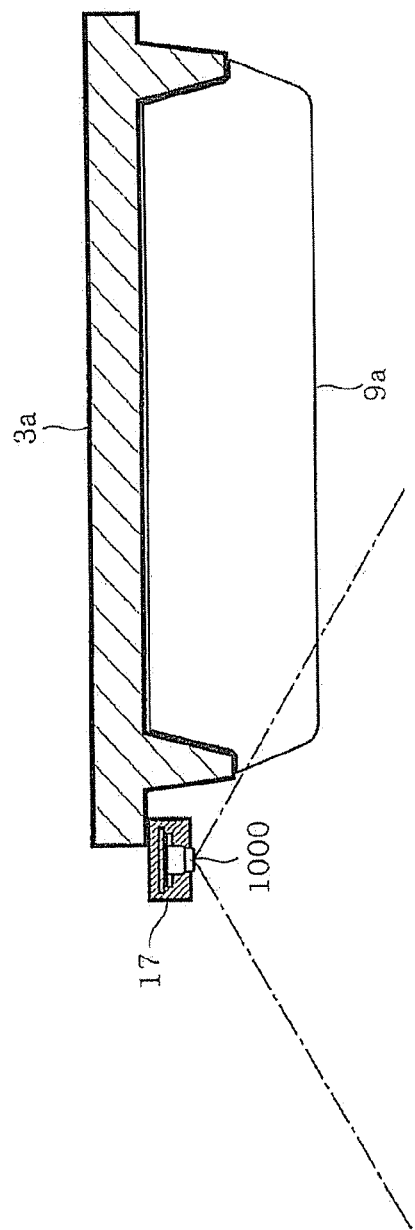

REFRIGERATOR, CAMERA DEVICE, REFRIGERATOR DOOR POCKET, AND HOME APPLIANCE NETWORK SYSTEM

CROSS REFERENCE TO RELATED APPLICATIONS

This application is a U.S. National Stage Applications of International Application No. PCT/JP2014/056327 filed Mar. 11, 2014, which claims priority from Japanese Patent Application No. 2013-049073 filed Mar. 12, 2013, Japanese Patent Application No. 2013-147562 filed Jul. 16, 2013, Japanese Patent Application No. 2013-225437 filed Oct. 30, 2013 and Japanese Patent Application No. 2014-038461 filed Feb. 28, 2014. The entirety of all the above-listed applications are incorporated herein by reference.

TECHNICAL FIELD

Embodiments of the present invention relates to a refrigerator, camera device, a refrigerator door pocket, a refrigerator holder, a communication terminal, a home appliance network system, and an in-fridge image display program.

BACKGROUND

Systems configured to manage food by capturing images of food stored in a refrigerator have been proposed (See for example, patent document 1).

However, some users wish to check the status inside the refrigerator with ease.

PRIOR ART DOCUMENTS

Patent Document

Patent Document 1: JP 2012-226748 A

SUMMARY OF THE INVENTION

Problems to be Overcome by the Invention

The problem to be overcome by the present invention is providing a refrigerator, camera device, a refrigerator door pocket, a refrigerator holder, a communication terminal, a home appliance network, and an in-fridge image display program allowing the interior of the refrigerator, etc. to be checked with ease.

Means for Overcoming the Problems

A refrigerator of one embodiment is provided with an image capturing unit; and a communication unit configured to transmit image information of the interior of the refrigerator captured by the image capturing unit to an external device.

A camera device of one embodiment is provided with an image capturing unit configured to capture an image of an interior of a refrigerator; and a camera-side communication unit configured to communicate with an external device.

A refrigerator door pocket of one embodiment is provided with a receiving portion configured for mounting an image capturing unit configured to capture an image of an interior of the refrigerator.

A refrigerator holder of one embodiment is provided with a holding portion configured to hold an image capturing unit configured to capture an image of an interior of the refrigerator.

A communication terminal of one embodiment is communicable, through a communication line, with a refrigerator provided with an image capturing unit for capturing an image of an interior of the refrigerator, the communication terminal configured to display image information of the interior of the refrigerator acquired through the communication line.

A home appliance network system of one embodiment is provided with an image capturing unit configured to capture an image of an interior of a storage chamber configured to store goods; a server being configured to be capable of communicating with the image capturing unit through a communication line and being provided with a communication unit configured to acquire image information of the interior of the storage chamber and a storage unit configured to store image information acquired by the communication unit; and a communication terminal being configured to be capable of communicating with the server through the communication line and being provided with a terminal-side display unit configured to acquire and display image information of the interior of the storage chamber stored in the server.

A program for displaying an image of an interior of a storage chamber of one embodiment which causes a terminal-side control unit, configured to control a communication terminal communicable with an image capturing unit capturing an image of the interior of the storage chamber for storing goods, to execute:

an image acquiring process that acquires image information of the interior of the chamber captured by the image capturing unit; and a displaying process that displays image information acquired by the image acquiring process.

BRIEF DESCRIPTIONS OF THE DRAWINGS

FIG. 1 briefly illustrates a home appliance network system employing a refrigerator of a first embodiment.

FIG. 2 schematically illustrates the refrigerator of the first embodiment.

FIG. 3 schematically illustrates how an image capturing camera of the first embodiment is attached.

FIG. 4 schematically illustrates an electrical configuration of the refrigerator of the first embodiment.

FIG. 5 schematically illustrates the status inside the refrigerator of the first embodiment.

FIG. 6 indicates the process flow of an image capturing process executed by the refrigerator of the first embodiment.

FIG. 7 illustrates one example of an image captured by the image capturing camera of the first embodiment.

FIGS. 8A-8C schematically illustrate change in the status of dew condensate on the image capturing camera of the first embodiment.

FIG. 9 illustrates the sequence of image capturing carried out by the image capturing camera of the first embodiment.

FIG. 10 indicates the process flow a terminal-side process carried out by a communication terminal of the first embodiment.

Figure 13A:
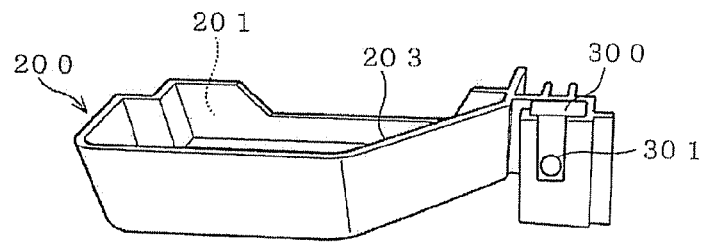
Figure 13B:
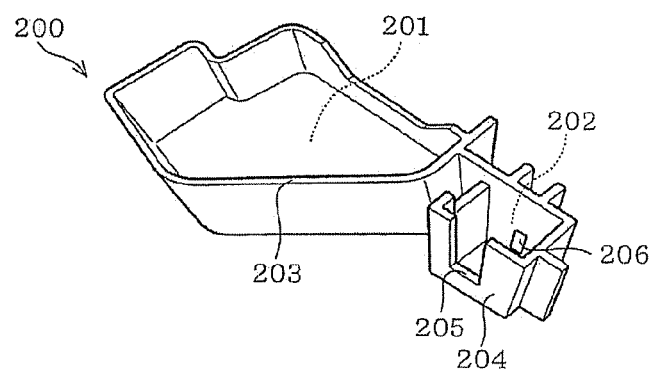

FIGS. 13A and 13B schematically illustrate a camera device mounted on a refrigerator door pocket of a second embodiment.

Figure 14:
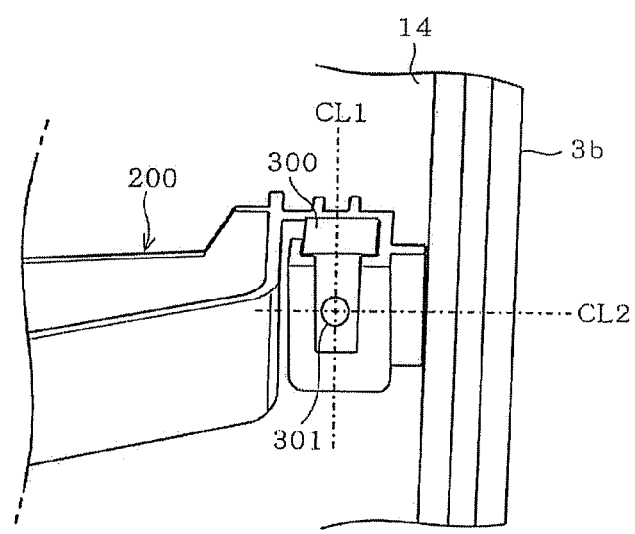

FIG. 14 schematically illustrates the refrigerator door pocket of the second embodiment attached to a refrigerator.

Figure 15:
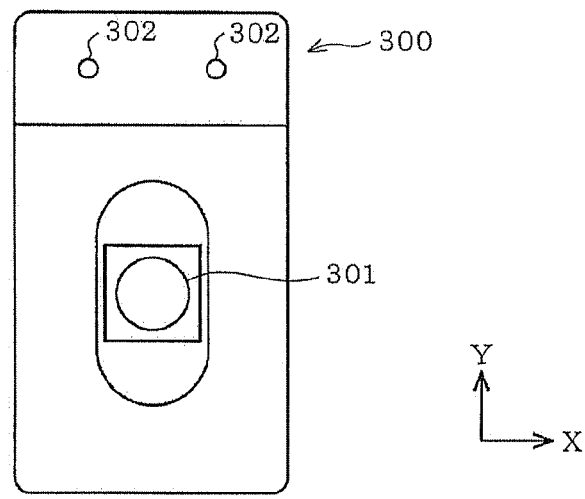

FIG. 15 schematically illustrates an exterior look of the camera device of the second embodiment.

Figure 16:
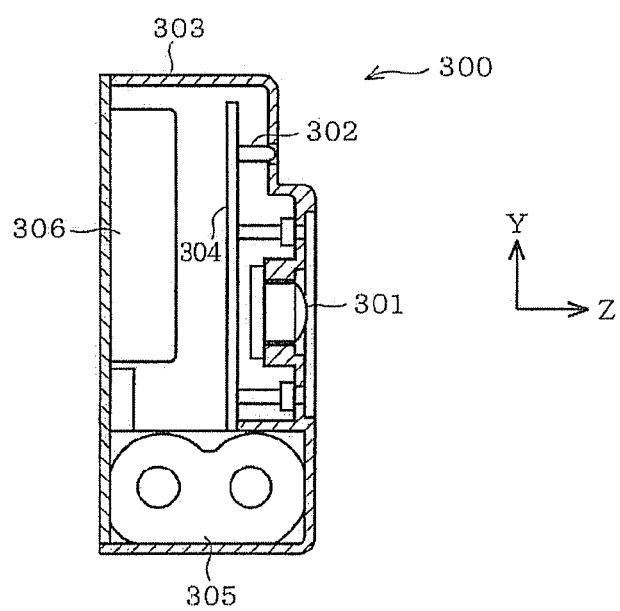

FIG. 16 schematically illustrates an exterior look of the camera device of the second embodiment and the layout of parts provided therein.

Figure 17:
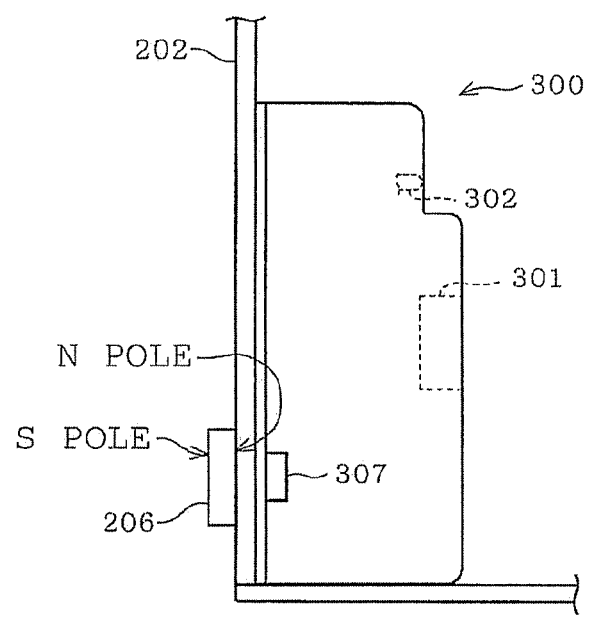

FIG. 17 schematically illustrates the camera device of the second embodiment being attached to the refrigerator door pocket.

Figure 18:
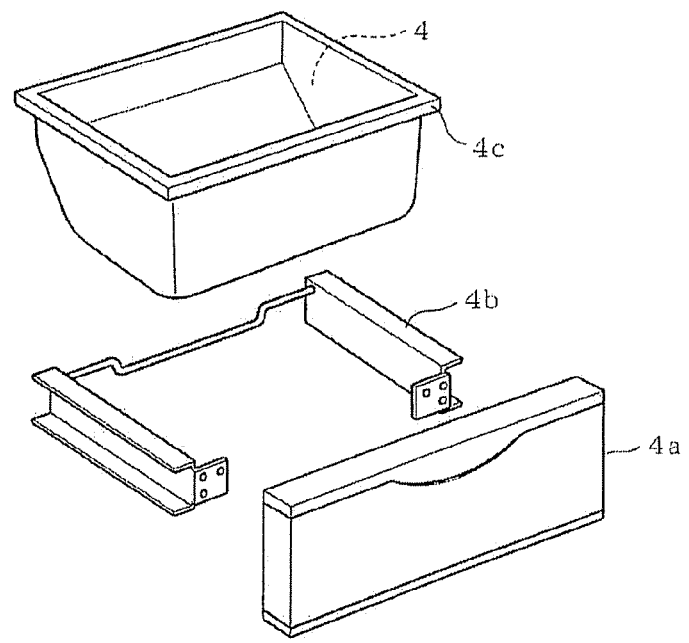

FIG. 18 schematically illustrates the location in which a refrigerator holder of the second embodiment is attached.

Figures 19A, 19B:
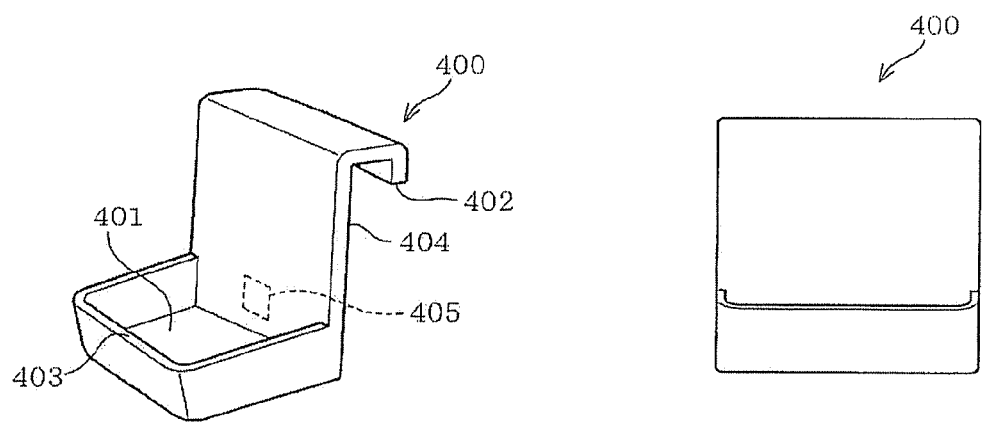

FIGS. 19A and 19B schematically illustrates the refrigerator holder of the second embodiment.

Figure 20:
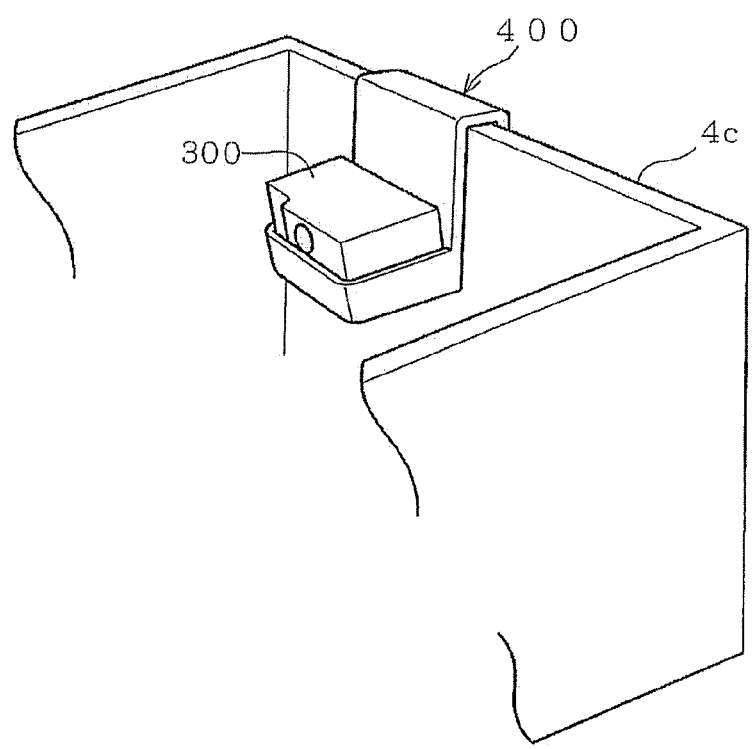

FIG. 20 schematically illustrates the refrigerator holder of the second embodiment being attached.

Figure 21:
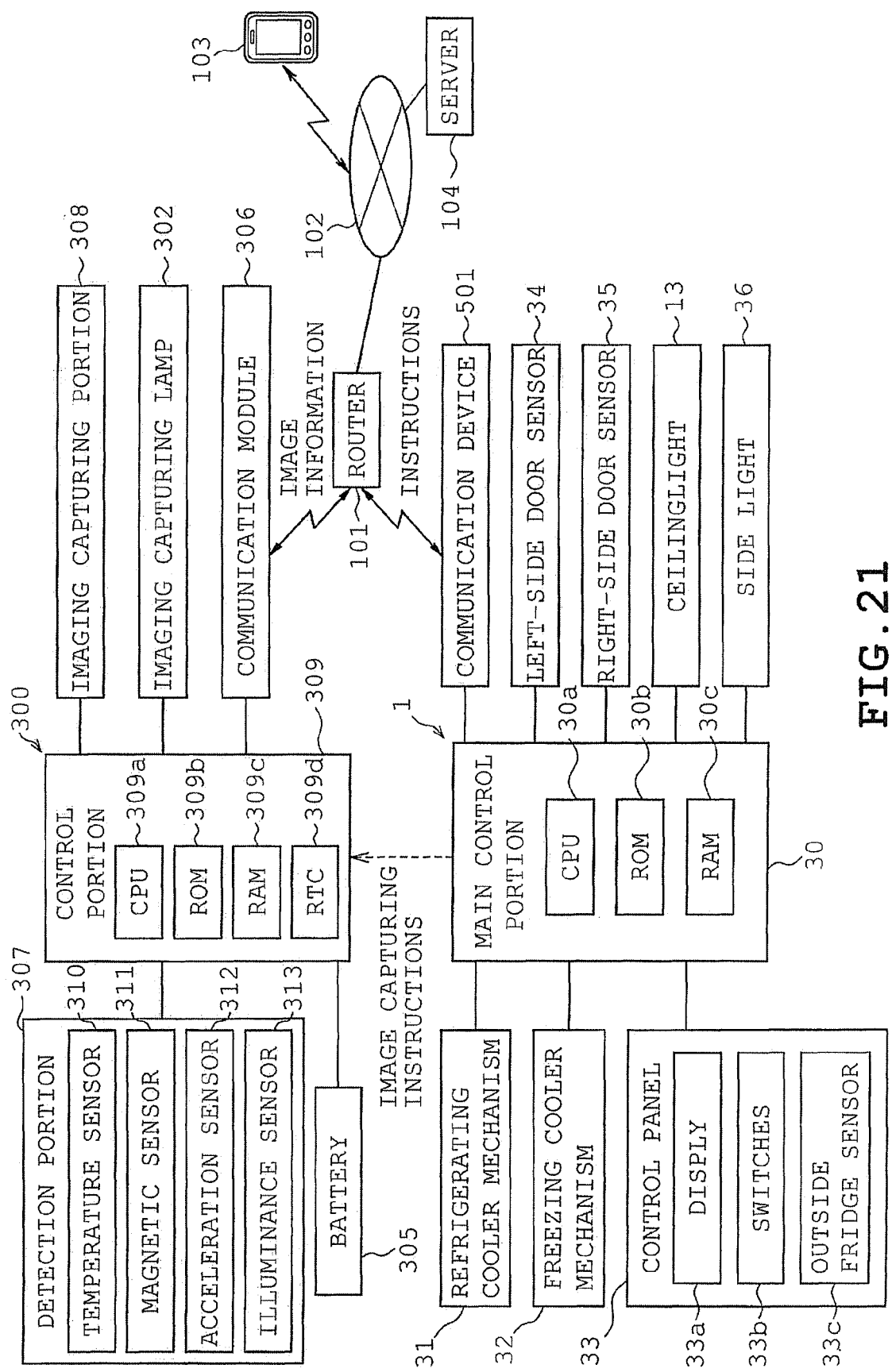

FIG. 21 schematically illustrates an electrical configuration of the camera device of the second embodiment.

Figure 22A:
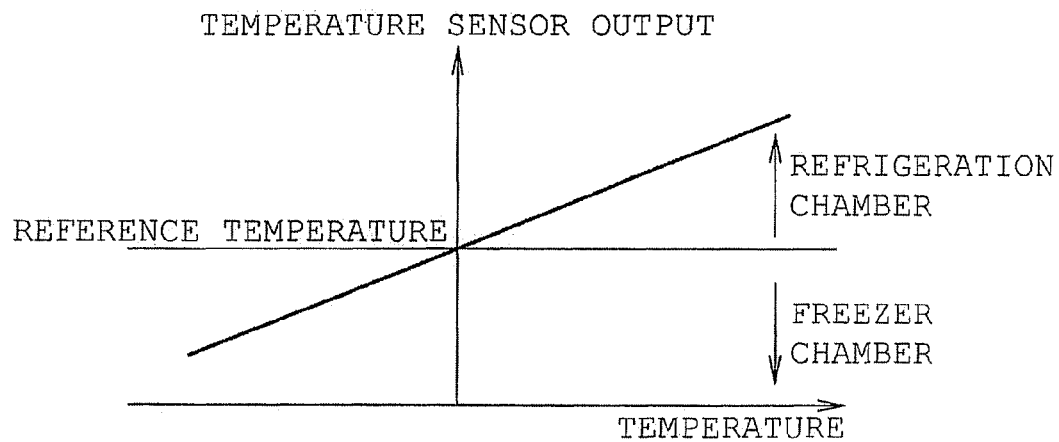
Figure 22B:
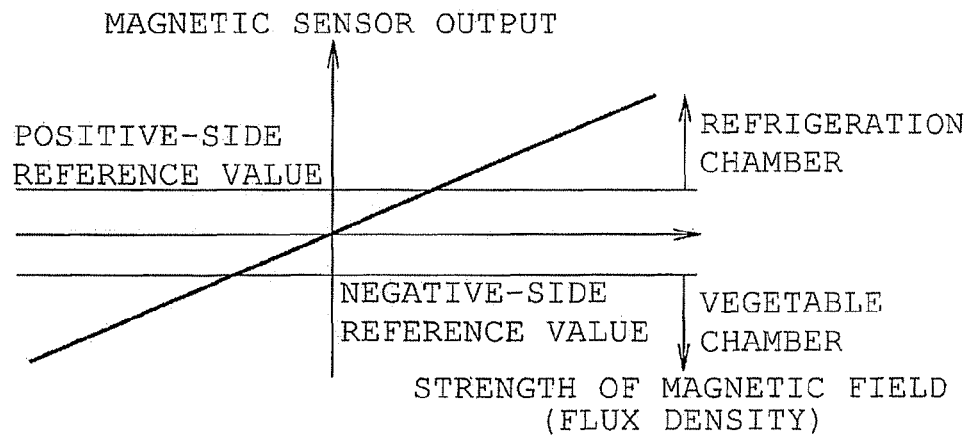
Figure 22C:
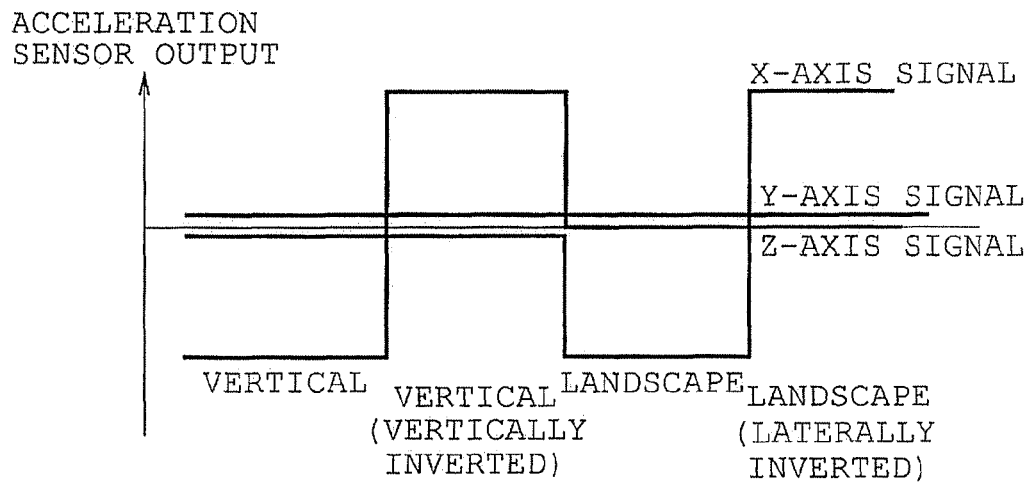

FIGS. 22A-22C schematically illustrates how detection is performed by a detection portion of the camera device of the second embodiment.

Figure 23:
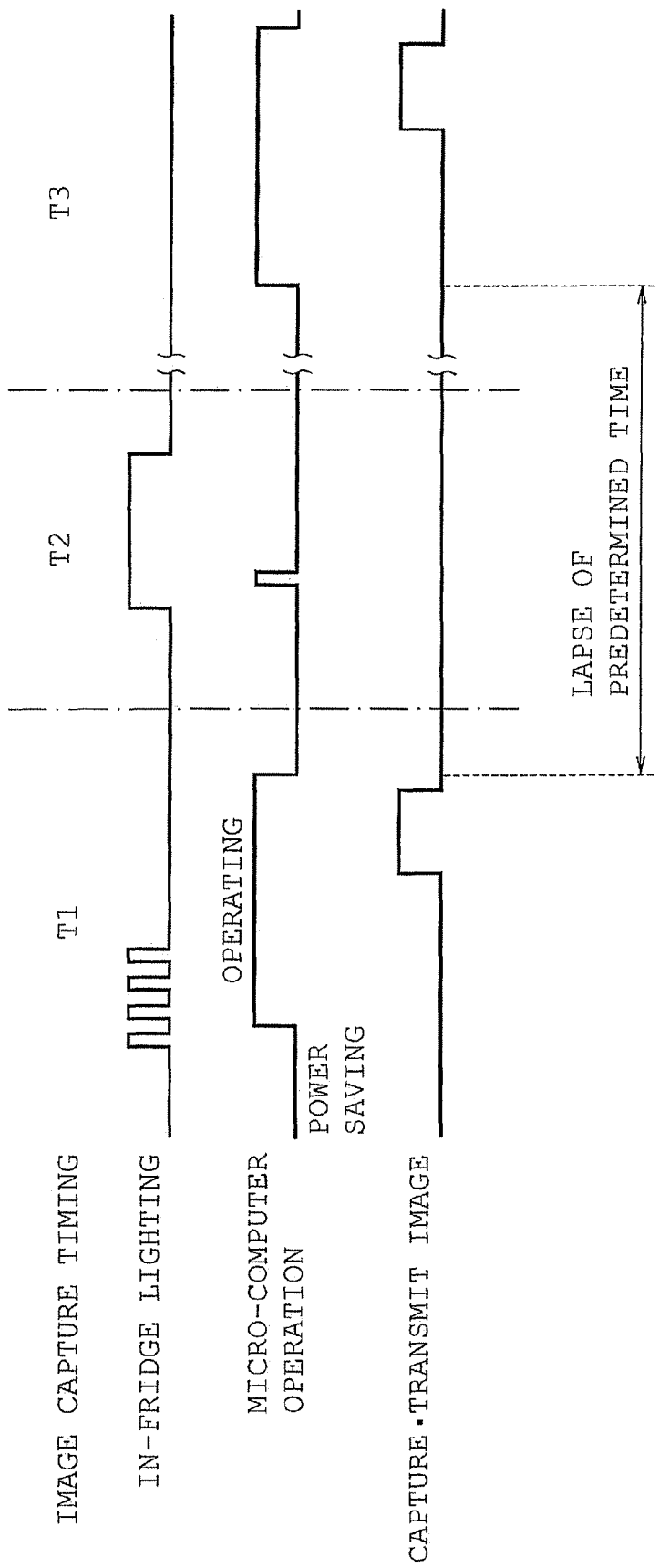

FIG. 23 illustrates an example of a timing of image capturing by the camera device of the second embodiment.

Figures 24A, 24B, 24C:
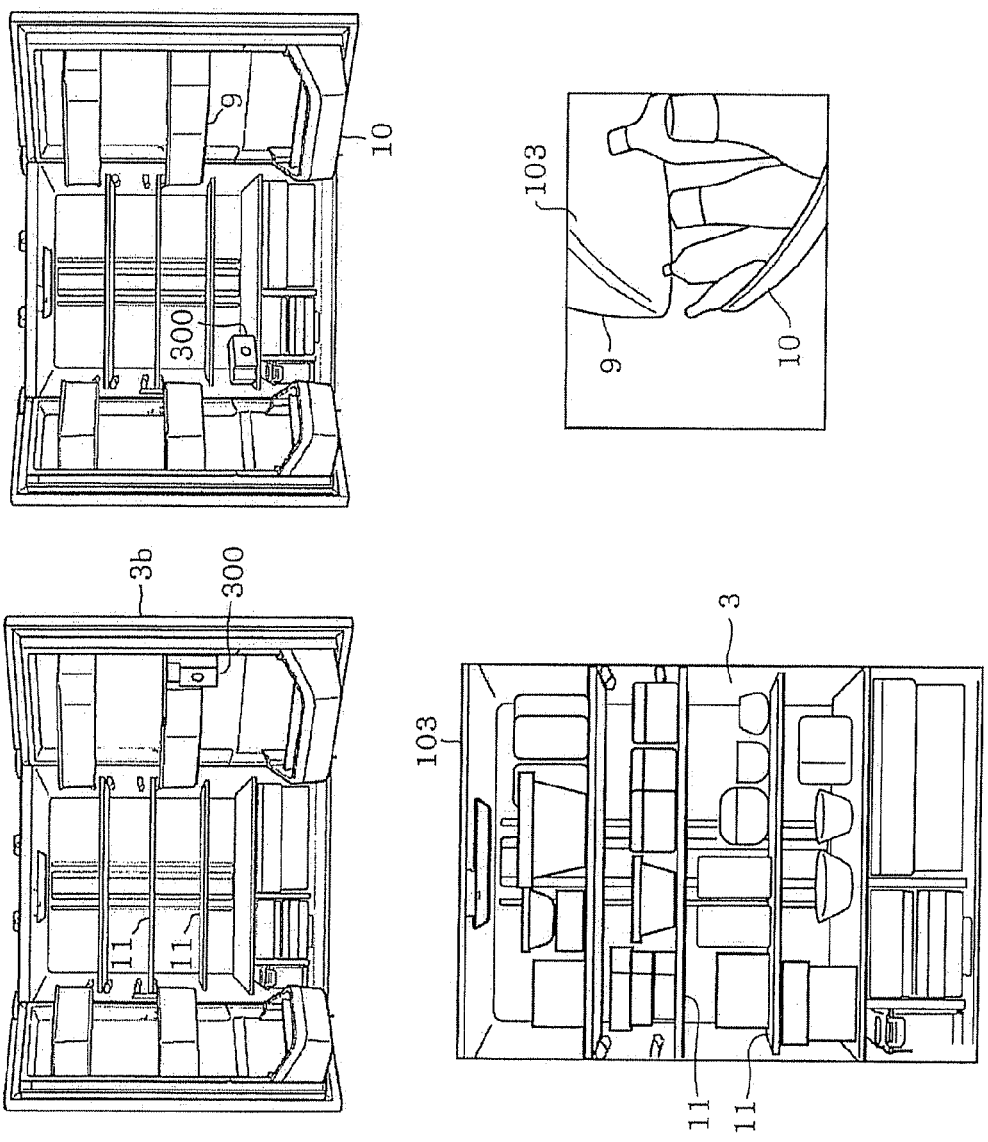

FIGS. 24A-24C illustrate an example of an image of a fridge interior captured by the camera device of the second embodiment.

Figure 25:
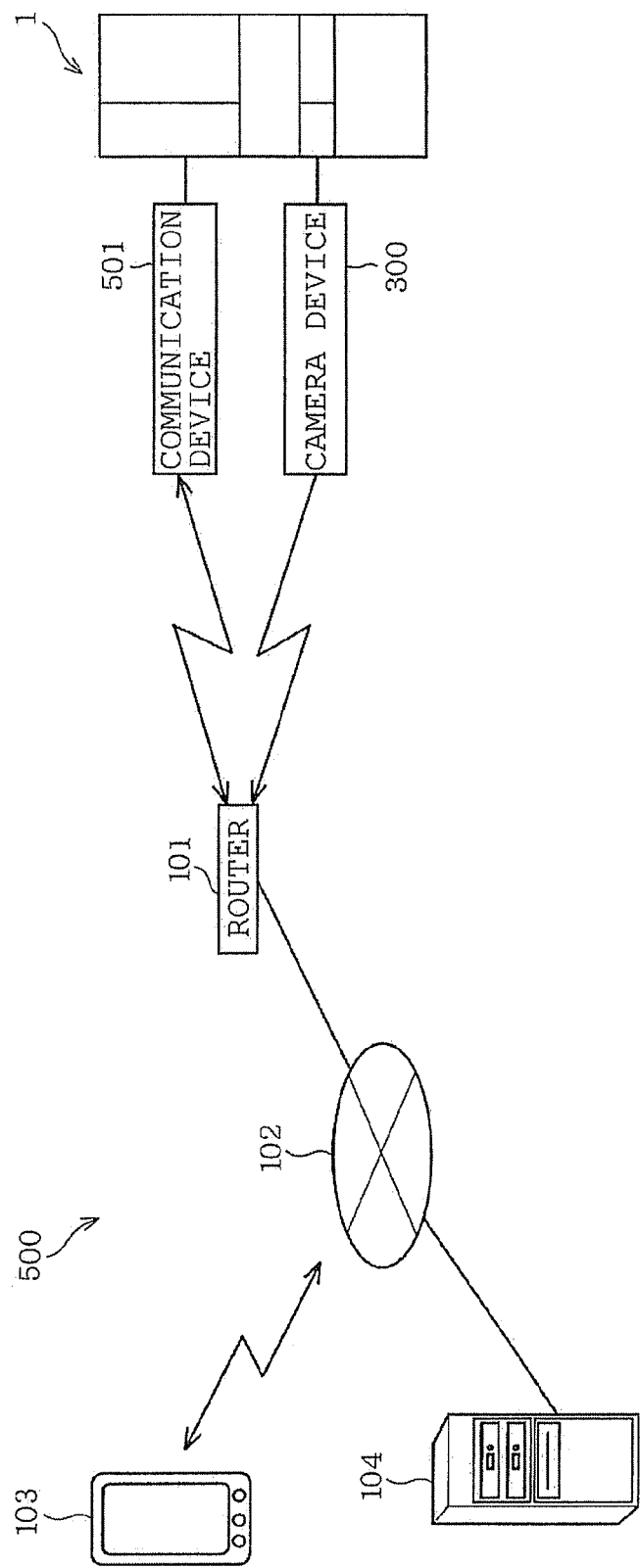

FIG. 25 provides an overview of a home appliance network system of the second embodiment.

Figure 26A:
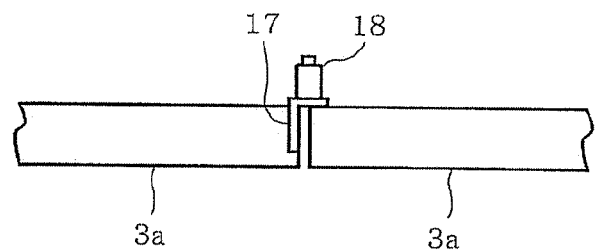
Figure 26B:
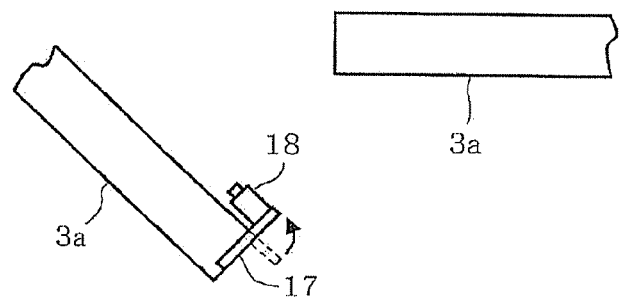

FIGS. 26A and 26B schematically illustrate how an image capturing camera is attached in a modified embodiment.

Figure 27:
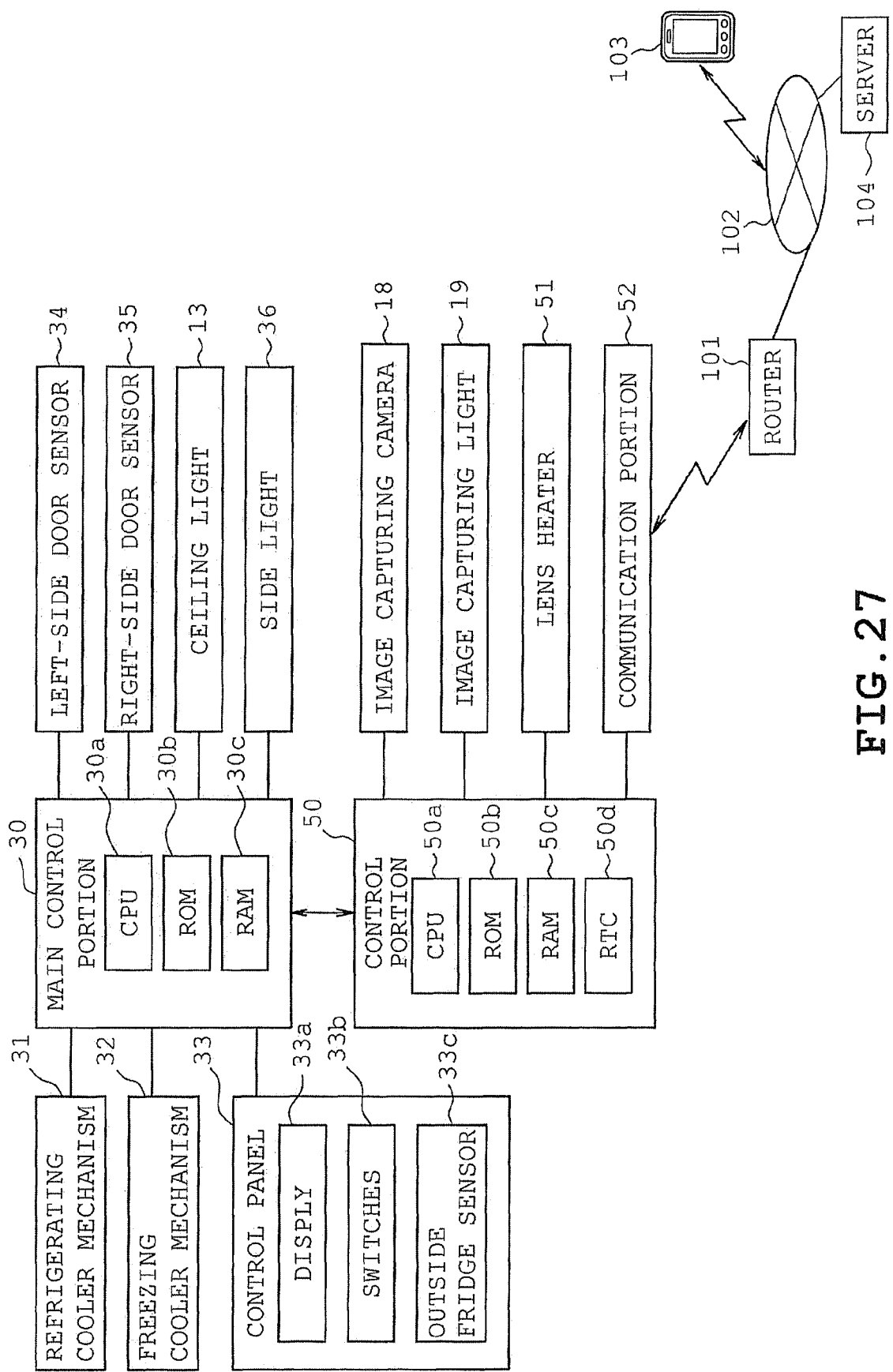

FIG. 27 schematically illustrates the structure of a refrigerator in a modified embodiment.

Figure 28:
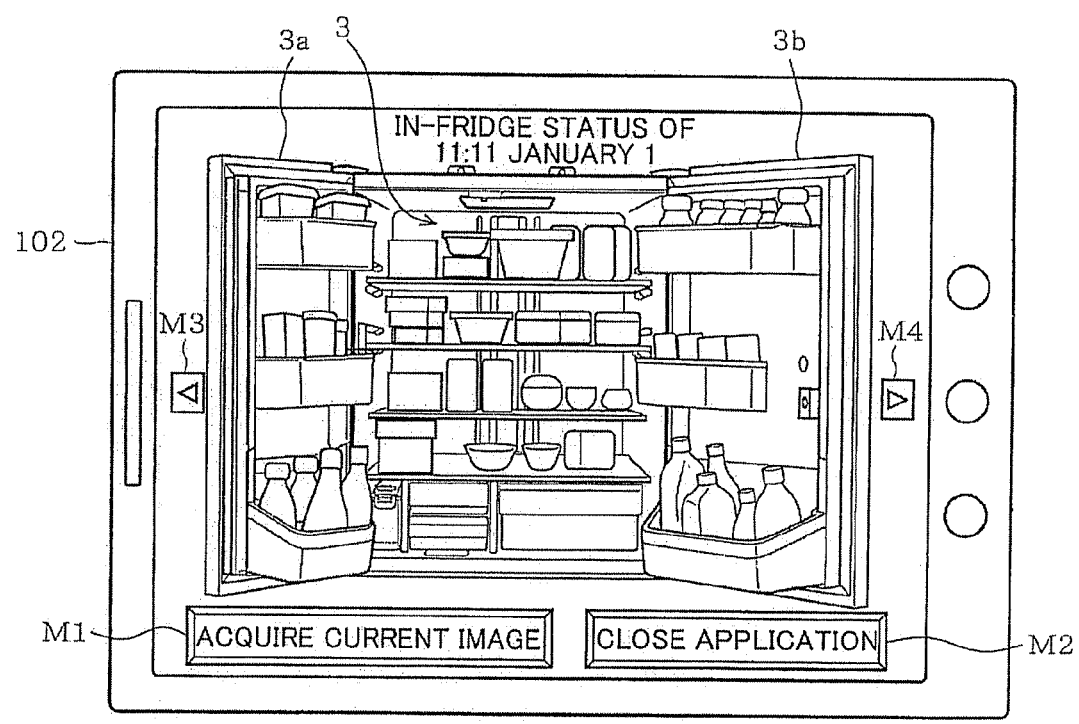

FIG. 28 illustrates one example of how an image is displayed in a communication terminal in a modified embodiment.

Figure 29A:
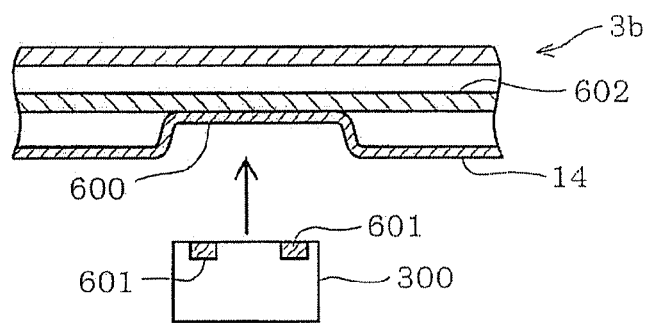
Figure 29B:
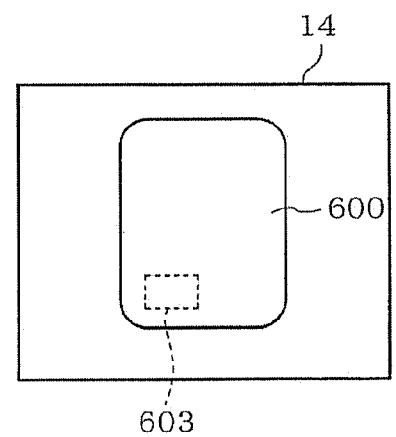

FIGS. 29A and 29B illustrates one example of a mounting portion in a modified embodiment.

Figure 30:
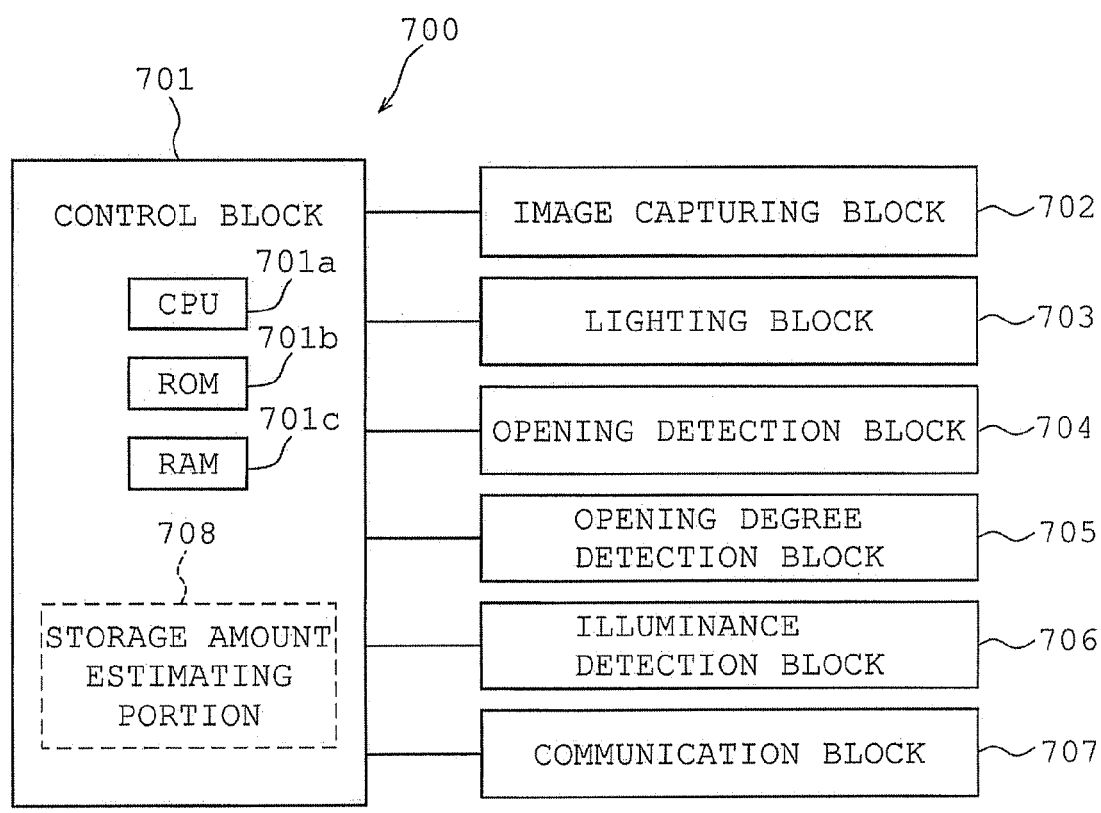

FIG. 30 is a functional block diagram indicating an electrical configuration of a refrigerator of a third embodiment.

FIGS. 31A-31F schematically illustrate the process of opening a door in the third embodiment (part 1).

Figure 32A:
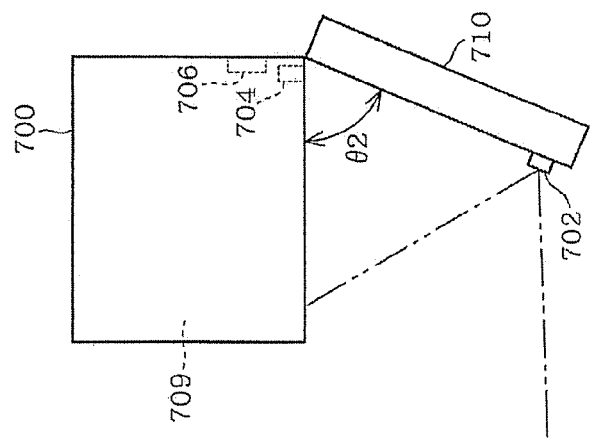
Figure 32B:
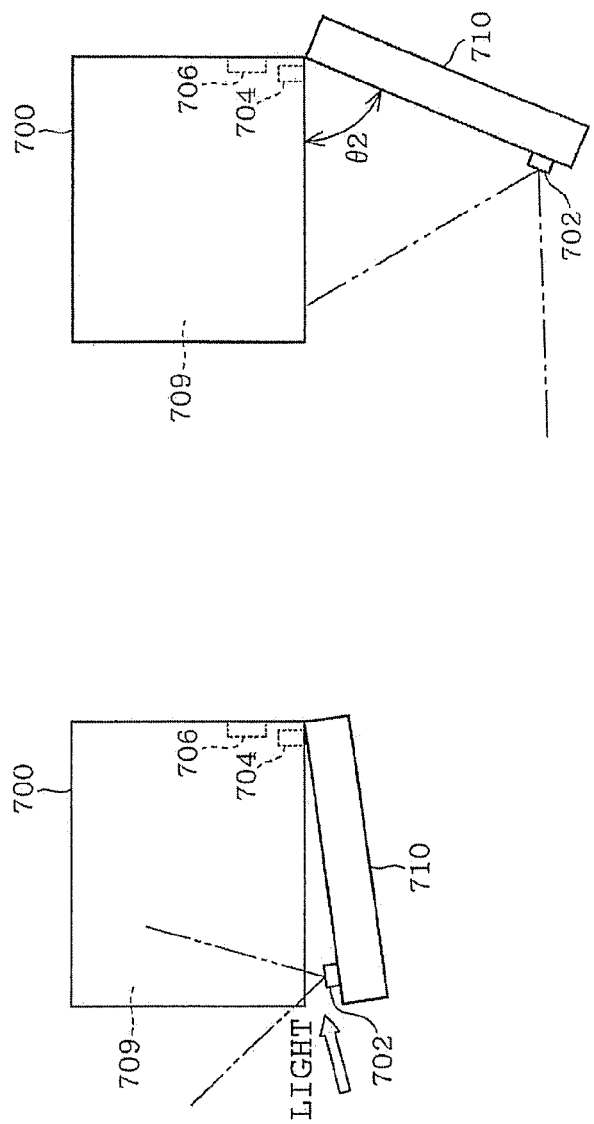

FIGS. 32A and 32B schematically illustrate the process of opening a door in the third embodiment (part 2).

Figure 33A:
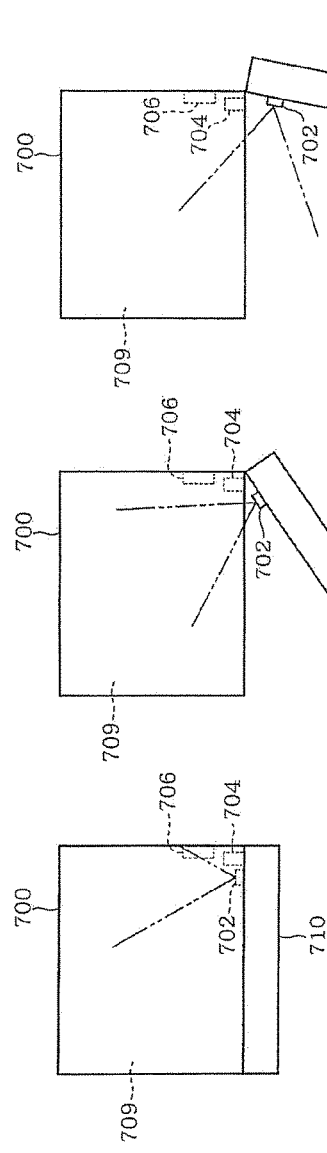
Figure 33B:
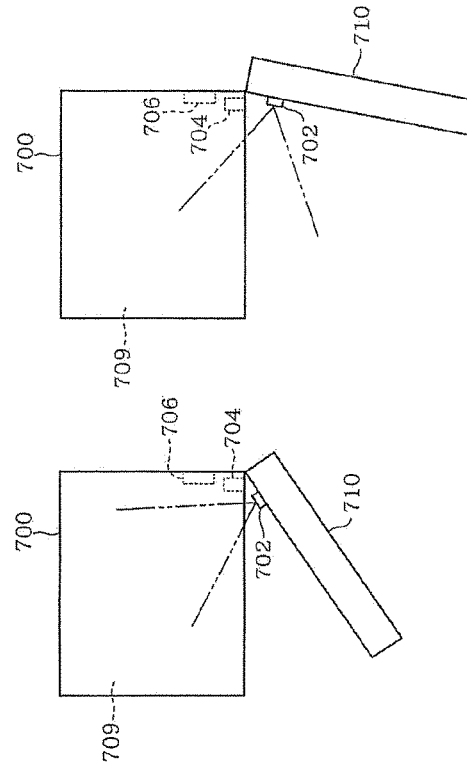
Figure 33C:
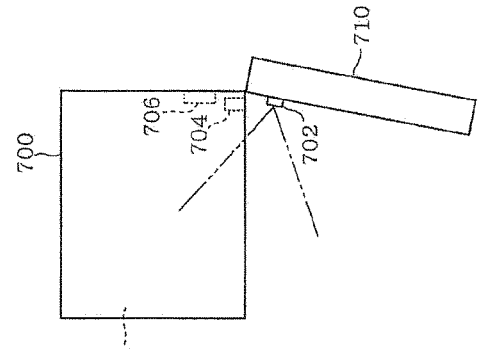

FIGS. 33A-33c schematically illustrate the process of opening a door in the third embodiment (part 3).

FIGS. 34A-34E illustrate one example of a storage amount estimation performed in the third embodiment (part 1).

Figure 35A:
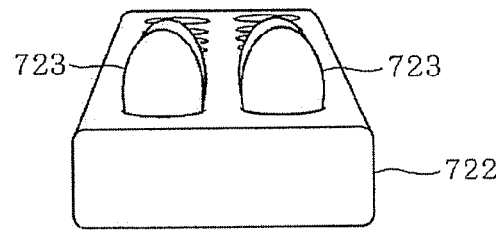
Figure 35B:
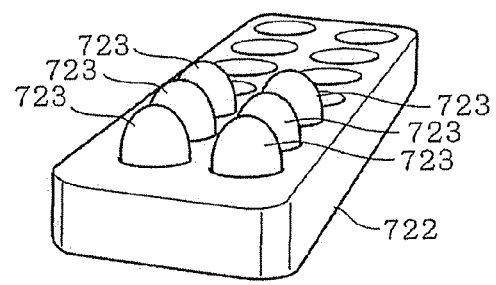

FIGS. 35A and 35B illustrate one example of a storage amount estimation performed in the third embodiment (part 2).

FIGS. 36A-36D schematically illustrate the process of opening a door in a fourth embodiment.

Figure 37A:
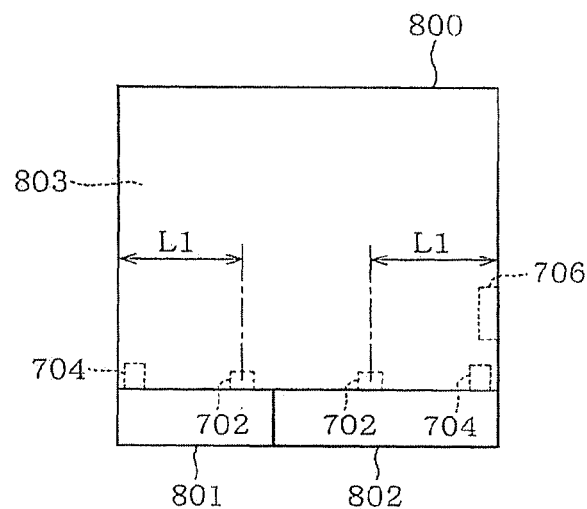
Figure 37B:
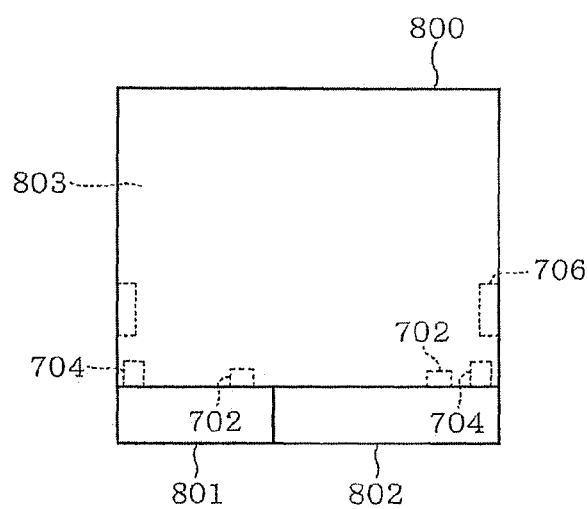
Figure 37C:
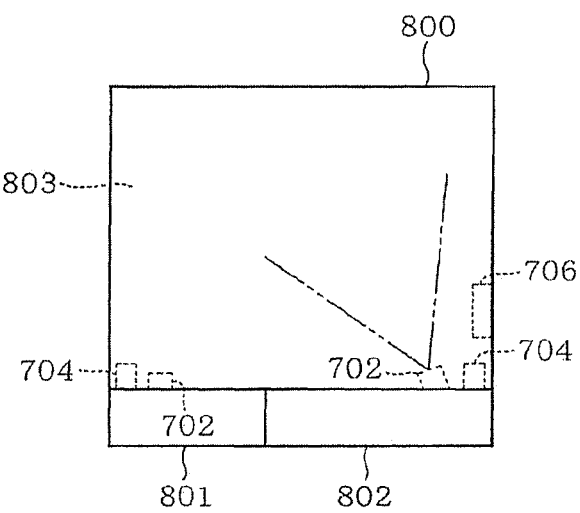

FIGS. 37A-37C is one example of a location for installing an image capturing unit of a fourth embodiment.

Figure 38A:
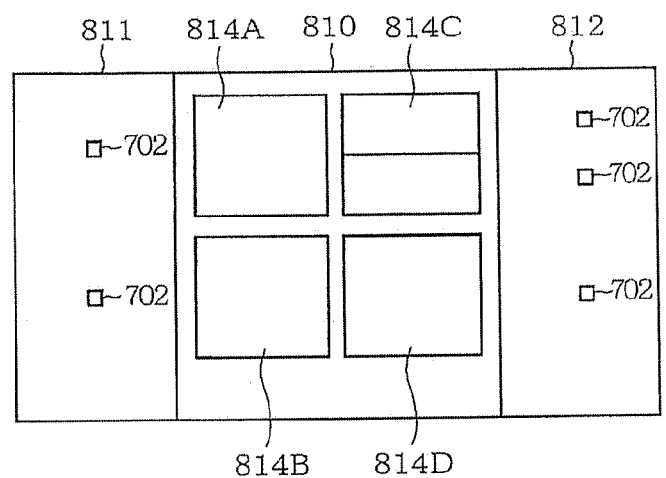
Figure 38B:
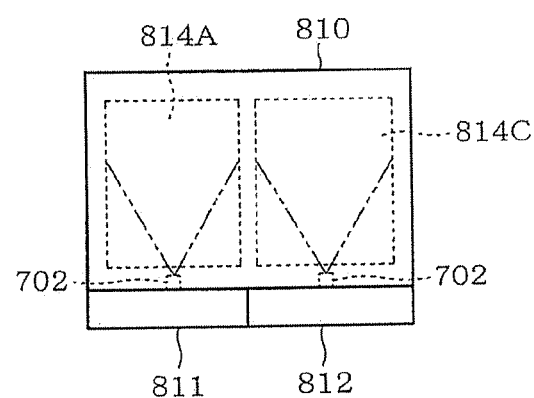

FIGS. 38A and 38B schematically illustrate one example of a structure of a refrigerator of the fourth embodiment (part 1).

Figure 39A:
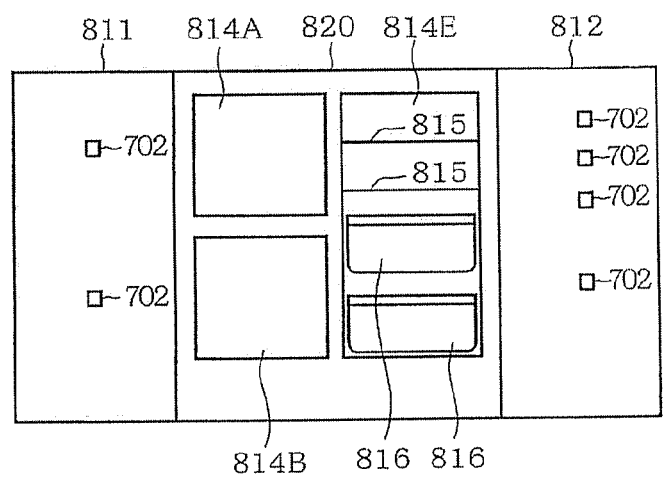
Figure 39B:
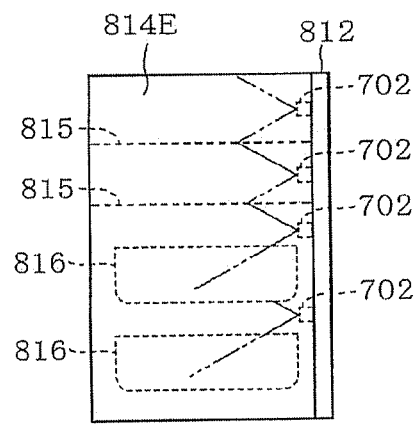

FIGS. 39A and 39B schematically illustrate one example of a structure of a refrigerator of the fourth embodiment (part 2).

FIGS. 40A-40C schematically illustrate one example of a structure of a refrigerator of the fifth embodiment.

FIGS. 41A-41C illustrate one example of a location for installing an image capturing camera of the fifth embodiment (part 1).

Figure 42A:
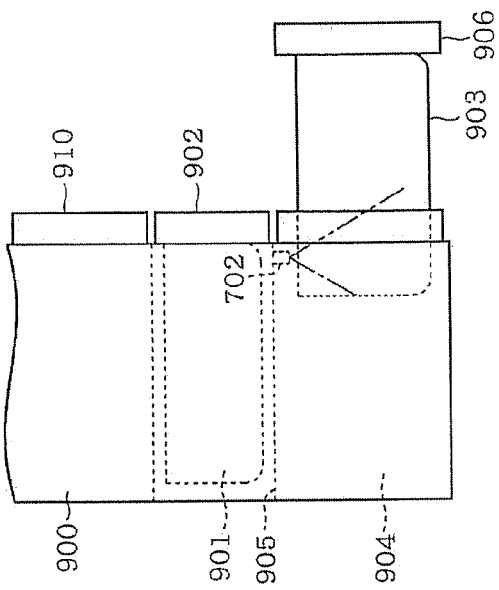
Figure 42B:
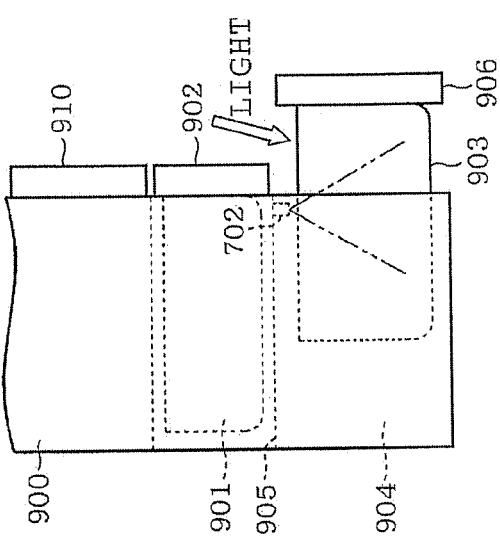
Figure 42C:
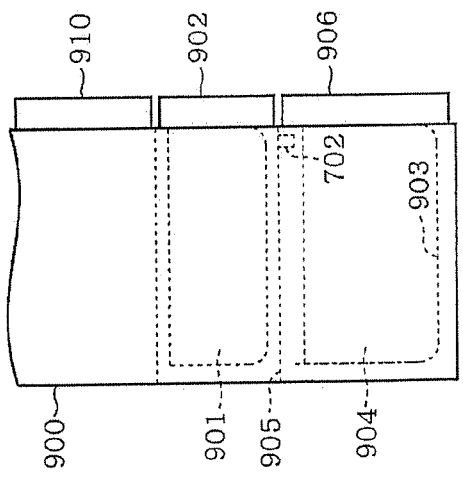

FIGS. 42A-42C illustrate one example of a location for installing the image capturing camera of the fifth embodiment (part 2).

Figure 43:
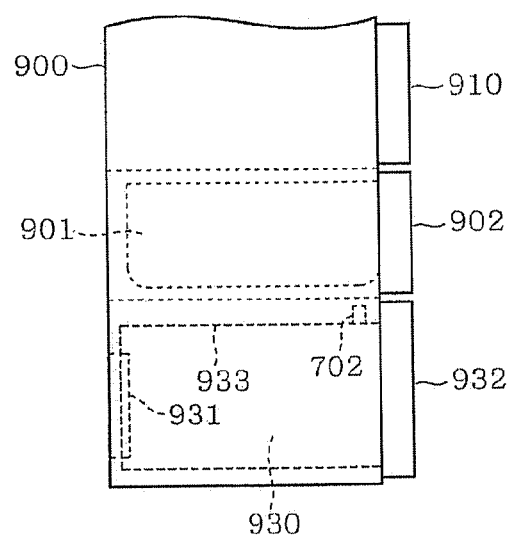

FIG. 43 illustrates one example of a location for installing the image capturing camera of the fifth embodiment (part 3).

Figure 44:
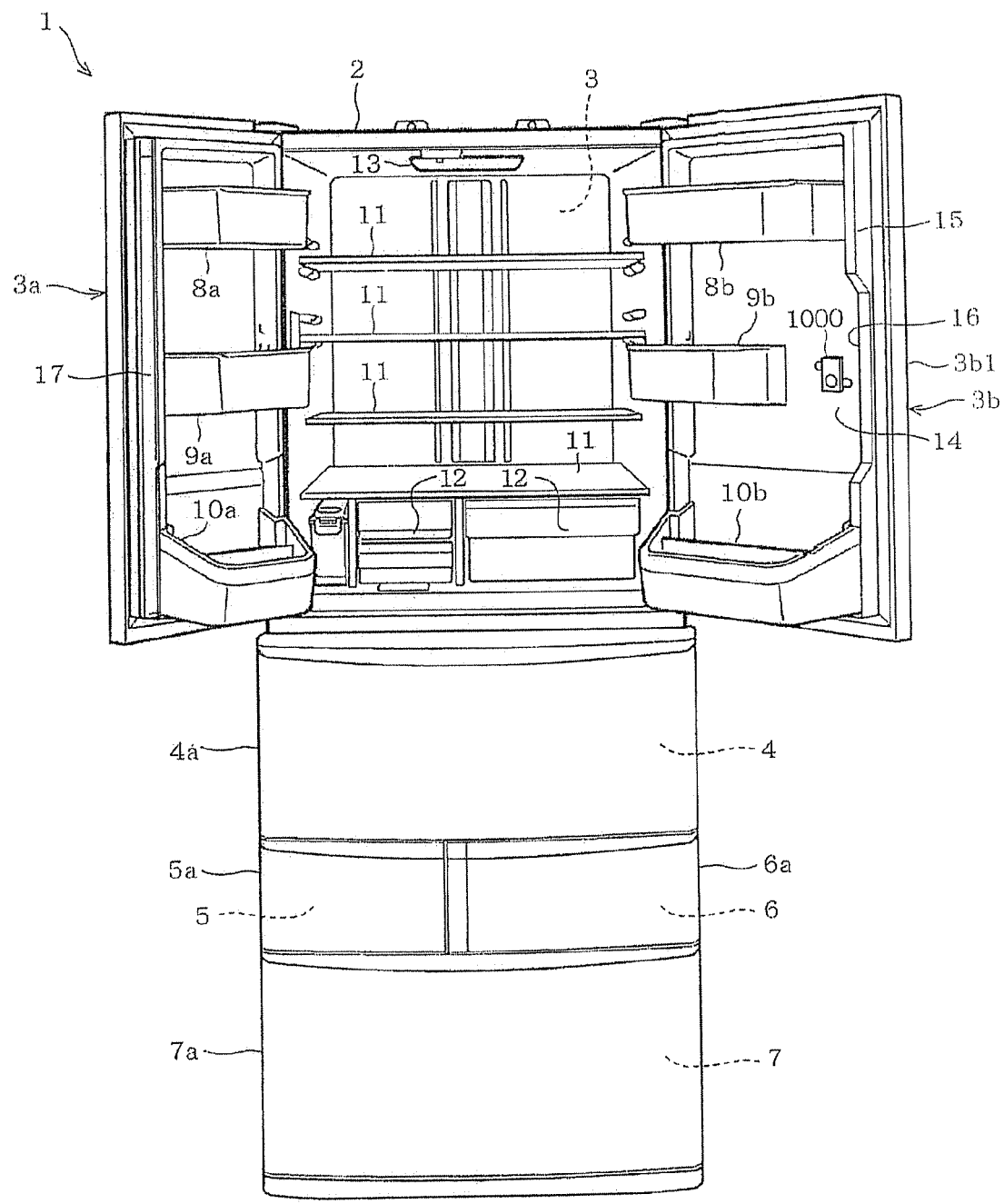

FIG. 44 schematically illustrates a refrigerator of a sixth embodiment.

Figure 45A:
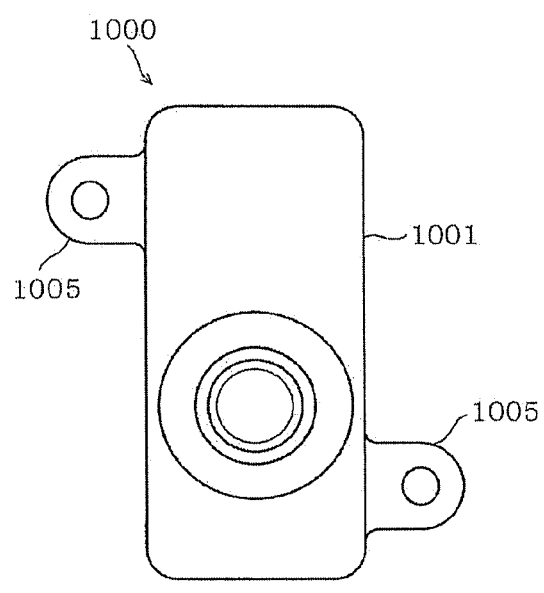
Figure 45B:
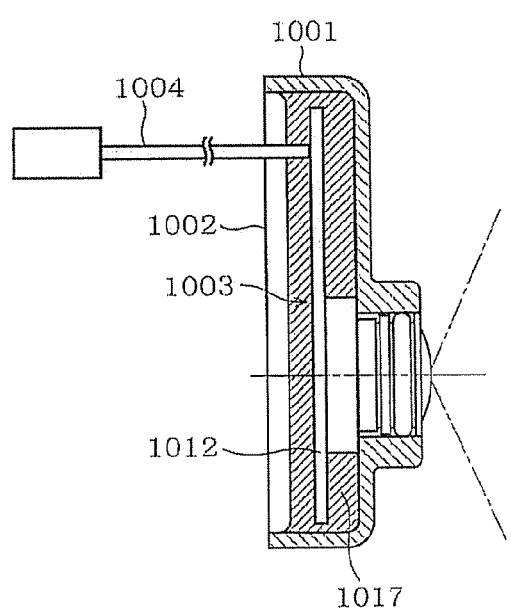

FIGS. 45A and 45B schematically illustrate a structure of a camera unit of the sixth embodiment.

Figure 46:
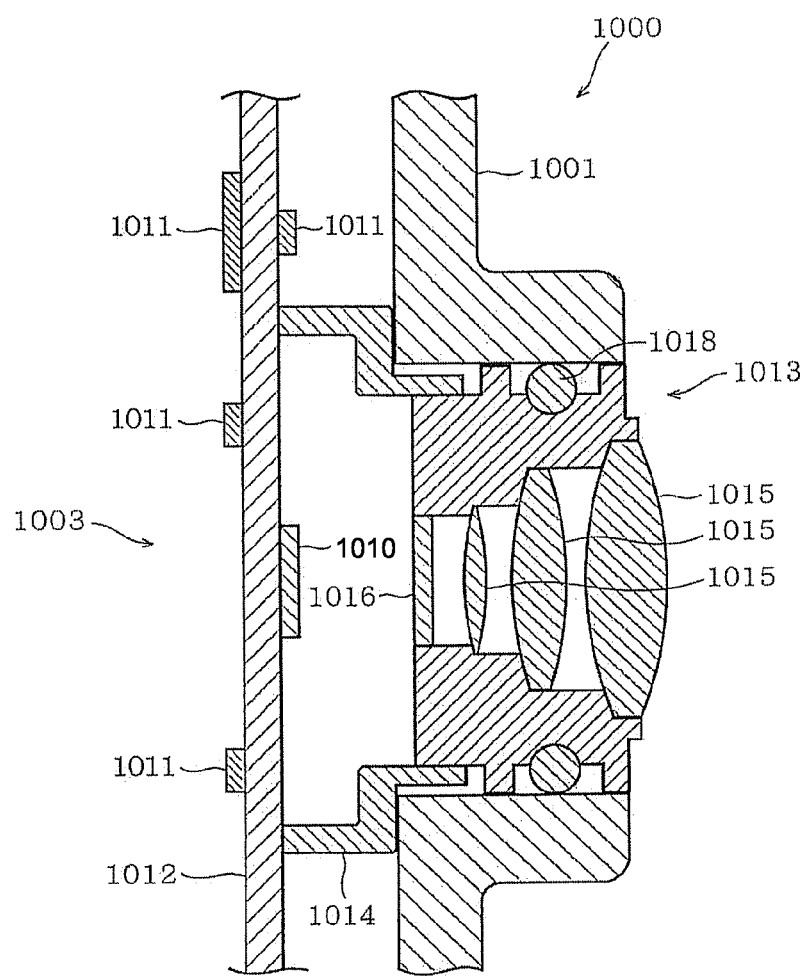

FIG. 46 schematically illustrates a lens unit of the sixth embodiment.

Figure 47A:
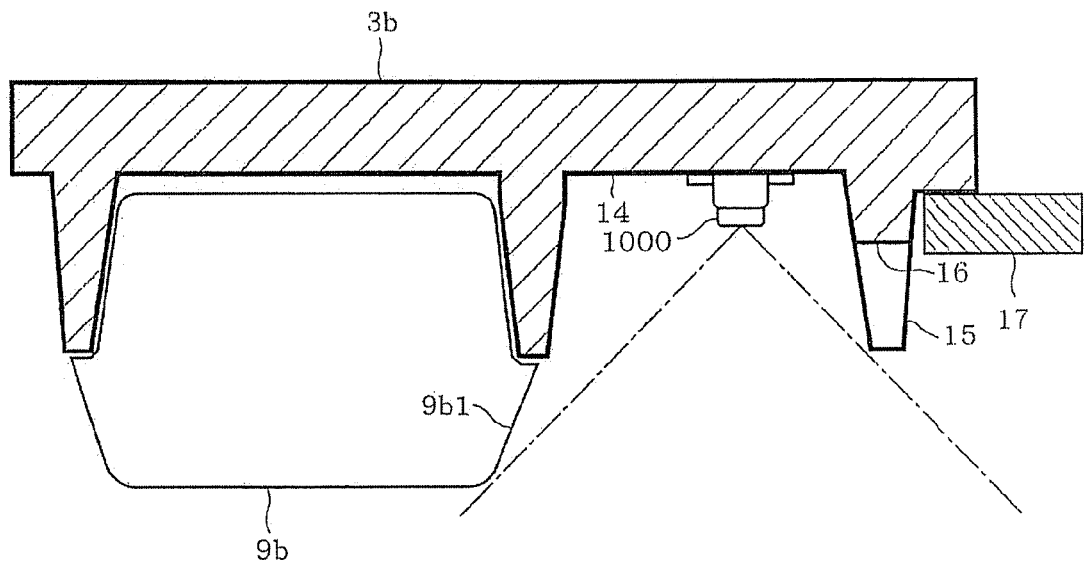
Figure 47B:
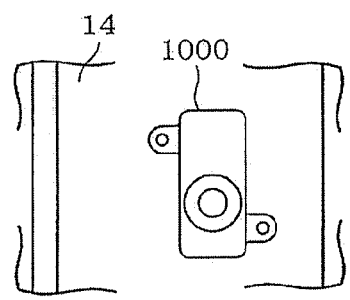

FIGS. 47A and 47B schematically illustrate the mode of attachment of EXAMPLE 1 of the six embodiment (part 1).

Figure 48:
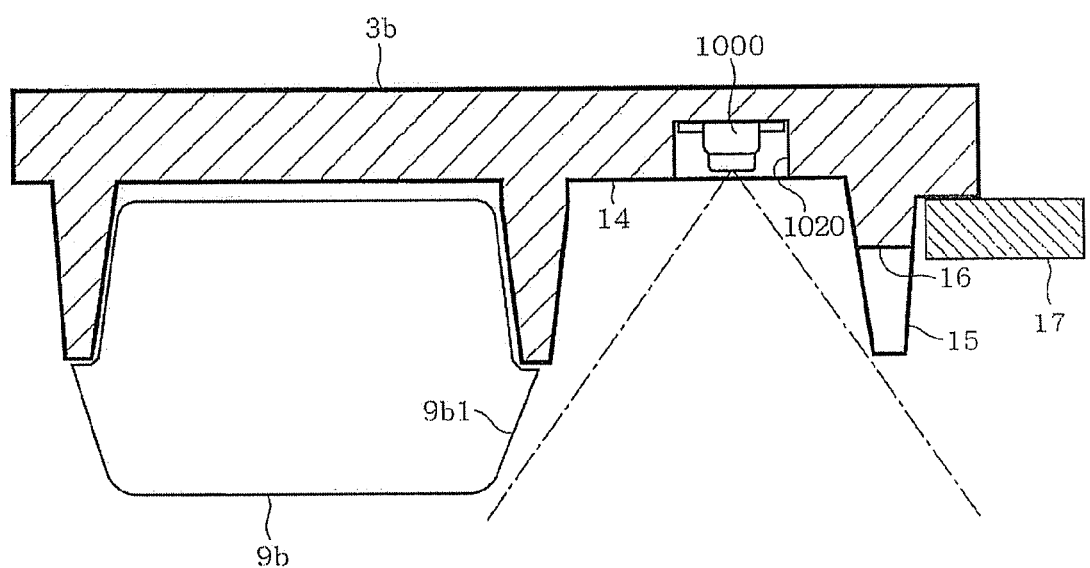

FIG. 48 schematically illustrates the mode of attachment of EXAMPLE 2 of the six embodiment (part 2).

Figure 49:
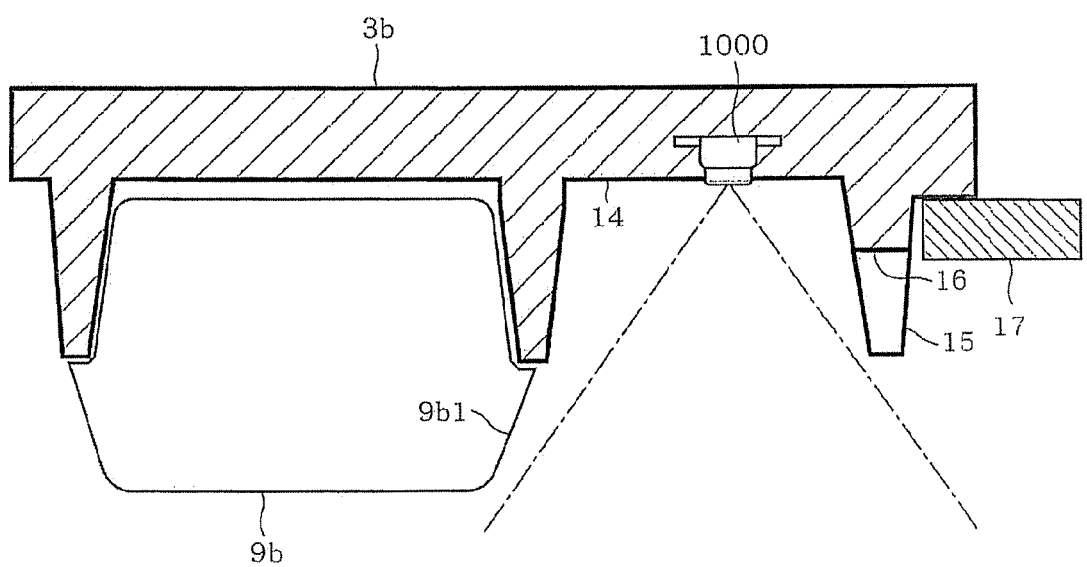

FIG. 49 schematically illustrates the mode of attachment of EXAMPLE 2 of the six embodiment (part 3).

Figure 50A:
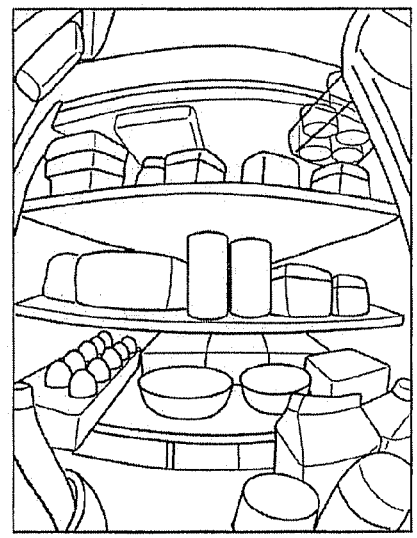
Figure 50B:
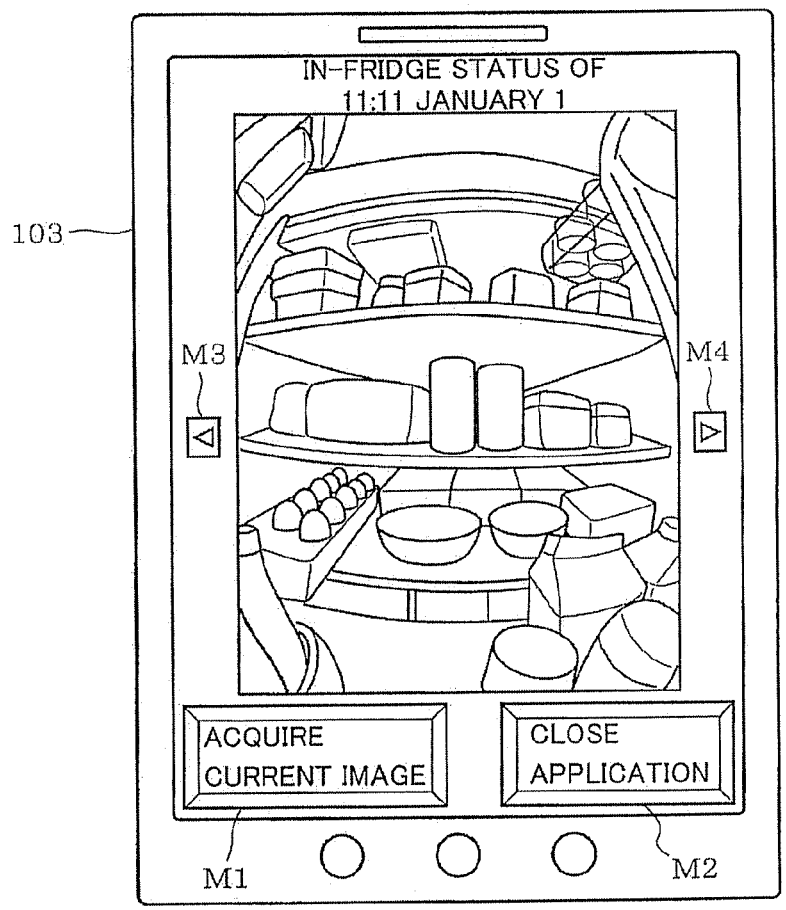

FIGS. 50A and 50B schematically illustrate the result of image capturing and how the result of image capturing is displayed in the sixth embodiment.

Figure 51A:
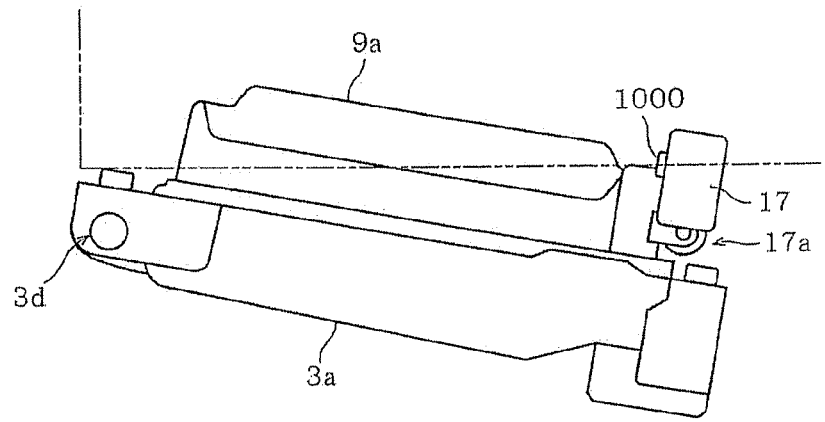
Figure 51B:
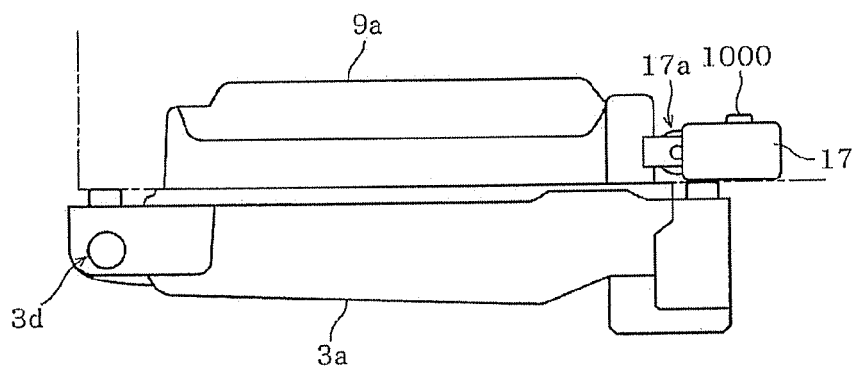

FIGS. 51A and 51B schematically illustrate how a vertical partition of EXAMPLE 4 is rotated in the sixth embodiment.

Figure 52A:
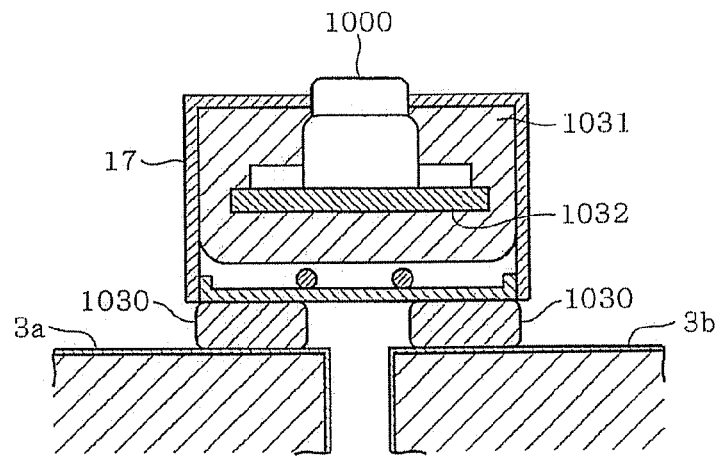
Figure 52B:
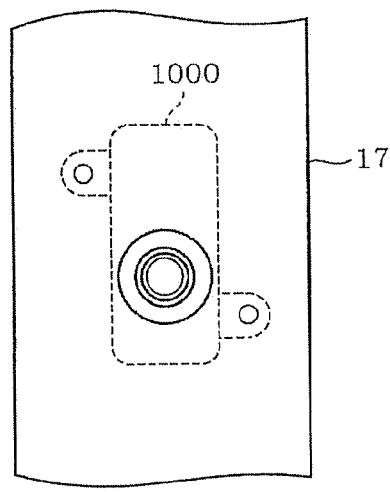

FIGS. 52A and 52B schematically illustrate the mode of attachment of EXAMPLE 4 of the six embodiment (part 1).

FIG. 53 schematically illustrates the mode of attachment of EXAMPLE 4 of the six embodiment (part 2).

Figure 54:
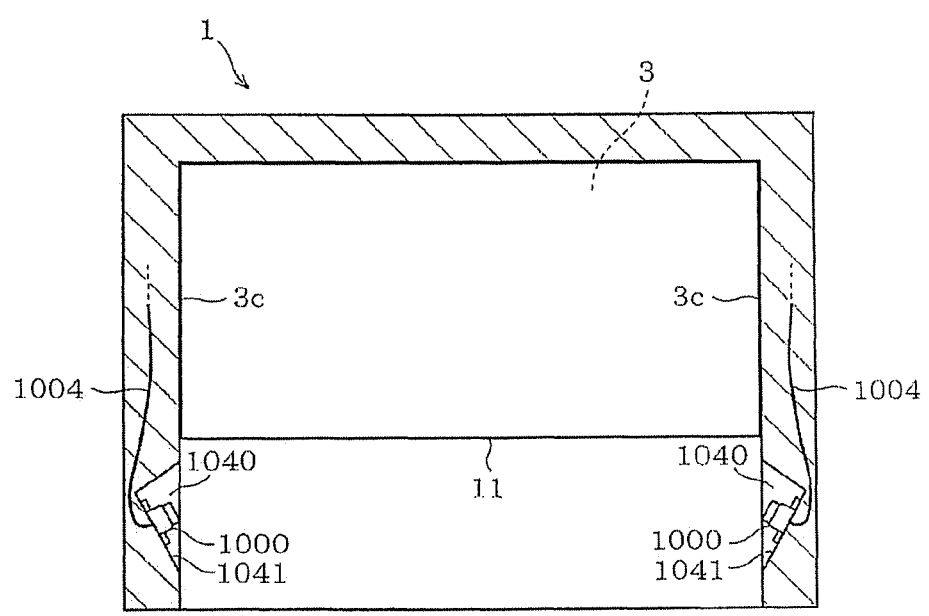

FIG. 54 schematically illustrates the mode of attachment of EXAMPLE 5 of the six embodiment.

Figure 55A:
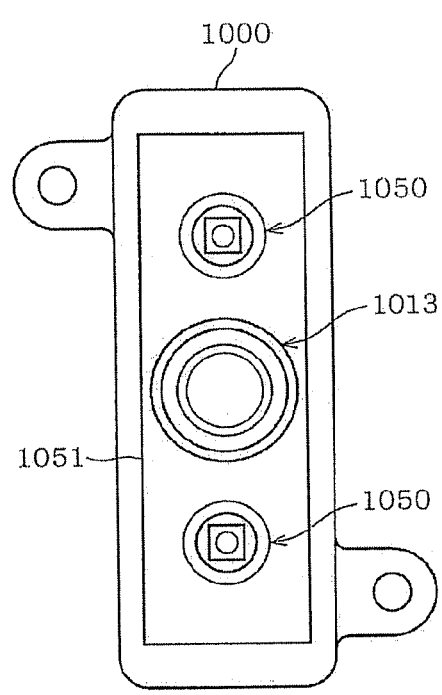
Figure 55B:
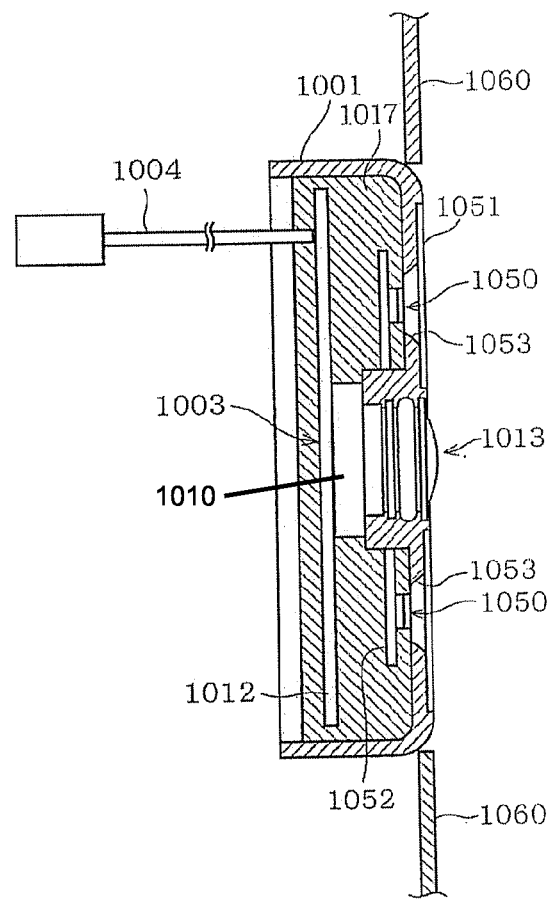

FIGS. 55A and 55B schematically illustrate a configuration of a camera unit of EXAMPLE 6 of the sixth embodiment.

Figure 56:
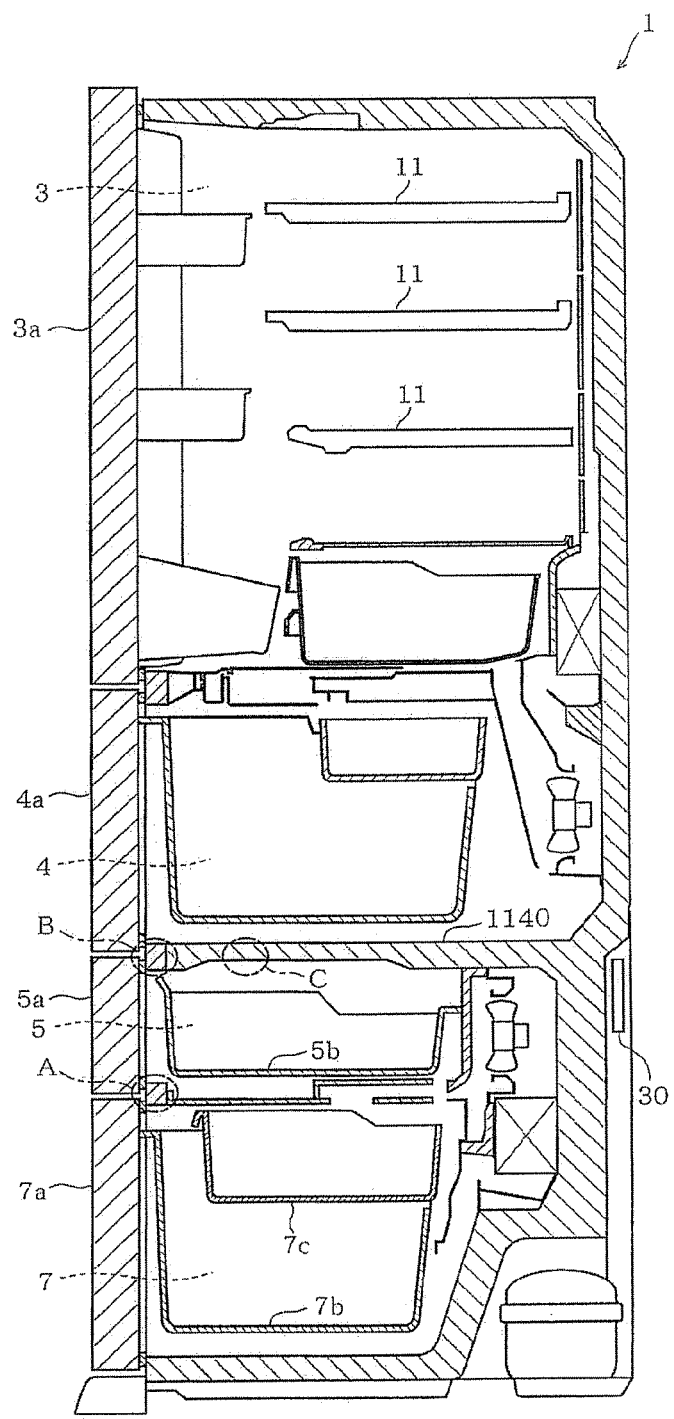

FIG. 56 schematically illustrates a refrigerator of a seventh embodiment.

Figure 57:
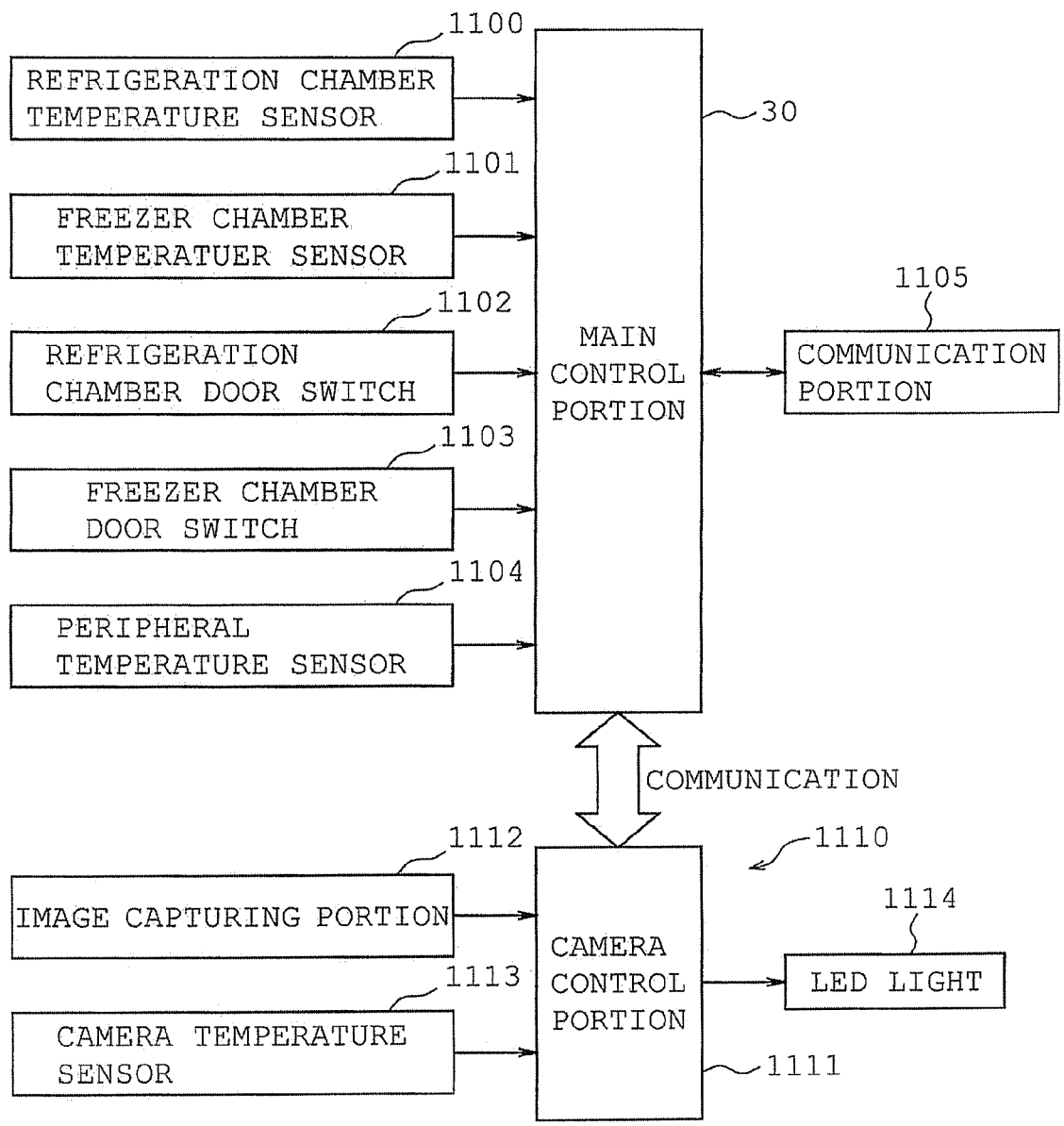

FIG. 57 schematically illustrates an electrical configuration of a refrigerator and a camera module of the seventh embodiment.

Figure 58:
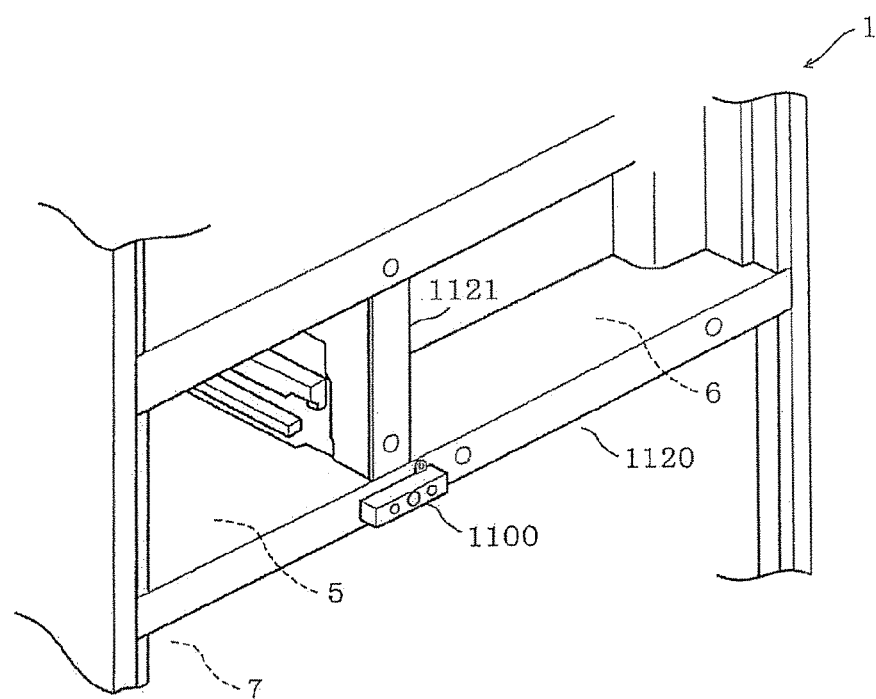

FIG. 58 schematically illustrates how the camera unit of EXAMPLE 1 of the seventh embodiment is attached (part 1).

Figure 59:
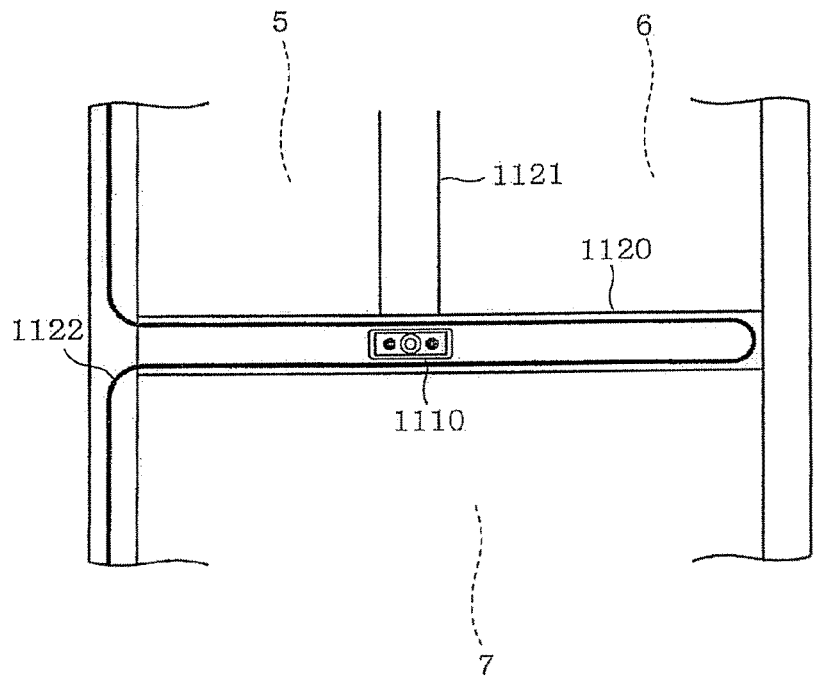

FIG. 59 schematically illustrates how the camera unit of EXAMPLE 1 of the seventh embodiment is attached (part 2).

Figure 60:
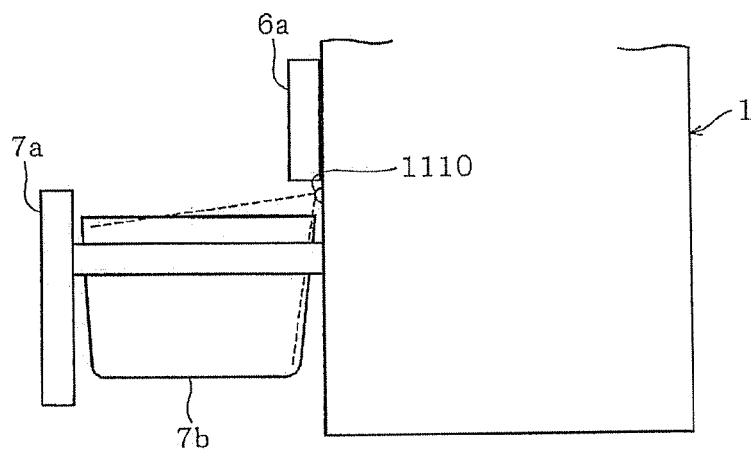

FIG. 60 schematically illustrates how the camera unit of EXAMPLE 1 of the seventh embodiment is attached (part 3).

Figure 61A:
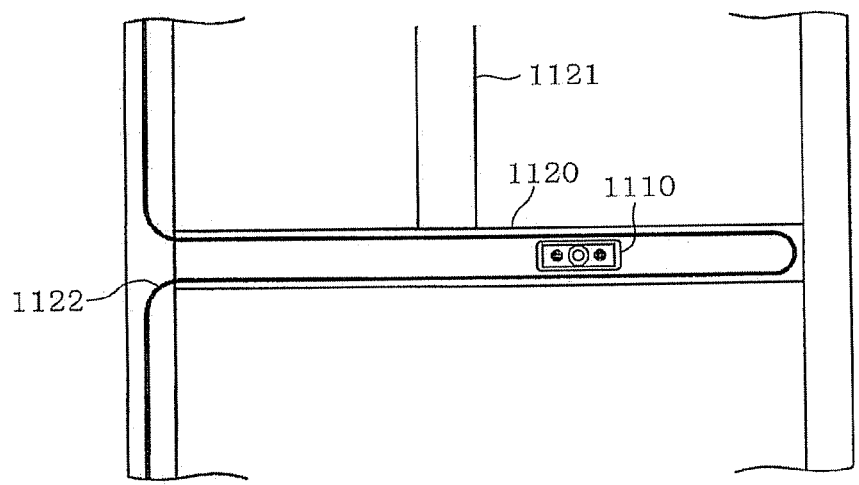
Figure 61B:
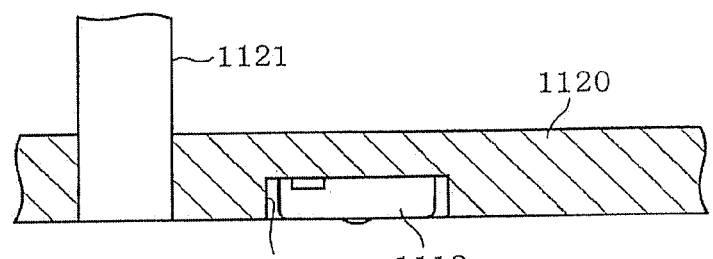

FIGS. 61A and 61B schematically illustrate how the camera unit of EXAMPLE 2 of the seventh embodiment is attached (part 1).

Figure 62A:
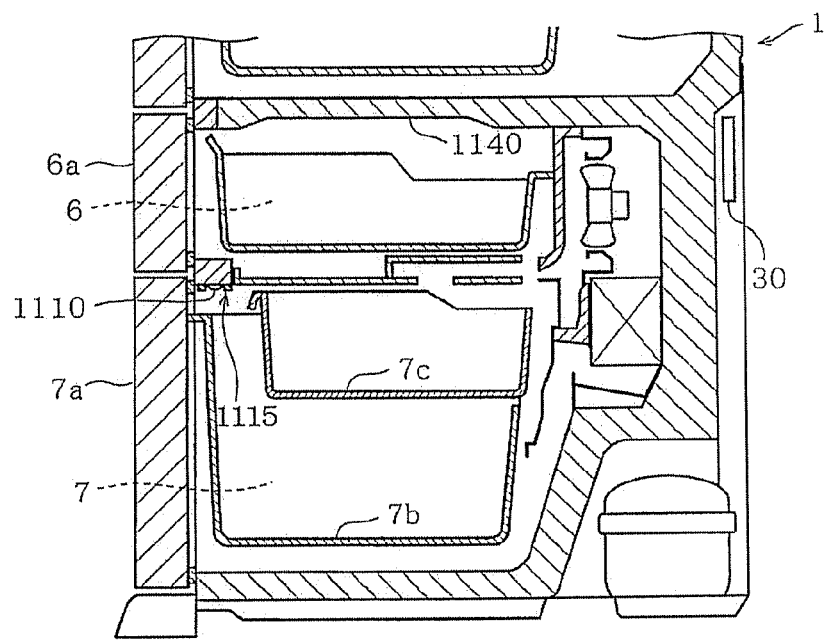
Figure 62B:
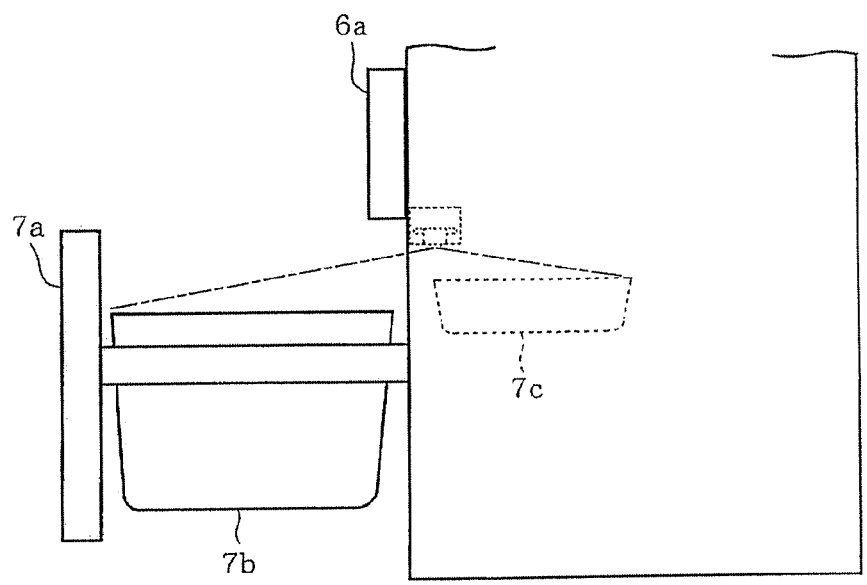

FIGS. 62A and 62B schematically illustrate how the camera unit of EXAMPLE 3 of the seventh embodiment is attached.

Figure 63:
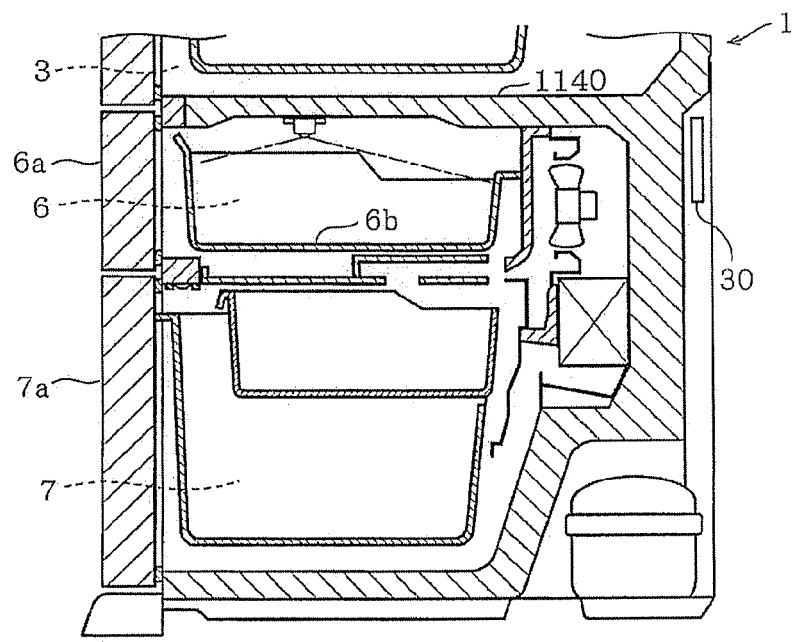

FIG. 63 schematically illustrates how the camera unit of EXAMPLE 4 of the seventh embodiment is attached.

Figure 64:
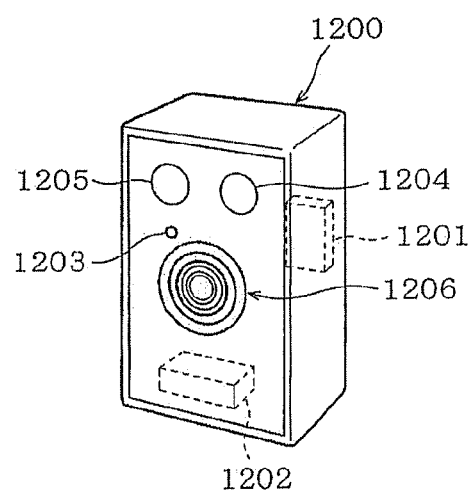

FIG. 64 schematically illustrates a camera unit of EXAMPLE 5 of the seventh embodiment.

EMBODIMENTS OF THE INVENTION

A refrigerator, a camera device, a refrigerator door pocket, a communication terminal, a home appliance network system, and an in-fridge image displaying program will be described through the embodiments given below. Elements that are substantially identical across the embodiments are represented by identical reference symbols and are not described in detail.

First Embodiment

A first embodiment will be described hereinafter with reference to FIGS. 1 to 12.

Figure 1:
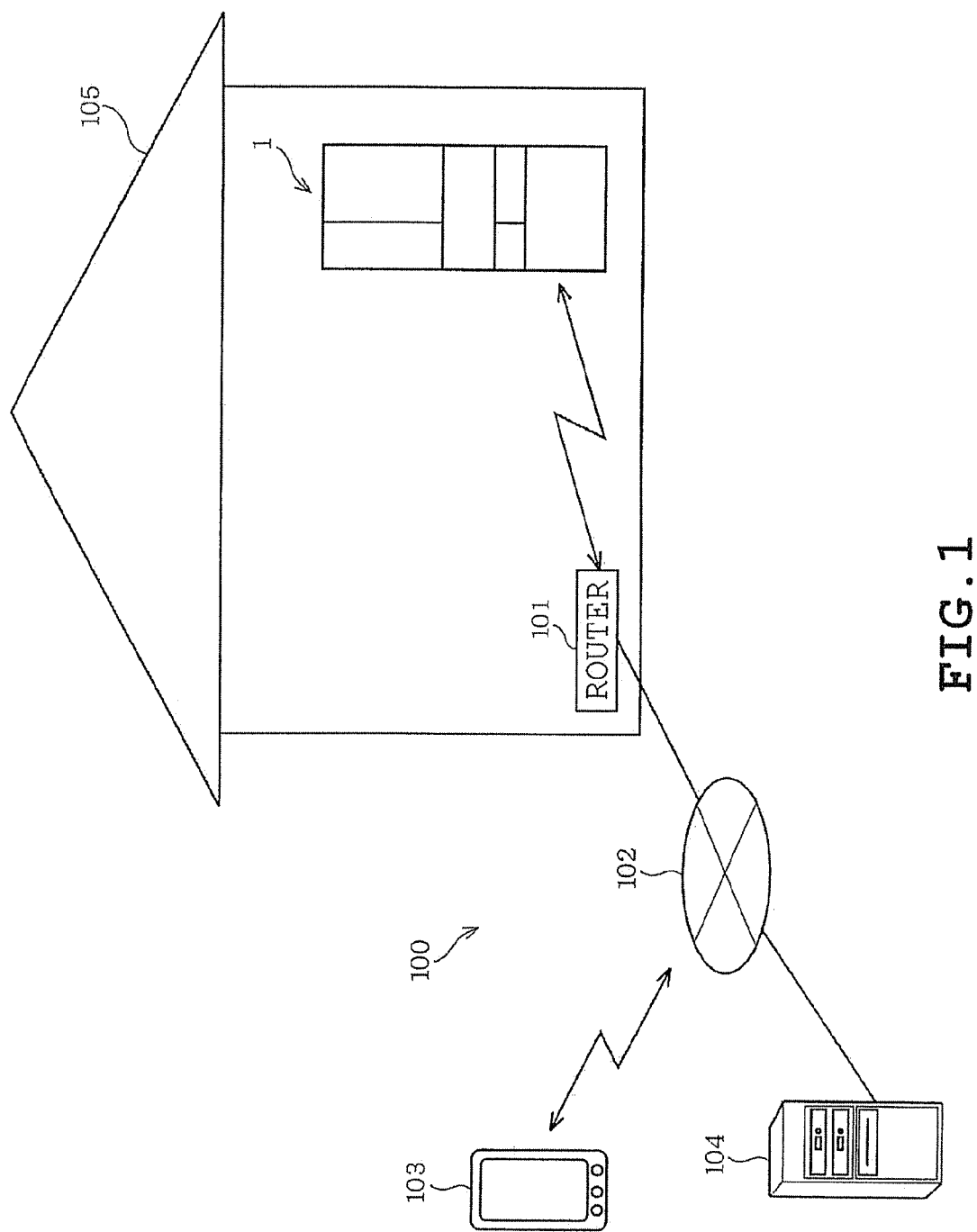

In the present embodiment illustrated in FIG. 1, a home appliance network system 100 employs a refrigerator 1. The refrigerator 1 is connected communicably with an external communication line 102 via a router 101. The router 101 serves as the so-called wireless access point and is connected communicably with the refrigerator 1 by a wireless communication method. The refrigerator 1 exchanges various information with a communication terminal 103 and a server 104 (both being an example of an external device) connected to the communication line 102. In the home appliance network system 100 of the present embodiment, the image information, capturing images of the interior of the refrigerator 1, is stored to the server 104 and the communication terminal 103 is configured to retrieve the in-fridge images from the server 104. The image information is information (data) given in the form of images that depict the fridge interior. The image information may come in any data format as long as it can be transmitted via a communication unit and ultimately allows the fridge interior to be visualized. Examples of the image information includes: an image data (still image, moving image) of known formats such as a bit map format and JPEG/MPEG format; compressed/encrypted data; and data converted by image processing as in the second embodiment. Examples of the communication terminal 103 envisaged in the present embodiment include the so-called smart phone (highly functional mobile phone) which may be carried outside a residence 105, a tablet PC (Personal Computer), and a television connected to the home appliance network system 100.

Figure 2:
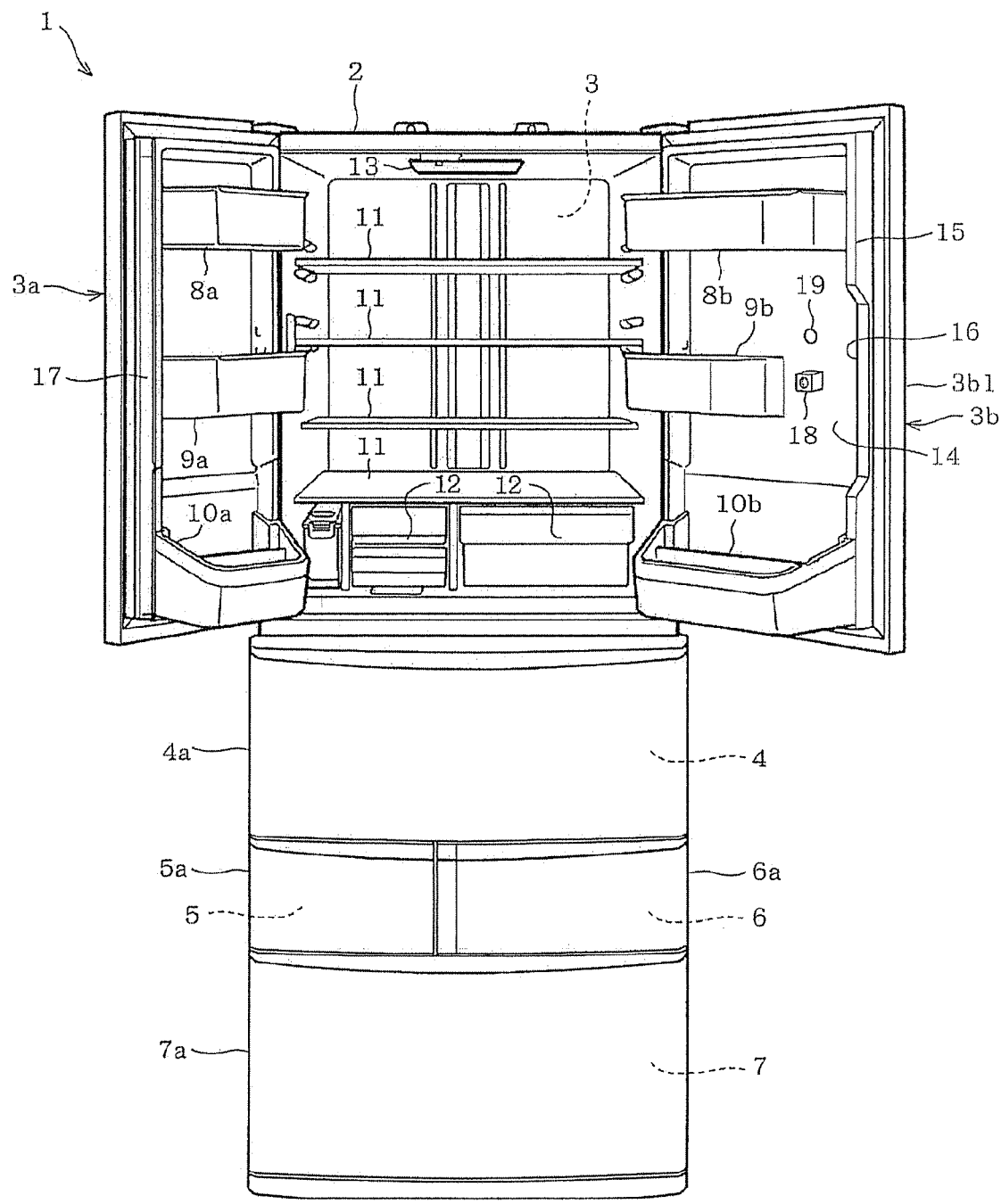

As illustrated in FIG. 2, the refrigerator 1 is provided with storage chambers for storing food namely, a refrigeration chamber 3, a vegetable chamber 4, an ice maker chamber 5, an upper freezer chamber 6, and a lower freezer chamber 7 in the listed sequence from the upper side of a fridge body 2. The compartment of the refrigeration chamber 3 and the vegetable chamber and the compartment of the ice maker chamber 5 and the upper freezer chamber 6 are divided by a thermally insulative partition wall. The refrigeration chamber 3 is double doored and is opened/closed by a left-side door 3a and a right-side door 3b. The vegetable chamber 4, the ice maker chamber 5, the upper freezer chamber 6, and the lower freezer chamber 7 are opened/closed by drawer-type doors 4a, 5a, 6a, and 7a.

Figure 4:
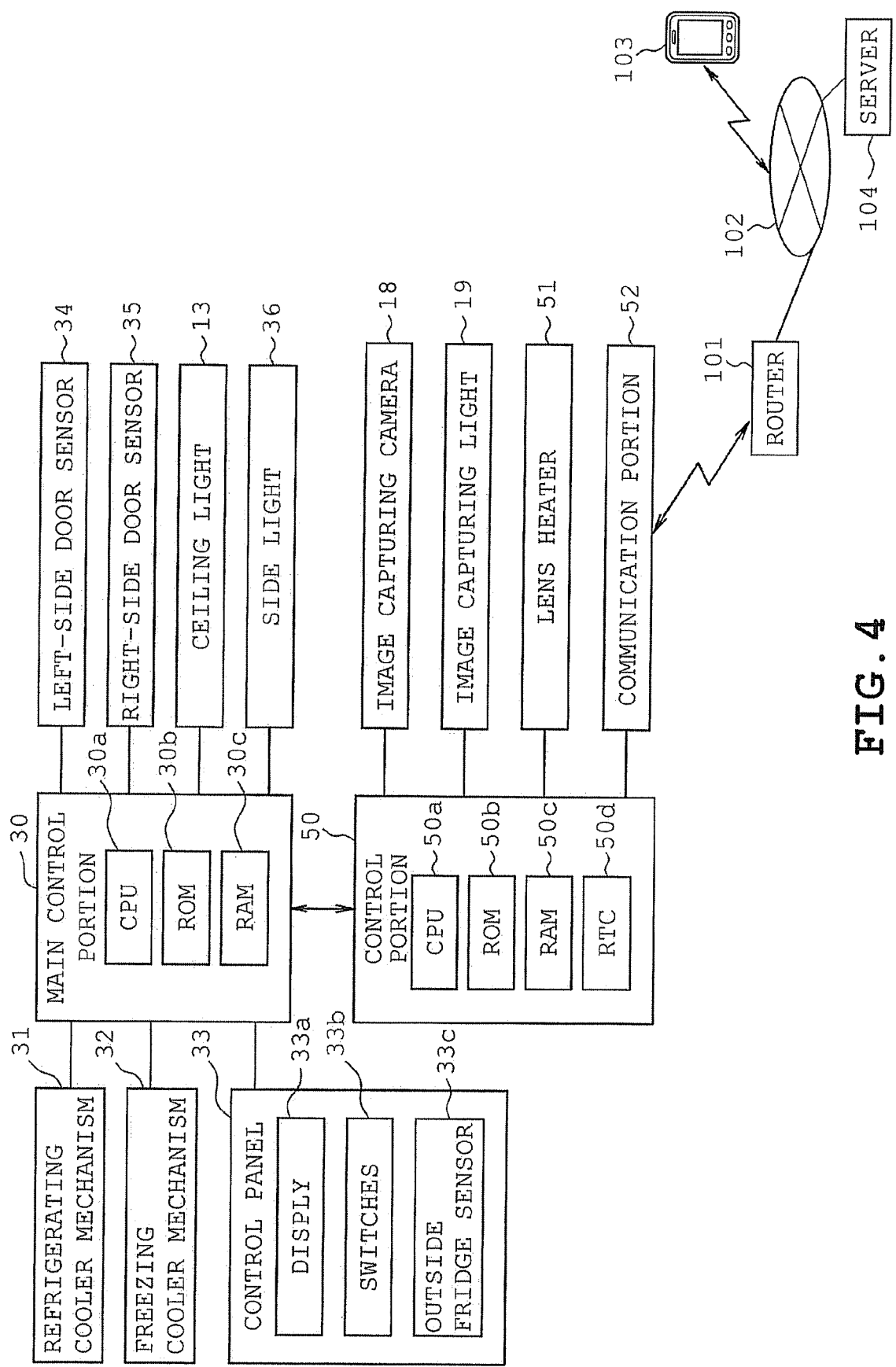

Each of the doors are provided with a sensor for detecting the opened/closed state (See FIG. 4. However, FIG. 4 only illustrates a left-side door sensor 34 for the left-side door 3a and a right-side door sensor 35 for the right-side door 3b). The structure of the refrigerator 1 illustrated in FIG. 2 is only an example and thus, the location of the storage chambers may be rearranged or the upper freezer chamber 6 may be configured as a switchover chamber which may be switched to be used for refrigeration or for freezing purposes.

The left-side door 3a of the refrigeration chamber 3 is provided with a door pocket 8a, a door pocket 9a, and a door pocket 10a in the listed sequence from the upper side thereof. The right-side door 3b is provided with a door pocket 8b, a door pocket 9b, and a door pocket 10b in the listed sequence from the upper side thereof. The refrigeration chamber 3 contains plural shelves 11 formed by a transparent material such as glass and is provided with a special purpose chamber 12 such as an egg container chamber and a chiller chamber in the lowermost compartment. A ceiling light 13 serving as a lighting unit is provided in the upper portion of the refrigeration chamber 3. A side light 36 (see FIG. 4) is further provided in the side surface of the refrigeration chamber 3. The ceiling light 13 is provided for lighting the upper portion of the fridge interior and the side surface light 36 is provided for lighting the central portion and the lower portion of the fridge interior, and thus are provided for lighting specific portions of the fridge interior.

The front surface of the left-side door 3a and the right-side door 3b of the refrigeration chamber 3 are covered by a glass plate 3b1 formed of an insulative glass and the interior of the left-side door 3a and the right-side door 3b are packed with a fill material such as urethane serving as a thermal insulation material. As known, an inner plate 14 made of a nonmetallic resin and a vertical plate 15 are provided on the inner side of the left-side door 3a and the right-side door 3b. That is, the front surface side of the left-side door 3a and the right-side door 3b are configured by the glass plate 3b1 being a nonmetallic material allowing permeation of electric waves. The door pockets 8 to 10 are provided on the inner plate 14. The vertical plate 15 has a recess portion 16 formed thereto so as to be located near a mid portion thereof as viewed in the vertical direction and near an opening end side of the right-side door 3b as viewed in the lateral direction (more specifically, near the location where a later described image capturing camera 18 is provided). The recess portion 16 is provided so as not to block the sight of the image capturing camera 18. Further, the left-side door 3a is provided with a revolving vertical partition 17 provided so as to fill the clearance from the right-side door 3b. Door 4a, etc. of the vegetable chamber 4 has its front surface covered by glass plate and its interior packed with urethane serving as a thermal insulation material as was the case for the right-side door 3b.

As illustrated in FIG. 2, the image capturing camera 18 and an image capturing light 19 are provided on the inner plate 14 of the right-side door 3b (on the door which is not vertically partitioned). That is, in the present embodiment, the inner plate 14 serves as one example of a receiving portion. The image capturing camera 18 is provided with an image capturing element such as a CCD or CMOS and is configured to capture in-fridge images from the door side. The image capturing camera 18 is provided with a wide-angle lens having a view angle of approximately 120 degrees. The image capturing camera 18 is provided at a location adjacent to a mid-level door pocket 9b and closer to the left-side door 3a as compared to the door pocket 9b. That is, the image capturing camera 18 is provided near the vertical center of the refrigeration chamber 3 and near the lateral center of the refrigeration chamber 3. Thus, when the right-side door 3b is closed, the view of the image capturing camera 18 is capable of capturing images of substantially the entirety of the interior of the refrigeration chamber 3 as illustrated in the later described FIG. 7 and at least some of the door pockets 8 to 10. By comparison, web cameras in general have a view angle of approximately 55 degrees.

Figure 3:
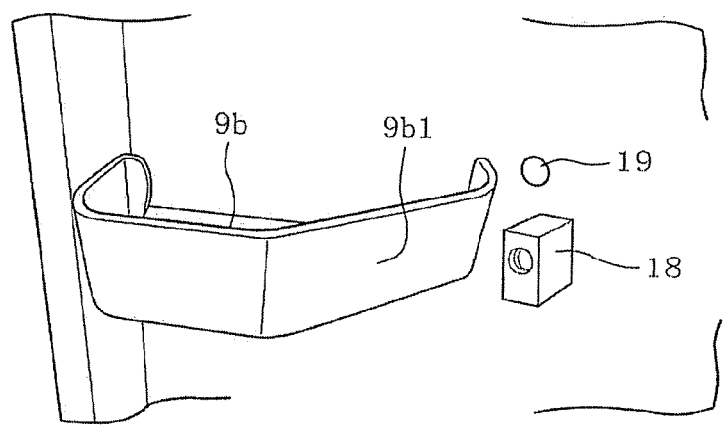

The door pocket 9b located adjacent to the image capturing camera 18 is shaped so that one side proximal to the image capturing camera 18 is sloped as illustrated in FIG. 3. That is, a notch 9b1 is formed in the door pocket 9b, which is normally shaped to exhibit a square (rectangular) storage portion, to secure a view for the image capturing camera 18 employing a wide-angle lens. FIG. 3, etc. schematically illustrate the image capturing camera 18 and thus, differs from the actual size and shape of the image capturing camera 18. The image capturing camera 18, being secured to the refrigerator 1 in the present embodiment, may be configured to be removable from the refrigerator 1 (so as to be mounted as an optional accessory after purchasing the refrigerator 1 for example) as described in the later described second embodiment.

For example, the image capturing light 19 may be provided above the image capturing camera 18. That is, the image capturing light 19 is disposed so that its lighting direction is oriented in the same direction as the view of the image capturing camera 18 so that the light illuminated by the image capturing camera does not directly enter the image capturing camera 18 (so as not to be in confrontation). In other words, the image capturing light 19 is disposed in a location which is difficult to provide back light to the image capturing camera 18 or which does not provide back light to the image capturing camera 18. The image capturing camera 18 is one example of an image capturing unit recited in the claims and the image capturing light 19 is one example of a lighting unit recited in the claims.

The refrigerator 1 is controlled by a main control portion 30 as illustrated in FIG. 4. The main control portion 30 is configured by a microcomputer provided with components such as a CPU 30a, a ROM 30b, and a RAM 30c and controls the entire refrigerator 1 by executing a computer program stored for example in the ROM 30b, etc.

The main control portion 30 is connected to a refrigerating cooler mechanism 31 and freezing cooler mechanism 32 configured by a known refrigeration cycle, etc.; a control panel 33 used for inputting settings and operations to the refrigerator 1; the left-side door sensor 34; the right-side door sensor 35; the ceiling light 13; the side light, and the like. The refrigerator 1 is also provided with an in-fridge sensor, etc. not shown for detecting the temperature of the refrigeration chamber 3, the lower freezer chamber 7, and the like.

The control panel 33 is provided with a display 33a, switches 33b, and outside fridge sensor 33c. The display 33a presents various information such as the operational status of the refrigerator 1. The switches 33b input settings and operations made by the user to the refrigerator 1. The switches 33b include a go-out switch for switching the operating mode of the refrigerator 1 when the user goes outdoor. The go-out switch may have options such as "power save", "leave home", etc. that, when selected, perform the relevant power saving modes. That is, since the refrigerator 1 will not be used when the user goes outdoor, the refrigerator 1 makes a transition to the power saving mode to reduce power consumption.

For example, when the "power save" option is selected, the refrigerator 1 makes minor adjustments in the in-fridge temperature so as not to affect the environment of food preservation, while also controlling the operational status of a heater for preventing dew condensation to make a transition to a power saving mode in which power consumption is reduced by approximately 10% from the normal operation mode. Alternatively, when the "leave home" option is selected, the refrigerator 1 reduces the number of times of automatic ice making to make a transition to a power saving mode in which power consumption is reduced from the normal operation mode. More specifically, the refrigerator 1 reduces the frequency of automatic ice making to once every 8 hours for example to reduce power consumption by approximately 20% from the normal operation mode.

The "power save" switch and the "leave home" switch provided in the refrigerator 1 serve as the go-out switch in the present embodiment. Alternatively, a dedicated go-out switch may be provided instead.

The outside fridge sensor 33c is formed of a temperature sensor, a humidity sensor, or the like and acquires information of the environment outside the refrigerator. The outside fridge sensor 33c is one example of an outside environment acquiring unit recited in the claims.

The main control portion 30 controls the operational status of the refrigerator 1 based on the environment inside the refrigerator acquired by the in-fridge sensor as well as the environment outside the refrigerator acquired by the outside fridge sensor 33c and based on the settings made from the control panel 33. Further, the main control portion 30 acquires the opened/closed status of the doors through the left-side door sensor 34 and the right-side door sensor 35. The main control portion 30 is connected communicably with the control portion 50 and is capable of transmitting the opened/closed status of the doors to the control portion 50 and receive instructions for illuminating the ceiling light 13, the side light 36, etc. from the control portion 50, etc.

The control portion 50 is configured by a microcomputer provided with a CPU 50a, a ROM 50b, a RAM 50c, and a real time clock (hereinafter referred to as RTC 50d) for acquiring time. The control portion 50 is connected to the image capturing camera 18, the image capturing light 19, a lens heater 51, and a communication portion 52.

The control portion 50 controls the timing and the environment in which the images of the fridge interior are captured by the image capturing camera 18 by executing a computer program stored in the ROM 50b for example. More specifically, the control portion 50 controls the timing of image capturing based on the opened/closed status of the doors received from the main control portion 30 and controls the environment of image capturing, i.e. the lighting status of the ceiling light 13, the image capturing light 19, etc. serving as the light source required in image capturing. The control portion 50 is one example of a control unit recited in the claims.

A description is given hereinafter on the timing of image capturing. When capturing images of the fridge interior, it is required to drive the image capturing camera 18 and illuminate the image capturing light 19, etc. That is, capturing images of the fridge interior requires power consumption. Thus, unnecessary power is consumed when image capturing is constantly enabled. The refrigerator 1 is configured to reduce power consumption by controlling the timing in which images of the fridge interior are captured and by controlling the environment of image capturing (i.e. illumination of the image capturing light 19) only when required so as to be synchronized with the controlled timing of image capturing.

The timing for capturing images of the fridge interior are preset to the following image capturing conditions 1 to 5 for example. When either of the conditions is met, the control portion 50 determines that a timing has arrived to capture an image of the fridge interior.

Image capturing condition 1: The timing in which either of the doors of the refrigeration chamber 3 is closed after being opened. That is, the timing in which the status of in-fridge food storage may have changed.

Image capturing condition 2: The timing in which either of the doors of the refrigeration chamber 3 is opened. That is, the timing in which the status of in-fridge food storage may thereafter change.

Image capturing condition 3: The timing in which instructions have been received from external devices such as a communication terminal.

Image capturing condition 4: When the go-out switch has been operated. Image may be captured at the timing when the go-out switch has been operated or at the timing when a predetermined standby time has elapsed after the go-out switch has been operated. Either of the timings can be preset as desired.

Image capturing condition 5: The timing when a predetermined time has elapsed after the door has been closed after being opened. (The present embodiment employs the timing in which a delayed image capturing time has elapsed which is a time period expected to be required to remove dew condensate from the wide angle lens of the image capturing camera 18). That is, the timing in which dew condensate is removed from the wide angle lens. The delayed image capturing time may be a fixed value or may be varied depending upon the temperature, humidity, etc. outside the refrigerator acquired by the outside fridge sensor 33c.

Image capturing condition 6:

The timing in which dew condensate is removed by the lens heater 51 from the wide angle lens of the image capturing camera 18 after the door has been closed after being opened. That is, the timing in which dew condensate is removed from the wide angle lens.

It is possible to employ either one of the image capturing conditions or a combination of the image capturing conditions if the conditions do not contradict with one another. The present embodiment employs condition 1, 3, 4, and 5.

The communication portion 52 is configured to communicate with the router 101 through wireless communication such as the so-called wireless LAN, Bluetooth (Registered Trademark), etc. More specifically, the communication portion 52 uploads the captured images of the fridge interior to the server 104 via the router 101 and the communication line 102. The communication portion 52 may employ a wired communication.

Figure 8A:
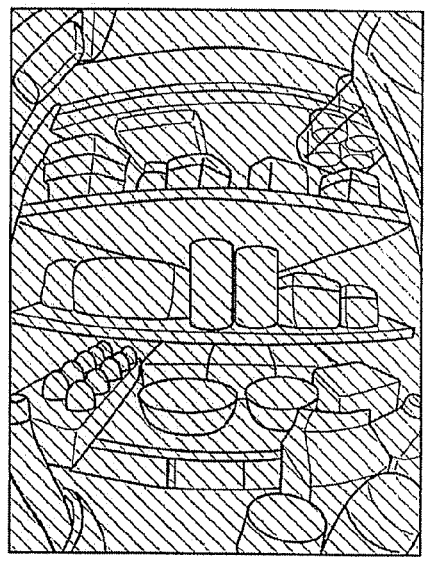
Figure 8B:
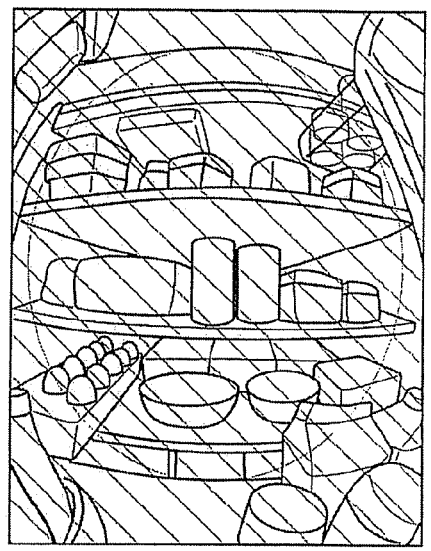
Figure 8C:
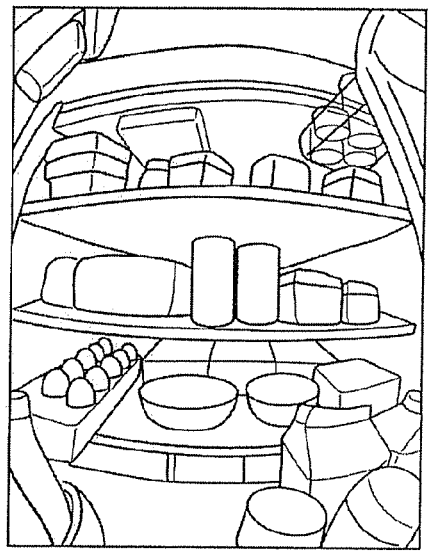

The lens heater 51 (one example of a removing unit) removes dew condensate from the lens surface as illustrated in the later described FIGS. 8A-8C by heating the wide angle lens of the image capturing camera 18. The lens heater 51 may be configured by an exothermic member that generates heat by energizing an electrically heated wire, etc. The lens heater 51 may also be configured by the heat produced by the microcomputer of the control portion 50 or by a heat conducting member that transmits the heat produced by the microcomputer. When utilizing the heat produced by the microcomputer, the microcomputer may be relieved from the power save mode. A fan, etc. may be employed as the removing unit. More specifically, a fan may be driven to blow cool air onto the lens surface and image capturing may be carried out after a predetermined time has lapsed which is expected to be sufficient for removing dew condensate. Any configuration may be employed as long as dew condensate can be removed from the lens surface.

The communication terminal 103 acquires and displays images of the fridge interior stored in the server 104 by accessing the server 104. In the present embodiment, the communication terminal 103 acquires images stored in the server 104 instead of acquiring images directly from the refrigerator 1.

The server 104 is configured by a computer system and stores multiple images uploaded thereto in chronological order. The server 104 is further configured to associate the communication terminal with a specific refrigerator 1 and provides images of the relevant refrigerator 1 to the communication terminal requesting image acquisition.

Next, a description is given on the operation of the above described configuration. The processes described below, being executed by cooperation of the main control portion 30 and the control portion 50, are described with the refrigerator 1 being the subject of process execution for simplicity.

Figure 5:
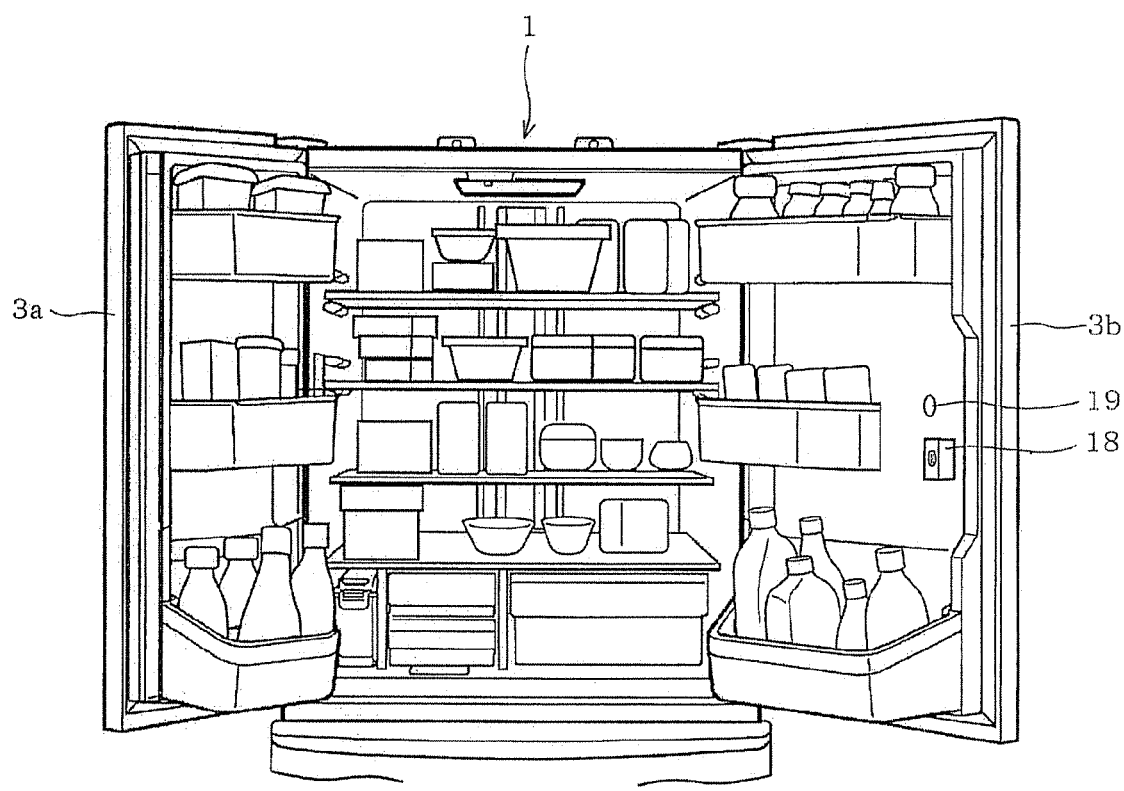
Figure 6:
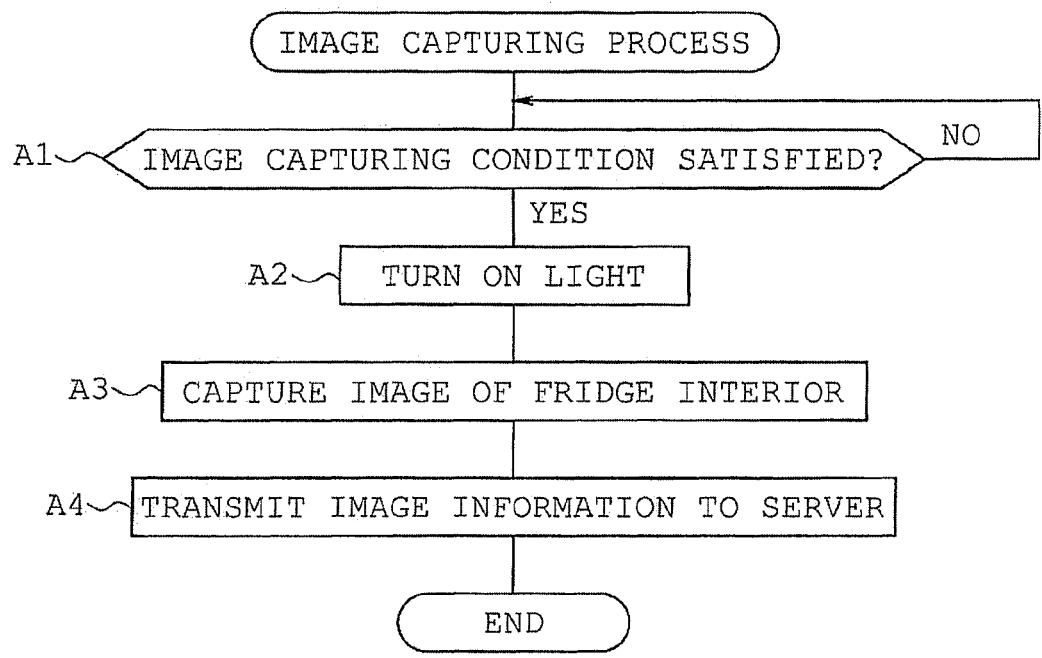

As illustrated in FIG. 5, various foods are stored in the refrigeration chamber 3 of the refrigerator 1. The refrigerator 1 executes the image capturing process indicated in FIG. 6 in which a determination is made as to whether or not conditions have been met for capturing images of the fridge interior by the image capturing camera 18 (A1). If either of the conditions has been met (A1: YES), that is, when it has been determined that the timing has arrived to perform image capturing, the light (image capturing light 19) is illuminated (A2) to capture images of the fridge interior (A3). The image of the fridge interior, one example of which is illustrated in FIG. 7, is captured in the above described manner.

Figure 7:
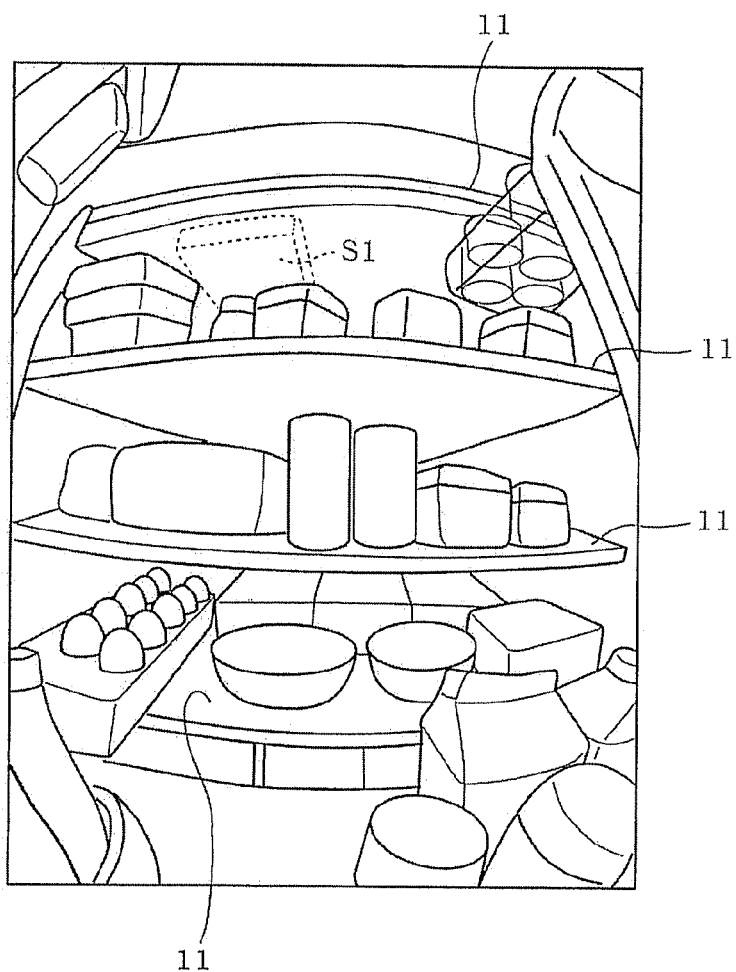

In FIG. 7, an image of substantially the entirety of the refrigeration chamber 3 interior is captured since the above described wide-angle lens is used in the image capturing of the fridge interior. An image of various types of food placed on each shelf 11 and various types of food stored in each door pocket is visibly captured. Since the shelves 11 are made of a transparent material, the image of food 51 placed on the uppermost shelf 11 is captured so as to be visible through the shelf 11.

Further, since the image is captured by illuminating image capturing light 19, the image of food is visibly captured without being back lit. In a comparative embodiment not illustrated in which the image of the fridge interior is captured with the ceiling light 13 illuminated, the light coming from the ceiling light 13 results in a back light and the visibility of food 51 and food placed on the second level shelf 11 becomes poor. That is, the refrigerator 1 controls the environment for enabling image capturing of the fridge interior by illuminating the image capturing light 19 which does not create a back light to the image capturing camera 18.

The refrigerator 1 transmits the image information of the captured image to the server 104 (A4). At this instance, the time stamp of the captured image is transmitted to the server 104 at the same time. As a result, the server 104 stores (accumulates) multiple images of the fridge interior in the chronological order.

When the door of the refrigeration chamber 3 is opened, the image capturing camera 18 as well as its wide-angle lens, provided on the inner plate 14 of the right-side door 3b, becomes exposed to the environment of the fridge exterior. The exposure occurs not only when the right-side door 3b is opened but also when the left-side door 3a is opened. Thus, the lens surface may fog by dew condensate as illustrated in FIG. 8A immediately after the door is closed though caused by the environment of the fridge exterior. FIGS. 8A-8C schematically illustrate the dew condensate on the lens surface by hatching where FIG. 8A illustrates the bedewed state (immediately after the door is closed), FIG. 8B illustrates the dew condensate being gradually removed (over some time after the door is closed), and FIG. 8C illustrates the dew condensate removed (after the delayed image capturing time has elapsed).

When the image of fridge interior is captured immediately after the door is closed, visibility may be poor because of dew condensate. In such case, the refrigerator 1 may employ condition 5 described above and further capture the image of the fridge interior at the timing when the delayed image capturing time has elapsed after the door once opened has been closed. That is, when condition 5 is met (A1: YES), light is illuminated (A2), image of the fridge interior is captured (A3), and the image information of the captured image is transmitted to the server 104 (A4).

Figure 9:
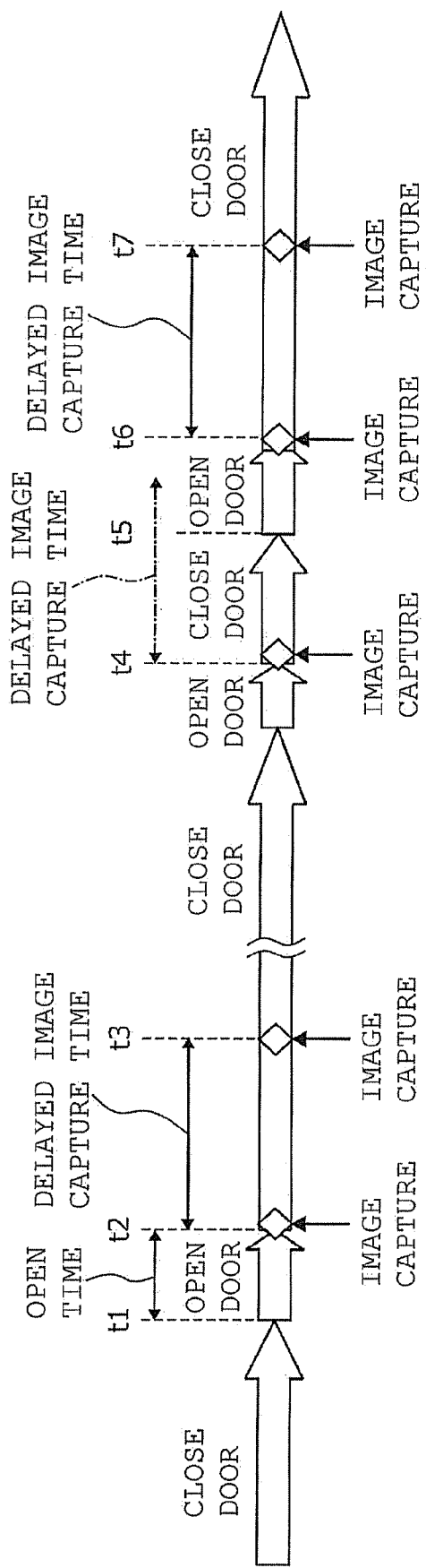

To described more specifically with reference to FIG. 9, the closed door is opened at time t1 and closed at t2. Image is captured at time t2 and at time t3, which is the timing after the delayed image capturing time has elapsed, image is captured again. After image is captured after door is closed at time t4, if the door is reopened at time t5 which precedes the lapse of the delayed image capturing time, image is captured at time t6 when the door is closed and image is captured again at time t7, which is the timing after the delayed image capturing time has elapsed. It is thus, possible to capture images with dew condensate of the wide-angle lens removed, that is, images with visibility of the fridge interior.

When image information is transmitted to the server 104, the control portion 50 is placed in a standby state. In the standby state, the control portion 50 may make a transition to a power save mode such as the so-called sleep mode (in which the ice making function may be stopped for example), or conduction of power to the control portion 50 including the image capturing camera 18 may be blocked to reduce power consumption to zero. Once opening of the door, etc. has been detected via the door sensor for example, instructions may be outputted to the control portion 50 from the main control portion 30 to make a transition to the normal mode.

As a result, it is possible to reduce total power consumption of the refrigerator 1.

Figure 10:
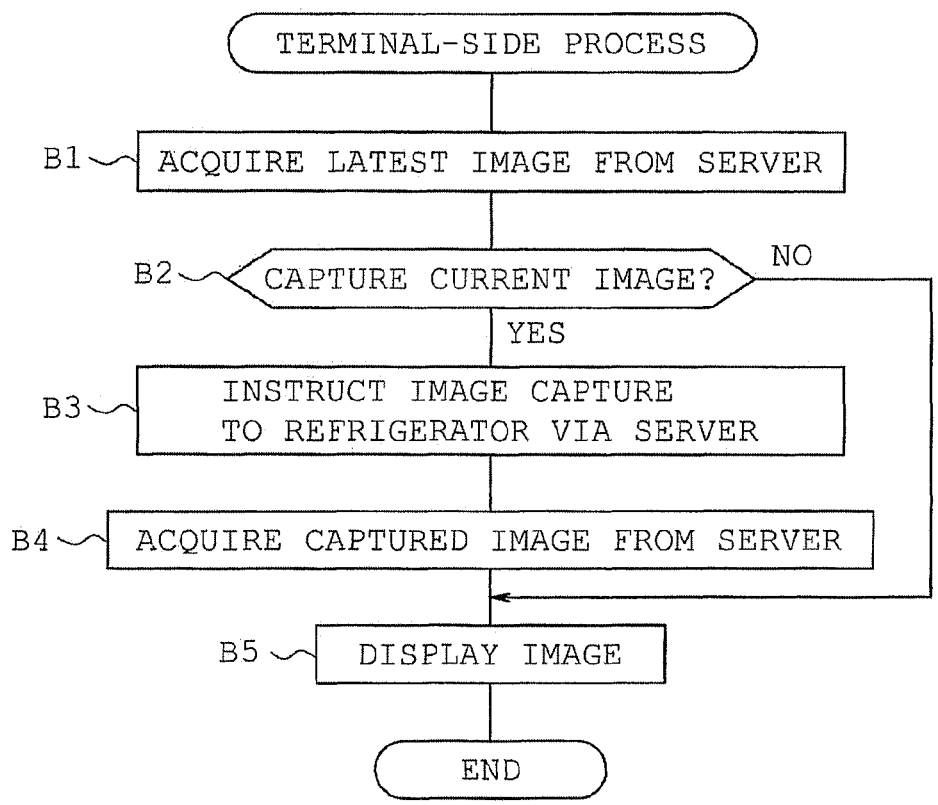
Figure 11:
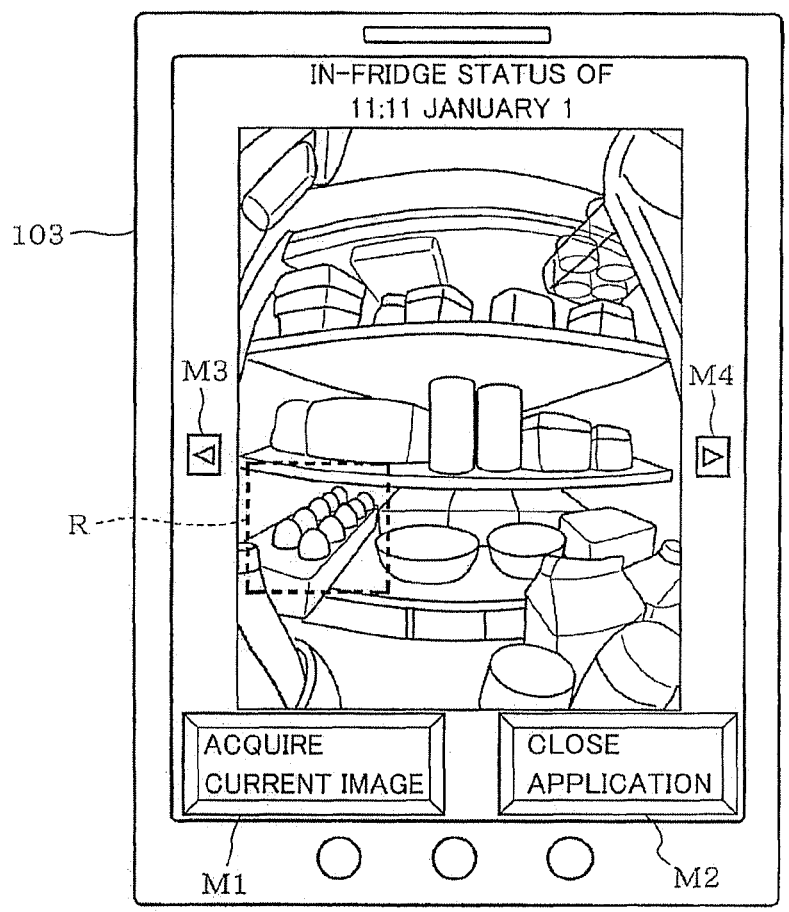
FIG. 11 illustrates how an image is displayed on the communication terminal of the first embodiment (part 1).

The images stored in the server 104 can be displayed on the communication terminal 103. The communication terminal 103 acquires the latest image (or the image information) from the server 104 (B1) when an application for image acquisition is invoked and the terminal-side process (fridge interior image displaying program) indicated in FIG. 10 is executed. As a result, images of the fridge interior are displayed, with the time in which the images were captured, on the screen of the communication terminal 103 as illustrated in FIG. 11. The screen of the communication terminal 103 is provided with a touch panel.

Figure 12:
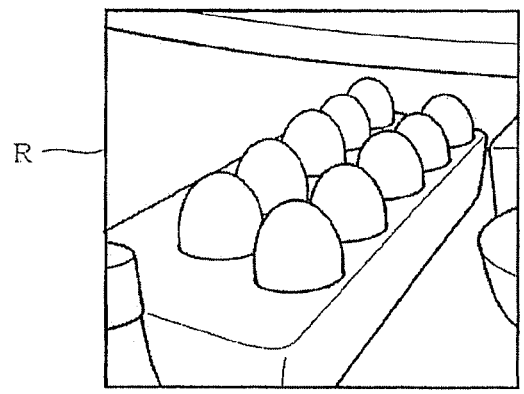
FIG. 12 illustrates how an image is displayed on the communication terminal of the first embodiment (part 2).

The screen is provided with button M1 for acquiring the current image, button M2 for terminating the application, button M3 for displaying images preceding the currently displayed image, button M4 for displaying newer images succeeding the currently displayed image, etc. Further, the communication terminal 103 is capable of enlarging the desired portion of the displayed image. For example, region R illustrated in FIG. 11 may be enlarged as illustrated in FIG. 12 to allow the user to be aware of the remaining number of eggs.

Further, when the user touches the button M1 of the communication terminal 103, that is, when an operation for acquiring the latest image is inputted (B2: YES), the communication terminal 103 transmits instructions for capturing images of the fridge interior to the refrigerator 1 (B3), acquires the image from the server 104 (B4), and displays the acquired image (B5). After step B3, the image of the fridge interior is captured in the refrigerator 1 side given that the condition 3 has been met in FIG. 6. The image information of the captured image is thereafter transmitted to the server 104.

The home appliance network system 100 allows the status inside the refrigerator 1 to be checked from a remote location since the refrigerator 1 transmits image information of the captured image of the fridge interior to the server 104, the server 104 stores the image, and the communication terminal 103 displays the image acquired from the server 104.

The present embodiment described above provides the following effects.

The refrigerator 1 is provided with the image capturing camera 18 configured to capture images of the interior of storage chambers for storing food such as the refrigeration chamber 3 and the communication portion 52 configured to transmit image information of images of the fridge interior captured by the image capturing camera 18 to external devices. It is thus, possible to acquire images of the fridge interior through external devices such as the communication terminal 103. As a result, it is possible to readily check the status inside the refrigerator from a remote location.

In the present embodiment, the images of the fridge interior are stored in the server 104. Thus, there is no need to provide a storage unit for storing the images in the refrigerator 1 side, thereby suppressing manufacturing cost. A storage portion may alternatively be provided in the refrigerator 1 so that the images are stored in the refrigerator 1 side.

The control portion 50 is placed in a standby state after image information is transmitted to the server 104. That is, power consumption of the control portion 50 side (including the image capturing camera 18) is reduced or cutoff to zero when image capturing is not ongoing. It is thus, possible to suppress total electricity consumption of the refrigerator 1.

The control portion 50 is configured to control the timing in which the images of the fridge interior are captured by the image capturing camera 18 and to control the image capturing environment such as illumination of lights for capturing images of the fridge interior so as to be synchronized with the controlled timing of image capturing. A light source is required in capturing the images of the fridge interior. Unnecessary power will be consumed if the image capturing is constantly enabled. However, by controlling the image capturing environment to illuminate the image capturing light 19, etc. only when the image capturing is carried out so as to be synchronized with the timing of image capturing, it is possible to reduce unnecessary power consumption. A night vision camera (such as an infrared camera), etc. capable of image capturing without a light source may be used to perform image capturing without illumination of light. Alternatively, light maybe illuminated continuously.

The refrigerator 1 captures an image of the fridge interior by the image capturing camera 18 at the timing after the door of the refrigeration chamber 3 has been closed. When images are captured even when the status of storage of the refrigerator has not been changed, unnecessary images will accumulate at the expense of unnecessary increase of power consumption. Thus, in the present embodiment, the refrigerator captures an image of the fridge interior at the timing after the door once opened has been closed. As a result, when encountering a state in which the status of food storage in the refrigerator may be changed (the state when the door is opened), the image of the fridge interior is captured when the status of storage has been settled (after the door is closed). It is thus, possible to suppress unnecessary image capturing and increase of power consumption.

Further, the refrigerator 1 captures an image of the fridge interior at the timing after the door has been closed and after the delayed image capturing time required to remove dew condensate from the wide-angle lens of the image capturing camera 18 has elapsed. During the summer time for example when the temperature as well as the humidity are high, dew condensate may result on the lens surface of the image capturing camera when the door is closed after once being exposed to exterior environment when the door was opened, since the temperature inside the refrigerator 3 is low. Hence, image of the fridge interior is captured again at the timing in which the delayed image capturing time, expected to be sufficient to remove the dew condensate, has elapsed. It is thus, possible to capture clear images with a fogless lens surface. As a result, it is possible to check the status inside the refrigerator even more reliably.

The delayed image capturing time may be specified based on the environment outside the refrigerator acquired by the outside fridge sensor 33*c* such as temperature and humidity. As a result, dew condensate can be expected not to occur (or occur in small amount) when temperature and/or humidity is low, etc. It is thus, possible to reduce the delayed image capturing time and thereby reduce power consumption. More specifically, when the control portion 50 is arranged to standby until the lapse of the delayed image capturing time for example, shorter standby time will result in less power consumption.

Further, dew condensate on the wide-angle lens of the image capturing camera 18 may be removed by a removing unit such as the lens heater 51. In such case, the refrigerator 1 captures an image of the fridge interior at the timing after the dew condensate has been removed from the lens surface by the lens heater 51. The use of the lens heater 51 further allows the delayed image capturing time to be shorted and consequently allows power consumption to be further reduced. A heat conducting member that transmits heat produced by the control portion 50 may be used as the lens heater 51. As a result, it is possible to remove dew condensate from the lens surface without consuming extra power. It also possible to reduce power consumption by shortened delayed image capturing time when a fan is used as the removing unit.

The refrigerator 1 captures image of the fridge interior for example at the timing when instructions to capture image of the fridge interior is received from the communication terminal 103. For example, when the user is at a remote location, the status of storage may change if the user's family takes food out of the refrigerator 1. It is possible to check the latest, i.e. the current status inside the refrigerator 1 by capturing the image of the fridge interior at the point of receiving user instructions.

The refrigerator 1 captures image of the fridge interior when the go-out switch has been operated. It is thus, possible to check the status inside the refrigerator 1 after going outdoors. In case the user living alone goes out, the status of storage of the refrigerator 1 is not expected to change from the moment the user leaves his/her residence. It is thus, possible to deem the image captured at the time of operating the go-out switch to be the latest image of the fridge interior.

Though not employed in the present embodiment, condition 2 may be employed to capture the image of the fridge interior when there is a possibility that the status of food storage may change. It is thus, possible to acquire image of the fridge interior which is close to the latest image. In such case, the view of the image capturing camera 18 may blur due to instability while the right-side door 3*b* is open. However, it is possible to reduce the image blur by capturing the image at the moment when the right-side door 3*b* is opened and by the illuminance provided by in-fridge lighting illuminated when the door is opened.

When capturing image of the fridge interior by the image capturing camera 18, the refrigerator 1 controls (organizes) the image capturing environment by illuminating the image capturing light 19 for lighting the fridge interior. It is thus, possible to secure source of light even when the door is closed and thereby allow image of the fridge interior to be visibly captured.

Among the lighting units such as the ceiling light 13, the image capturing light 19, and the side light 36 provided in the fridge interior, the refrigerator 1 illuminates the image capturing light 19 for lighting a specific location (in this case, the image capturing location, in particular). When capturing images using the image capturing camera 18, light may directly enter the view of the image capturing camera 18 to create a back light depending upon the relative positioning of the image capturing camera 18 and the lighting units provided in the fridge interior. In such case, the lighting unit, such as the image capturing light 19, for lighting a specific location which does not create a back light during image capturing may be illuminated for example instead of illuminating all of the lighting units. As a result, it is possible to capture images with improved clarity. More specifically, when a lighting unit is provided in the rear surface side so as to confront the image capturing camera 18 for example, at least the lighting unit creating the greatest degree of back light may be unlit while illuminating other lighting units (such as the ceiling light 13).

Because the image capturing light 19 is not disposed at a location to confront the image capturing camera 18 and is oriented in the direction in which the view of the image capturing camera 18 is oriented. Thus, light coming from the image capturing light 19 does not create a back light. As a result, it is possible to check the status of the fridge interior in detail.

The image capturing light 19 requires some amount of distance in order to establish a view for capturing an image of the fridge interior. Since the image capturing camera 18 is provided on the door of the refrigeration chamber 3, it is possible to secure sufficient distance between the image capturing camera 18 and food stored on the shelves 11, etc. and establish a large view.

Because the image capturing camera 18 is provided on the inner plate 14 of the right-side door 3*b*, it is possible to capture an image of the fridge interior even when the door is closed.

Since the image capturing camera 18 is provided near the vertical center and near the lateral center of the refrigeration chamber 3 while also employing a wide-angle lens, the image capturing camera 18 is capable of capturing the image of substantially the entirety of the refrigeration chamber 3 interior as viewed from the vicinity of the central portion of the fridge interior (which is close to the view available to the user when the user normally looks into the refrigerator 1). Because the shelves 11 are made of a transparent material, it is possible to visibly capture an image of food placed on the uppermost shelf 11 through the shelves 11.

The door pocket 9*b* located adjacent to the image capturing camera 18 is shaped so that one side proximal to the image capturing camera 18 extends in a direction to avoid the image capturing camera 18. It is thus, possible to secure sufficient lateral view in the image capturing camera 18 employing a wide-angle lens. Because the image capturing camera 18 is provided in a location adjacent to the door pocket 9*b*, the vertical view is not blocked by the door pocket 9*b*.

Because the image capturing camera 18 is disposed at a location capable of capturing an image of at least some of the door pockets 8 to 10, it is possible to capture an image of food stored in door pockets 8 to 10 to allow food stored in the fridge interior to be checked more elaborately. The door pocket 9*b* of the present embodiment disposed adjacent to the image capturing camera 18 need not be visible (image need not be captured for the same). The above described locationing of the image capturing camera 18 offers similar effects when applied to a removable camera later described in a second embodiment.

The communication terminal 103 is provided with a display portion configured to display images and is capable of acquiring images of the fridge interior captured by the above described refrigerator 1 and displaying the same on the display portion. It is thus, possible to check the status of the fridge interior from a remote location such as outdoors.

The home appliance network system 100 provided with the refrigerator 1, the communication terminal 103, and the server 104, provided with the storage unit for storing images of the fridge interior captured by the refrigerator 1. The communication terminal 103 establishes connection with the server 104 via the communication line 102 and acquires and displays images of the fridge interior stored in the server 104. It is thus, possible to check the status of the fridge interior from a remote location for example from outdoors. Since the images are stored in the server 104, a large volume storage portion need not be provided in the refrigerator 1 side, thereby preventing increase in the cost of the refrigerator 1. Since the communication terminal 103 acquires images from the server 104, it is not required to keep the control portion 50 of the refrigerator 1 in a communicable state. It is thus, possible to inhibit increase of power consumption in the refrigerator 1 side.

It is further possible to check the fridge interior from a remote location by executing the in-fridge image displaying program from the communication terminal 103. The in-fridge image displaying program executes the image acquiring process (steps B1 and B4 of FIG. 10) for acquiring image information of the storage chamber interior captured by the image capturing camera 18, the display process (step B5 of FIG. 10) for displaying image information acquired in the image acquiring process, and an image capturing process (step B2 and B3) for capturing images of the fridge interior through the image capturing camera serving as the image capturing unit by outputting instructions for capturing images of the fridge interior.

Second Embodiment

A description will be given hereinafter on a second embodiment with reference to FIGS. 13A to 25. Since the configuration of the refrigerator 1 is substantially identical to the configuration of the first embodiment, a description will be given with reference to FIG. 2, etc. as well.

As illustrated in FIGS. 13A and 13B, a door pocket 200 (one example of a refrigerator door pocket) of the present embodiment is provided with a storing portion 201 for storing items and a holding portion 202 for holding a camera device 300. The door pocket 200 functions as a refrigerator door pocket and a refrigerator holder recited in the claims. The holder 200 may be considered as one example of a receiving portion for mounting the image capturing unit. From the standpoint of the storage portion 201, the door pocket 200 may be described as being provided adjacent to the camera device 300 (i.e. the image capturing unit) held by the holding portion 202.

The storing portion 201 is provided with a wall 203 disposed in the holding portion 202 side which extends obliquely away from the holding portion 202. That is, the door pocket 200 is formed into a shape extending along the outer edge of the view of the camera device 300 so as not to block its view when the camera device 300 is held by (attached to) the holding portion 202.

The upper side (the upper side as viewed in FIG. 3A) of the holding portion 202 of the present embodiment is shaped like an open box and the camera device 300 is taken in and out (attached/detached) from the upper side opening. Further, a wall 204 provided in the front surface side of the holding portion 202 (that is, the side facing the fridge interior) has a notch 205 formed at a location where a lens 301 and an image capturing lamp 302 (See FIG. 15, etc. examples of a camera side light unit and lighting unit) are located when the camera device 300 is held. Thus, the view of the camera device 300 is unblocked and reflection of lighting is prevented.

Further, the holding portion 202 is provided with a magnet 206. The magnet 206 is arranged so that one side of the magnet 206 facing the back side of the camera device 300 is the N pole or the S pole. The polarity of the magnet 206 will be detailed when describing the structure of the camera device 300.

The door pocket 200 is mounted on the inner plate 14 of the right-side door 3b as illustrated in FIG. 14. Thus, the view of the camera device 300 faces the fridge interior (refrigeration chamber 3) when the right-side door 3b is closed. The camera device 300 is held by the holding portion 202 so that the center of the lens 301 is located on the intersection of line CL1 running through the lateral center of the refrigeration chamber 3 and line CL2 running through the vertical center of the refrigeration chamber 3. That is, the camera device 300 disposed in this state has a view centering on the central portion of the refrigeration chamber 3. More specifically, the door pocket 200 is configured so that the bottom portion of the holding portion 202 is slightly lower than the bottom portion of the storing portion 201 in consideration of the location where the door pocket 200 is mounted and the shape of the camera device 300 so that the central portion of the lens 301 is located at the optimal position.

As illustrated in FIGS. 15 and 16, the camera device 300 is provided with the lens 301 and the image capturing lamp 302 which are exposed on a surface of body 303 formed into a generally cuboid shape. The surfaces of the lens 301 and the image capturing lamp 302 may be covered by a cover, etc. instead of being exposed in a naked state. A wide-angle lens is employed in the present embodiment as well.

A description will be given hereinafter with an assumption that one side (the right side in FIG. 16) of the camera device 300 in which lens 301 and the image capturing lamp 302 are provided is the front surface and the opposite side is the rear surface. Further, as illustrated in FIGS. 13A and 13B, the orientation in which the lens 301 and the image capturing lamp 302 are disposed along the up and down direction of the refrigerator 1 is referred to as the vertical orientation and the orientation in which the lens 301 and the image capturing lamp 302 are disposed along the left and right direction of the refrigerator 1 as illustrated in the later described FIG. 20 is referred to as the landscape orientation.

As illustrated in FIG. 16, the camera device 300 contains a control substrate 304, a battery 305, a communication module 306, and a detecting portion 307 inside the body 303. The control substrate 304 is provided with: an image capturing portion 308 (see FIG. 21) including the lens 301, an image capturing element not illustrated, etc.; the image capturing lamps 302, two in the present embodiment; and a control portion 309 (see FIG. 21) for controlling the foregoing components. The image capturing element is a known image capturing element such as a CCD, CMOS, or the like, which, in this example, exhibits a rectangular shape. In the present embodiment, the lengthwise direction of the image capturing element is oriented in the up and down direction (that is, the vertical direction of the body). Thus, when capturing images of the refrigeration chamber 3 formed in a vertically elongated shape, the image capturing element can, in general, be oriented along the vertically elongated shape by orienting the camera device 300 in the vertical direction. When capturing an image of the vegetable chamber 4 formed in a laterally elongated shape as later described, the image capturing element can be oriented along the laterally elongated shape by orienting the camera device 300 in the landscape direction. Further, an LED is employed as the image capturing lamp 302 in the present embodiment. Though not illustrated, the camera device 300 is also provided with a power switch.

The battery 305 is configured by a lithium battery which supplies electric power to the control portion 309, the communication module 306, the detection portion 307, and the like. The battery 305 is located on the lowermost portion of the body 303 and occupies substantially the entire area extending in the front and rear direction (the left and right direction as viewed in FIG. 16). The balance of the mounted camera device 300 is somewhat established by disposing the battery 305, being relatively heavy among the components stored in the body 303, in such location. By placing the gravitational center at the lower portion (when oriented in the vertical direction) of the camera device 300, the camera device 300 is prevented from falling out of the door pocket 200, etc. by the centrifugal force, oscillation, etc. exerted by the opening and closing of the door, when the camera device 300 is placed in the door pocket 200 of the right-side door 3b. By using the lithium battery, excellent discharge properties can be achieved even in a relatively cool place such as the interior of the refrigerator 1.

As illustrated in FIG. 25, the home appliance network system 500 of the present embodiment is provided with another communication device 501 in the refrigerator 1 side which is different from the communication module 306 of the camera device 300. The communication device 501 allows the refrigerator 1 to receive image capturing instructions from external devices. The communication device 501 is mounted on the refrigerator 1 and the camera device 300 is disposed inside the refrigeration chamber 3. The communication device 501 serves as a fridge-side communication unit configured to receive instructions for capturing an image of the fridge interior (hereinafter also referred to as image capturing instructions) from external devices. In the present embodiment, the communication device 501 is configured as an adapter for wireless communication and is detachably attached to the refrigerator 1. Thus, it is possible for the user to set up the communication device 501 as an optional accessory after purchasing the refrigerator 1. The communication device 501 is capable of communicating with the main control portion 30 of the refrigerator 1 as illustrated in FIG. 21 through wireless communication method or wired communication method. As later described in detail, the refrigerator 1 is sends image capturing instructions (see FIG. 23 which indicates a light flickering signal in the present embodiment) to the camera device 300 when receiving an image capturing instructions.

The communication module 306 of the camera device 300 is configured to be communicable with the router 101 and transmits image information to the communication terminal 103 and the server 104. The communication module 306 serves as a camera-side communication unit configured to transmit image information of the fridge interior captured by the camera device 300 to external devices such as the communication terminal 103 and the server 104 (see FIG. 1). The communication module 306 is provided along the wall in the rear surface side (outermost edge side) of the body 303 of the camera device 300. The antenna not shown installed in the communication module 306 is disposed so that other components, etc. do not intervene the body 303 and the antenna. As a result, transmission of electronic waves to and from the antenna is inhibited from being interrupted (communication failure is inhibited). Further, the communication module 306 is disposed in the vertical direction with respect to the battery 305 so that the antenna and the battery 305 do not confront each other.

The front surface of the right-side door 3b of the refrigerator 1 is formed of a glass material as described above. Thus, electric waves for wireless communication outputted from the camera device 300 disposed in the fridge interior is allowed to permeate more easily through the door as compared to metal plate, or the like. Further, the camera device 300 is disposed in the holding portion 202 (that is, the opening end side of the right-side door 3b) of the door pocket 200. Thus, especially in a double door configuration as is the case in the present embodiment, it is possible to let out the electric waves from the clearances between the doors. Further, by disposing the camera device 300 in the holding portion 202, it becomes easier to propagate the electric waves coming from the camera device 300 even when the front surface of the door is made of metal material, etc. for example. Because urethane is filled inside the door, there is a small possibility of the electric waves being blocked.

A vacuum thermal insulation material may be used instead of urethane or with urethane to serve as a thermal insulation material of the refrigerator 1. The vacuum insulation material is formed into a thin rectangular plate by wrapping a core material with glass fiber, etc. with a film formed by adhering (laminating) a metal foil (aluminum foil for example) on a film made of synthetic resin for example. The vacuum thermal insulation material is used inside the body and the doors of the refrigerator 1; however, when the camera device 300 is disposed in the door pocket 200, the vacuum insulation material may be provided for example so as to avoid the portion corresponding to the holding portion 202 so as to facilitate propagation of electric waves.

For example, the vacuum thermal insulation material may be provided in the right-side door 3b so as to avoid the projected surface (especially the portion of the communication module) of the camera device 300; whereas in the left-side door 3a and door 7a of the lower freezer 7 in which the camera device 300 is not provided, their entire surface may be provided with the vacuum thermal insulation material and thereby facilitate propagation of electric wave without degrading the thermal insulativity of the refrigerator 1. The glass plate 3b1 described above may be reinforced or a metal material for mounting the camera device 300 may be provided on the door using a magnet as illustrated in FIGS. 29A and 29B later described. It is possible to facilitate propagation of electric waves by disposing them in appropriate locations as was the case with the vacuum thermal insulation material.

The structure for facilitating the propagation of electric waves from the fridge interior is especially useful in a configuration in which the communication module 306 is provided in the camera device 300 disposed inside the refrigerator 1 and the captured image information is transmitted directly to external devices from the camera device 300 (that is, in a configuration in which the camera device 300 transmits image information without the intervention of the communication device 501 of the refrigerator 1) as is the case in the present embodiment.

Next, a description will be given on the polarity of the magnet 206 described above.

As illustrated in FIG. 17, the magnet 206 is provided in a location of the holding portion 202 corresponding to the detecting portion 307 in the rear surface of the camera device 300. Thus, when the camera device 300 is held by the holding portion 202, the detecting portion 307 confronts the magnet 206 and is placed in close proximity of the magnet 206. In such case, the magnet 206 is disposed so that the N pole side of the magnet 206 faces the camera device 300. Thus, the detecting portion 307 detects the strength of magnetic field produced by the N pole.

The polarity of the magnet 206 is oriented in the above described manner because the camera device 300 is also designed to be placed in other locations besides the refrigeration chamber 3 such as the vegetable chamber 4. As illustrated in FIG. 18, the vegetable chamber 4 is structured so that a rail member 4b is mounted on the door 4a and a vegetable chamber box 4c is mounted on the rail member 4b. A refrigerator holder 400 illustrated in FIGS. 19A and 19B is employed in the present embodiment in order to capture an image of the above described vegetable chamber 4 using the camera device 300. The refrigerator holder 400 is provided with a holding portion 401 configured to hold the camera device 300, an engagement portion 402 configured for mounting the holding portion 401 on the vegetable chamber box 4c. The holding portion 401 is formed in a shape to allow the camera device 300 to be held in a landscape orientation and is provided with a front wall 403 located in the front surface side thereof that is formed in a height that does not block the view of the lens 301.

A magnet 405 is provided in a location of a rear wall 404 of the holding portion 401 corresponding to the rear surface of the camera device 300. The magnet 405 is disposed so that the S pole side of the magnet 405 faces the camera device 300. Thus, when the refrigerator holder 400 is mounted on the vegetable chamber 4 as illustrated in FIG. 20 and the camera device 300 is held by the holding portion 401, the camera device 300 is held in the landscape orientation and the detecting portion 307 confronts the magnet 405 as was the case illustrated in FIG. 17.

The detecting portion 307 detects the strength of magnetic field produced by the S pole.

As described above, the polarities of the sides of the magnet 206 and magnet 405 confronting the camera device 300 are opposite of one another. Thus, the detecting portion 307 of the camera device 300 detects different magnetic field levels when the camera device 300 is installed in the refrigeration chamber 3 and in the vegetable chamber 4. Stated differently, the camera device 300 is capable of detecting the storage chamber in which it is placed. Further, the camera device 300 is capable of judging whether the refrigerator 1 in which it is placed is eligible for its operation through detection of magnetism. That is, the magnet 206 and the magnet 405 serves as one example of a detection subject unit recited in the claims.

Next, a description will be given on the electrical configuration of the camera device 300.

As illustrated in FIG. 21, the camera device 300 is provided with a control portion 309. The control portion 309 is configured by a microcomputer including components such as a CPU 309a, ROM 309b, RAM 309c, RTC 309d, etc. and serves as one example of the camera-side control unit responsible for overall control of the camera device 300.

More specifically, the control portion 309 executes a control of the timing of image capturing carried out by the image capturing portion 308 provided with the lens 301, the image capturing element, etc.; a control for preparing image capturing environment using the image capturing lamp 302 (illumination control) at the time of image capturing; a control for transmission of image information, receiving a later described instructions, etc. carried out by the communication module 306; and a control for judging and identifying the installation status by the detecting portion 307. In the present embodiment, the control portion 309 is also configured to execute image processing in which the captured image is modified, etc.

First a description will be given on the control of judgment and identification of installation status executed by the detecting portion 307. The detecting portion 307 is provided with a temperature sensor 310, a magnetic sensor 311, an acceleration sensor 312, and an illuminance sensor 313. The control portion 309 judges which of the storage chambers the camera device 300 is installed by detecting the outside temperature using the temperature sensor 310. A description will be given hereinafter on how the judgment is made in more detail.

The temperature sensor 310 detects the temperature of the place in which the camera device 300 is installed. The temperature sensor 310 increases its output in proportion to the increase in the temperature as illustrated in FIG. 22A. Generally, there is approximately 11 to 19 degrees Celsius of difference between the temperature of the refrigeration chamber 3 and the temperature of the lower freezer 7. Thus, a reference temperature serving as a reference may be specified and if the detected temperature is greater than the reference temperature, a judgment is made that the place of installation is the refrigeration chamber 3, whereas if the detected temperature is less than the reference temperature, a judgment is made that the place of installation is the lower freezer 7. When a judgment is made that the place of installation is the lower freezer 7, there is a risk of failure, etc. thus, the image capturing lamp 302 may be illuminated or an audio output unit such as a buzzer may be provided to output a sound alert that the place of installation is an unintended place or such alert may be transmitted to the refrigerator 1 side through the communication module 306 and presented to the user through the touch panel 33, etc. of the refrigerator 1. The camera device 300 determines its place of installation based on the temperature detected by the temperature sensor 310.

The magnetic sensor 311 detects the magnetic fields produced by the magnet 206 and magnet 405 as described above. As illustrated in FIG. 22B, the magnetic sensor 311 varies its output to the positive side (in case of N pole) and to the negative side (in case of S pole) depending upon whether the magnetic field is produced from the N pole or the S pole. That is, when the output of the magnetic sensor 311 is positive (not 0), it is possible to detect that the camera device 300 has been installed in a location confronting the magnet 206 provided in the door pocket 200 of the refrigeration chamber 3, meaning that it is possible to detect that the camera device 300 has been installed inside the refrigeration chamber 3.

When there is temperature difference between the refrigeration chamber 3 and the vegetable chamber 4, a judgment may be made as to whether the place of installation is the refrigeration chamber 3 or the vegetable chamber 4 based on the output of the temperature sensor 310. In either case, it is possible to detect that the camera device 300 has been installed in the storage chamber based on the output of the temperature sensor 310.

When the output of the magnetic sensor 311 is negative (not 0), it is possible to detect that the camera device 300 has been installed in a location confronting the magnet 405, meaning that it is possible to detect that the camera device 300 has been installed inside the vegetable chamber 4. In the present embodiment, the possibility of installing the camera device 300 on the shelf 11, etc. for example (see FIG. 24B) is taken into consideration. When the output of the magnetic sensor 311 is greater than the positive reference value, a judgment is made that the place of installation of the camera device 300 is the refrigeration chamber 3. When the output of the magnetic sensor 311 is less than the negative reference value, a judgment is made that the place of installation of the camera device 300 is the vegetable chamber 4. When the output of the magnetic sensor 311 is close to zero, a judgment is made that the place of installation of the camera device 300 is the shelf 11, etc. which is not provided with a magnet. The judgment of the temperature sensor 310 may be combined to judge whether or not the camera device 300 is stored in the storage chamber.

The acceleration sensor 312 is configured to detect the acceleration (gravitational acceleration) applied to the camera device 300. The acceleration sensor 312 serves as the so-called triaxial sensor configured to detect the acceleration of the three axes namely, the X axis, the Y axis, and the Z axis (see FIGS. 15 and 16). Thus, as illustrated in FIG. 22C, the output varies when the camera device 300 is oriented in the vertical direction, oriented in the vertical direction (reversed in the up and down direction), oriented in the landscape direction, and oriented in the landscape direction (reversed in the left and right direction). It is thus, possible to detect the orientation of the installed camera device 300. The detected orientation of the camera device 300 is used in the later described image processing or may be used in the judging the place of installation of the camera device 300.

Next, a description will be given on the timing of image capturing. The process flow of image capturing is substantially the same as FIG. 6 of the first embodiment and thus a description will be given with reference to FIG. 6 as well. The camera device 300 judges whether a predetermined time period has elapsed or instructions have been received from an external device; that is, a judgment is made as to whether or not image capturing conditions have been met (A1). The camera device 300 judges whether or not the predetermined time period has elapsed by measuring time using RTC 309*d* and whether or not instructions have been received based on the illuminance detected by the illuminance sensor 313.

The illuminance sensor 313 configuring the detecting portion 307 detects the illuminance of the place where the camera device 300 has been installed. In the present embodiment, the illuminance sensor 313 informs the control portion 309 when detecting an illuminance approximating the illuminance of the in-fridge lighting being turned on. Further, the refrigerator 1 of the present embodiment, in which the camera device 300 is installed, flickers the in-fridge lighting such as the ceiling light 13 according to a predetermined flickering pattern when receiving instructions for image capturing from an external device. The image capturing instructions is issued in the similar manner as steps B2 to B4 of the terminal-side process indicated in FIG. 10 of the first embodiment when issued for example by the communication terminal 103.

The flickering pattern informs the image capturing timing to the camera device 300, being detachably attached to the refrigerator 1, and is preset. That is, the refrigerator 1 alerts the image capturing instructions to the camera device 300 by flickering the in-fridge lighting. This is realized by providing the configuration to judge whether or not the refrigerator 1 is eligible for image capturing operation (that is, whether or not the refrigerator is capable of flickering the in-fridge lighting) and the configuration to cause the camera device 300 to identify whether or not the refrigerator is eligible for image capturing operation as described above. That is, the in-fridge lighting being capable of flickering is an indication that the refrigerator 1 is eligible for operation of the camera device 300.

The camera device 300 is normally placed in a power save mode known as a sleep mode, etc. as indicated by period T1 in FIG. 23 during which period the illumination sensor is in operation. The refrigerator 1 flickers the in-fridge lighting according to a predetermined flickering pattern when receiving instructions from an external device as described above. The illumination of the in-fridge lighting causes the illuminance sensor 313 to report (input of interruption signal, etc.) to the control portion 309 to place the control portion 309 in an operating state. That is, a judgment is made that the image capturing conditions have been met when the in-fridge illumination has flickered in a predetermined flickering pattern. The flickering pattern may be of any pattern which may be specified by the ON/OFF period and the times of repeating such period, etc.

When judging that the image capturing conditions have been met (A1: YES), the camera device 300 illuminates the image capturing lamp 302 (A2), captures the image of the fridge-interior (A3), and transmits the image information to the server 104, etc. (A4).

The refrigerator 1 may illuminate the in-fridge lighting even in the absence of instructions. For example, the in-fridge lighting is illuminated in a non-flickering pattern (in a continuous illumination) when the door has been opened by the user as in period T2 indicated in FIG. 23. In this case, the camera device 300 is temporarily placed in an operating mode since the in-fridge lighting has been illuminated. However, the camera device 300 is returned to the standby mode since the predetermined flickering pattern is not followed, that is, the image capturing conditions have not been met.

When a predetermined period has elapsed, for example when a preset image-capturing time interval has elapsed as indicated by period T3 in FIG. 23, from the previous (period T1) image capturing, the camera device 300 makes a judgment that the image capturing conditions have been met (A1: YES), is placed in the operating mode, illuminates the image capturing lamp 302 (A2), captures the image of the fridge-interior at that point in time (A3), and transmits the image information (A4).

As described above, the camera device 300 captures an image of the fridge interior based on whether the predetermined period has elapsed and whether instructions have been given by an external component (presence of user's intent). The user is allowed to check the status of the fridge interior as illustrated in FIGS. 24A to 24C depending upon the place where the camera device 300 has been installed. Multiple camera devices 300 may be provided; for example, one in the refrigeration chamber 3 and one in the vegetable chamber 4.

In the present embodiment, the camera device 300 does not merely capture images of the fridge interior but also executes image processing such as image conversion. The camera device 300 may be oriented in the vertical direction or the landscape direction as described above in which case the image is rotated by 90 degrees (or 270 degrees). Thus, the camera device 300 executes image conversion before the images are transmitted to the server 104. As a result, images with uniform vertical orientations looking like the view available when the user directly checks the refrigerator 1 can be displayed on the communication terminal 103 even when the camera device 300 is oriented differently as illustrated in FIGS. 24A and 24B or 24C.

Further, because the lens 301 is a wide-angle lens, the central portion of the captured image may be distorted as illustrated in FIG. 7 of the first embodiment. Thus, the camera device 300 is configured to correct the distortion by image processing. More specifically, an image processing is carried out so that the ratios of the central portion and upper and lower edge of the image match. As a result, it is possible to display images having little distortions as illustrated in FIG. 24A. The orientation of the image and the orientation of the camera device 300 may be transmitted as image information and image processing may be executed at the server 104 or the communication terminal 103. It is possible to reduce power consumption of the camera device 300 by executing the image processing at the external device side. Such arrangement is meaningful for the camera device 300 which does not possess means for supplying power from external sources.

The present embodiment described above provides the following effects in addition to (or instead of) the effects of the first embodiment. Some users wish to check the interior of the refrigerator 1 from remote locations such as outdoors. It is possible to check the fridge interior by acquiring images of the fridge interior using the communication terminal 103 from outdoors since the image capturing portion 308 (image capturing unit) for capturing images of the fridge interior and the communication module 306 (communication unit) for transmitting image information of the fridge interior acquired using the image capturing portion 308 to external devices such as the server 104 are provided in the refrigerator 1.

When capturing images of the fridge interior, repeating unnecessary image capturing will increase power consumption, cause battery shortages, and storage of unnecessary (redundant images) to the server 104. It is possible to reduce such concerns by controlling the timing in which the in-fridge images are captured by the control portion 309 of the camera device 300.

More specifically, there is a possibility that the user's family may take out food from the refrigerator 1, etc. when predetermined time period has elapsed. It is thus, possible to prevent unnecessary image capturing from being repeated by capturing images of the fridge interior at the timing when the predetermined period has elapsed, that is, when there is a possibility that the status of food storage may have changed.

Further, capturing an image of the fridge interior at the timing when instructions from the user have been received will allow the user to be updated with the latest storage status. Thus, by refraining from capturing images at the timing when a predetermined time period has elapsed, stated differently, by capturing images only when instructed by the user will eliminate unnecessary image capturing and thereby further reduces power consumption. As described earlier, image may be acquired when the storage status has changed by incorporating the image capturing conditions of the first embodiment.

Some users may not need to check the status inside the refrigerator 1. The camera device 300 provided with the image capturing portion 308 for capturing images of the fridge interior and the communication module 306 for transmitting image information of the fridge interior captured by the image capturing portion 308 to external devices such as the sever 104 is configured to be detachably attached to the refrigerator 1. Thus, users who do not need to check the status inside the refrigerator 1 may remove the camera device 300. Further, users who did not feel the need to check the status inside refrigerator 1 when purchasing the refrigerator 1 but has later felt such need will be able to check the status inside the refrigerator 1 by simply adding the camera device 300.

Because the communication device 501 is also configured to be detachably attached, users who do not need to check the status of the fridge interior may remove the same as was the case in the camera device 300 to reduce power consumption while also allowing the user to add the same at a later time.

A light source is required for image capturing. Because the image capturing lamp 302 (camera-side lighting unit) for illuminating the fridge interior is provided to the camera device 300, it is possible to capture the image of the fridge interior by the camera device 300 alone. Needless to say, the fridge interior may be illuminated through cooperation with the refrigerator 1.

Image capturing of the fridge interior may not be successful as it may be difficult to obtain a clear view depending upon where the camera device 300 is installed. It is thus, important to find a suitable place for image capturing. It is possible to install the camera device 300 in a location where the image of the entire refrigeration chamber 3 can be captured for example by providing a receiving portion (examples of which are holding portion 202 of the door pocket 200 and holding portion 401 of the refrigerator holder 400 in the embodiments) for mounting the camera device 300 to the refrigerator 1.

If it is not possible to flicker the in-fridge lighting as described above, it will not be possible to issue image capturing instructions from external components. By implementing a configuration in which magnetisms of the magnet 206 and the magnet 405 are detected by detecting portion 307, that is, by providing a detection subject unit for detecting that the refrigerator 1 is eligible for image capturing (image capturing is permitted) using the camera device 300, it is possible to reduce such concerns.

The communication module 306 may be configured to communicate with the refrigerator 1 side so that the communication module 306 serves as the detection unit (in which case the communication device 501 serves as the detection subject unit). The communication module 306 may be used as an identifying unit for identifying whether or not the camera device 300 has been designed for use in the refrigerator 1 (for example designed to capture images by flickering the in-fridge lighting).

In the embodiment described above, the camera device 300 is driven by the battery 305 (meaning that when installed to the refrigerator 1, the camera device 300 is driven without power supply from external components). It is thus, preferable to reduce electricity consumption as much as possible. It is possible to reduce electricity consumption originating from wireless communication by making the communication module 306 communicate with the communication device 501 as compared to the electricity consumption resulting from the wireless communication between the communication module 306 and external components.

When configured to receive instructions from external devices, the communication unit needs to operate continuously to standby for the instructions. However, by configuring the communication device 501 to receive the instructions, it is no longer necessary to maintain the continuous operation of the communication module 306 and thereby extend the battery life.

The communication device 501 may be configured to receive supply of power from the refrigerator 1 side by wire communication such as USB. As a result, unnecessary supply of power need not be provided in the absence of the communication device 501 and when the communication device 501 is provided it may for example be arranged to operate continuously.

When the camera device 300 is configured to be detachably attachable, it may be more convenient when a wireless communication is employed. However, when instructions are received by the communication device 501, such instructions need to be somehow transmitted to the camera device 300. Thus, the illumination sensor 313 is provided to the camera device 300 so that the image capturing instructions are transmitted indirectly to the camera device 300 by flickering the in-fridge lighting. It is thus, possible to notify image capturing timing to the camera device 300 employing wireless communication. Since such arrangement only requires the camera device 300 side to keep the illuminance sensor 313 in an operating state, it is possible to reduce power consumption compared to keeping the communication module 306 in an operating state.

The front surface of the right-side door 3b in which the camera device 300 is provided is formed of a nonmetallic material. It is thus, possible to facilitate propagation of electric waves to the fridge exterior even when the camera device 300 as well as the communication module 306 are disposed inside the refrigeration chamber 3 tightly closed by the right-side door 3b. The same is true when the camera device 300 is disposed at the vegetable chamber 4.

For example, the refrigeration chamber 3 is generally elongated in the vertical direction and the vegetable chamber 4 is generally elongated in lateral direction. Thus, when there are multiple storage chambers, the view of the camera device 300 is preferably switched depending upon the storage chamber. The user may feel uncomfortable when the image is oriented sideways. Thus, it is preferable to provide images with uniform vertical orientations looking like the view available when the user checks the refrigerator 1 in person. Thus, the magnet 206 and the magnet 405 are provided the sides of the magnet 206 and magnet 405 confronting the camera device 300 are opposite of one another. As a result, it is possible to learn where the camera device 300 is installed (the mounting positions predetermined by the manufacturer, etc. which correspond to the holding portion 202 or the holding portion 401) and thereby allowing the orientation of the camera device 300 to be judged in such locations of installation. The holding portion 202 and the holding portion 401 are formed so that the camera device 300 is oriented vertically when installed in the refrigeration chamber 3 and oriented in the landscape direction when installed in the vegetable chamber in the present embodiment so that camera device 300 is installed in different orientations depending upon the storage chamber. As a result, appropriate view can be obtained depending upon the storage chamber and proper judgments can be made as to the direction in which the images need to be rotated in the image processing.

It is possible to: determine the orientation of the camera device 300 based on the orientation of the acceleration detected by the acceleration sensor 312, and determine where the camera device 300 is installed depending upon the temperature detected by the temperature sensor 310.

The camera device 300 may malfunction, etc. when inadvertently installed in the freezer. However, the possibility of malfunctioning, etc. can be reduced by detecting the temperature through the temperature sensor 310 or by allowing an alert to be issued as is the case in the present embodiment.

Capturing an image of the fridge interior using the camera device 300 requires the camera device 300 to face the front side of the fridge interior with some amount of distance in order to establish a view. However, the mounting position in the front side in the refrigerator 1 is limited by the door. Thus, in order to secure as much distance as possible, the camera device 300 may be mounted on the inner plate 14 of the door. However, the door pocket may block the view in such case. The door pocket 200 of the present embodiment is formed so that the wall 203 avoids the holding portion 202 (receiving portion) and thus, will not block the view of the camera device 300.

Further, because there are suitable places for capturing images of the fridge interior, it is desirable to notify such places to the user. By providing the holding portion 202 (the receiving portion for mounting the camera device 300) for holding the camera device 300 such as the door pocket 200, it is possible to noticeably indicate such places to the user. The holding portion 202 is formed so that when the camera device 300 is held by the holding portion 202, the view of the camera device 300 is located at the center of the refrigeration chamber. It is thus, possible to capture the image of substantially the entirety of the fridge interior. The center of the refrigeration chamber is established when the camera device 300 is installed in the holding portion 202. Thus, when correcting image distortion in the image processing, the center position of the subject of correction coincides with the center position of the image. As a result, equal amount of correction can be applied centering on such center position in correcting the distortion, thereby reducing the computation load in the image processing.

The door pocket 200 is provided with the magnet 206 serving as the target of detection of the magnetic sensor 311. It is thus, possible to allow the camera device 300 to identify the place of its installation.

The refrigerator 1 is provided with the vegetable chamber 4, etc. However, the vegetable chamber 4 is not provided with a door pocket and is formed in the shape of a box. Thus, the camera device 300 may become covered by vegetables, etc. stored therein when simply installed in the vegetable chamber 4. Thus, the camera device 300 may be installed in the vegetable chamber 4 by using a refrigerator holder 400 provided with a holding portion 401 for holding the camera device 300. The holding portion 401 is provided with an engagement portion 402 for engaging the holding portion 401 on the edge, etc. of the vegetable chamber box 4c. It is thus, possible to install the camera device 300 in the upper side of the vegetable chamber 4 and in the door 4a side to allow an image of the vegetable chamber to be captured without being covered by vegetables, etc. Because the holding portion 401 is engaged by the engagement portion 402, the holding portion 401 can be readily removed when not needed.

Because the magnet 405 is also provided on the refrigerator holder 400, the camera device 300 is allowed to judge where it has been installed as described above. The effects of the home appliance network system 500 and the in-fridge image displaying program are the same as those of the first embodiment.

Third Embodiment

Next, a description will be given on a third embodiment with reference to FIGS. 30 to 35. Elements that are substantially identical to those of the first and the second embodiments will be identified with identical reference symbols.

First, a description will be given on the functionalities of a refrigerator of the present embodiment with reference to FIG. 30. The refrigerator 700 is provided with a control block 701 (control unit), an image capturing block 702 (image capturing unit, a lighting block 703 (lighting unit), opening detection block 704 (door opening detection unit), opening degree detection block 705 (opening degree detection unit), illuminance detection block 706 (illuminance detection unit), communication block 707 (communication unit, notifying unit), etc. The blocks are identified by their functionalities as various combinations are conceivable for realizing each block and a single element may be used in multiple functional blocks, etc.

The control block 701 is configured by a microcomputer provided with a CPU 701a, a ROM 701b, a RAM 701c, etc. The control block 701 implements the storage amount estimating portion 708 by a software configuration, that is, a computer program executed by the CPU. The storage amount estimating portion 708 is configured to estimate the amount of items stored in the fridge interior (amount of food stored. Not only the gross amount but also the number of eggs stored in a dedicated case, amount of liquid remaining inside a PET bottle, etc.) based on information detected by each of the blocks. The present embodiment is described based on an assumption that the main-control portion 30 (see FIG. 4) of the refrigerator 700 serves as the control block 701; however, the control portion 50 of the camera device 18 side may be employed instead or the two control portions 30 and 50 may work together.

The image capturing block 702 is configured to capture an image of the interior of the storage chamber, etc. The present embodiment is described based on an assumption that the image capturing block 702 is fixed on the door of the refrigerator 700 as was the case in the camera device 18 (see FIG. 4) of the first embodiment. The image capturing block 702 may be identical in configuration to the camera device 18. The image capturing block 702 may alternatively be configured so that image capturing is controlled directly by the main-control portion 30 without providing the control portion 50 in the camera device 18 side. Still alternatively, the camera device 300 (see FIG. 15) of the second embodiment may be employed so that the image capturing block 702 is configured to be detachably attached to the refrigerator 702.

The lighting block 703 is configured to light the fridge interior. The present embodiment is described with an assumption that the lighting block 703 is implemented by components substantially identical to the ceiling light 13 (see FIG. 4) serving as the in-fridge lighting and the image capturing light 19 (see FIG. 4) dedicated for image capturing. The lighting block 703 may be provided with other in-fridge lighting such as the side light 36 (see FIG. 4).

The opening detection block 704 is configured to detect the opening of the door and comprises a switch provided with a movable piece which is moved by being pressed by the door and a contact point which works in conjunction with the movable piece. The ON/OFF state of the opening detection block 704 also serves as the basis of judgment for turning the in-fridge lighting ON and OFF. The in-fridge lighting is turned ON when the opening detection block 704 is turned ON. The in-fridge lighting is turned OFF when the opening detection block 704 is turned OFF. The ON/OFF of the opening detection block 704 indicates the opened/closed status of the door and does not necessary indicate the status of the contact point.

The opening-degree detection block 705 is configured to detect the degree of opening of the door and for example detects the rotational angle (with the closed state indicating 0 degrees). of the door when employing a door revolving about a hinge as is the case in the door 3a of the refrigeration chamber 3 as illustrated in FIG. 2. The opening-degree detection block 705 detects the amount being drawn out in case of the drawer type door 4a, etc. of the vegetable chamber 4. The rotational angle may be detected by an angle detector (such as a rotary encoder, etc.) and the amount being drawn out may be detected by a distance detector (such as a laser range finder, etc.). The degree of opening may be detected by the illuminance block based on the variation of illuminance of the fridge interior having been measured and recorded in advance through experiment. The opening-degree detection block 705 may be provided in the storage chamber in which the image capturing block 702 is to be provided.

The communication block 707 is configured to transmit the captured image information to external components and may be configured like the communication portion 52 (see FIG. 4) of the first embodiment or the communication module 306 and communication device 501 (see FIG. 21) of the second embodiment for example depending upon the requirements of the image capturing block 702. For example, the image capturing block 702 may employ the communication module 306 when the main-control portion 30 of the refrigerator 700 is configured to directly control the image capturing block 702.

Next, a description will be given on an example of capturing an image of the storage chamber 709 (such as a refrigerator chamber) which is opened/closed by a single door (rotary type).

As illustrated in FIG. 31A, the storage chamber 709 is opened/closed by a door 710 and the image capturing block 702 is provided the fridge interior side of the door 710. The image capturing block 702 is located on the opening end side (the end in the opposite side of the hinge) of the door 710 of the storage chamber 709 so as to be located substantially in front of the storage chamber 709 when the door 710 is closed. The storage chamber 709 contains the lighting block 703 (such as the ceiling light 13), the opening detection block 704, and the illuminance detection block 706, etc.

In the present embodiment, image capturing is carried out by the image capturing block 702 when the door 710 in the closed state is opened. The refrigerator 700 is thus, capable of capturing the image of the fridge interior when the door 710 is opened, that is, when there is a possibility of the storage amount being changed. The image capturing block 702 is capable of capturing an image of the door 710 not only when the door 710 is in the opened state (when the door 710 is stationary) but also when the door 710 is being opened (when the door 710 is moving). That is, the image capturing block 702 is capable of image capturing at any timing from the period when the door 710 is opened (including the closed state immediately before the door is opened) from the closed state until the door 710 is closed again (including the state immediately after the door is closed). It is to be noted that "change in the amount of storage items" includes "new storage items being added".

The opening detection block 704 is turned OFF when the degree of opening (rotational angle in this case) of the door 710 is less than a predetermined amount. The when the door 710 is only slightly opened as illustrated in FIG. 31B, the opening detection block 704 is turned OFF. The opening-degree detection block 705, however, detects the rotational angle of the door 710 even when the door 710 is in such state. Thus, it is detected by the opening-degree detection block 705 that the rotational angle of the door 710 is no longer 0 degrees and that the door is actually slightly opened. That is, it is judged based on the judgment result of opening-degree detection block 705 that image capturing timing of refrigerator 700 of the present embodiment has been established.

The fridge interior is expected to be dark (illuminance is low) in such state since the in-fridge lighting is not turned on and only little amount of light is taken in from the fridge exterior because the degree of opening of the door 710 is small. It is difficult to check the fridge interior when the illuminance is low since the captured image is also dark.

Thus, the refrigerator 700 secures light intensity by turning the lighting block 703 on when the door 710 is opened by an opening degree which is less than a predetermined amount (rotational angel θ1 in FIGS. 31A-31F). It is thus, possible to check the status of the fridge interior from the captured image. The lighting block being turned on in such case is expected to be the image capturing light 19. The in-fridge lighting may be turned on instead of the image capturing light 19 (when the image capturing light 19 is not provided for example).

The opening detection block 704 is turned on when the degree of opening of the door 710 is equal to or greater than the predetermined amount (rotational angel θ1) as indicated in FIG. 31C, meaning that the fridge interior is brightened.

The refrigerator 700 captures an image of the fridge interior when the degree of opening of the door 710 becomes equal to or greater than a predetermined amount. It is thus, possible to capture bright images of the fridge interior.

When the refrigerator 700 is operating in the power save mode, the light intensity of the in-fridge lighting being turned on may be reduced compared to normal lighting. The opening detection block 704 is turned on when the door 710 is somewhat opened and thus, some amount of light can be expected to enter the fridge interior from the fridge exterior. Thus, image capturing carried out when the opening detection block 704 is turned on will allow image of the fridge interior to be captured while utilizing exterior light. It is thus, possible to capture clear images even when power save mode is specified.

The purpose of capturing images of the fridge interior is to check the status of the fridge interior. Thus, it is not desirable to capture unclear images of the fridge interior (or transmit such images) which will not allow the status of the fridge interior to be checked.

Thus, the illuminance detection block 706 may be configured to detect the illuminance of the fridge interior and image of the fridge interior may be captured when the illuminance becomes greater than a predetermined reference value. It is possible to prevent capturing of unclear images by specifying the predetermined reference value to an illuminance that would allow the status of the fridge interior to be visible and checked. The results of detection of the illuminance detection block 706, the opening detection 704, and opening-degree detection block 705 may be combined. For example, illuminance of the fridge interior may not be enough even if the door 710 is opened by sufficient degree of opening. In such case, image may be captured provided that the door 710 is opened and sufficient illuminance has been obtained. If sufficient illuminance has been obtained even if the opening detection block 704 is turned off (however, the status detected by the opening-degree detection block 705 needs to be "open"), image may be captured without turning the illumination block on.

When the door 710 is further opened, for example when the degree of opening is less than 90 degrees as illustrate in FIG. 31D, approximately half of the view of the image capturing block is expected to be occupied by the image of the fridge interior. When the degree of opening is 90 degrees as illustrate in FIG. 31E, most of the view of the image capturing block is expected to be occupied by the image of the fridge exterior. An image captured in such state will carry information unnecessary for the user who wish to check the status of the fridge interior.

Thus, the refrigerator 700 may be configured to capture an image of the fridge interior when the degree of opening of the door 710 is less than 90 degrees. It is thus, possible to capture an image containing large amount of information of the fridge interior. It may be possible to capture an image of the fridge interior even when the degree of opening of the door 710 is greater than 90 degrees when for example, a wide-angle lens is used or when the image capturing block 702 is located close to the hinge (the center of rotation). In such case, image capturing may be carried out when the degree of opening falls within the range capable capturing an image of the fridge interior.

The door 710 is opened/closed by the user and thus, the user is expected to appear in the view of the image capturing block 702 when the degree of opening of the door 710 is near 90 degrees (or when 90 degrees has been exceeded) as illustrated in FIG. 31F. Thus, image may be captured by design even when the degree of opening of the door 710 is greater than 90 degrees. As a result, it will become possible to check the user (complexion, etc.) for example or check up on the how the user's child at home is doing from a remote location, thereby allowing use as a part of a baby-sitting system. That is, the image capturing unit may be configured to be capable of capturing images fridge exterior (periphery of the refrigerator 700) in addition to the fridge interior. Whether to allow image capturing beyond 90 degrees may be optional and the predetermined angle is not limited to 90 degrees.

The illuminance block may be provided on the fridge exterior side of the door so that light on the outside can be detected. When capturing an image of the fridge exterior, the illuminance sensor may be configured to detect whether the light of the room is turned off and if turned off, the lighting block may be turned on. Especially when the front surface of the door is made of glass, a hole may be opened on the frame forming the end portion of the door so that light enters the illuminance detection block disposed inside the door through the hole.

<Layout Example 1 of Image Capturing Block>

When the door 710 is slightly opened as illustrated in FIG. 32A, the in-fridge lighting or the image capturing light may be turned on, etc. when the degree of opening is configured to be detected by the opening-degree detection block 705 as described above. However, since the in-fridge lighting will not be turned on in the absence of the opening-degree detection block 705 for example, the brightness of the fridge interior may be in sufficient for image capturing.

Thus, the image capturing block 702 may be provided in the opening end side of the door 710 where intrusion of exterior light is accelerated instead of the central portion of the door 710 as described above. The location where intrusion of exterior light can be accelerated is located toward the opening side of the door from the central portion of the door, more preferably within ⅓ of the lateral length of the door taken from the opening end, and even more preferably within ¼ of the lateral length of the door taken from the opening end. It is thus, possible to accelerate the intrusion of exterior light into the view of the image capturing lens and facilitates increasing of light intensity. The image capturing block 702 is disposed so that its view is oriented from the door 710 to the fridge interior. Thus, light coming in through small gaps formed in the door 710 enters the fridge interior from the rear side of the image capturing block 702 and thus, does not create a back light. It thus, possible to capture clear images of the fridge interior.

As illustrated in FIG. 32B, the image will contain increasing amount of information of the fridge exterior as the opening angle of the door 710 approaches 90 degrees. Thus, image capturing may be carried out while the opening angle of the door is less than 90 degrees if the main purpose of image capturing lies in capturing image of the fridge interior. If application to a baby-sitting system for example is intended, image capturing may be carried out when the door is opened at an angle beyond 90 degrees.

A dedicated camera may be provided for capturing the image of the fridge exterior. In such case, if the front surface of the door is made of a glass plate, a portion of the color coating applied on the back side of the glass plate may be made transparent so that an image of the fridge exterior can be captured through the transparent portion using the camera provided inside the door.

<Layout Example 2 of Image Capturing Block 2>

The image capturing block 702 may be provided in the hinge side of the door 710 as illustrated in FIG. 33A. In such case, the view of the image capturing block 702 will transverse the fridge interior as the door 710 is opened to allow an image of substantially the entire range of the fridge interior to be captured as illustrated in FIGS. 33B and 33C.

Further, the location of the image to be captured when the door 710 is opened may be predetermined. For example, an image may be captured when the door 710 has been opened to an angle in which the view of the image capturing block 702 is located substantially at the center of the refrigerator 700 as illustrated in FIG. 32B. That is, when the image capturing block 702 is provided in the hinge side, it is possible to capture greater range of image of the fridge interior (for example, the range in which the amount of information pertaining to the fridge interior within the image becomes greater than the amount of information pertaining to the fridge exterior within the image) and thereby improve the flexibility of the timing of image capturing.

Thus, multiple images may be captured during the opening of the door 710. That is, images of different views may be captured. In such case, the rotational angle may be detected by the opening degree detection block 705 and images may be captured whenever the predetermined rotational angles have been reached. Alternatively, images may be captured at predetermined time intervals while the rotational angle is changing after opening of the door 710 has been detected. An image capturing block 702, capable of capturing moving images, may be employed. In such case, moving images may be captured while the door 710 is opened and multiple images (stationary images) may be extracted from the moving images. It is possible to check the status of food, etc. hiding behind other items by capturing multiple images, that is, by capturing multiple images taken from different view within the fridge interior.

It is further possible to compensate for the range of image which could not be captured in one image by another by combining multiple images into one complete image. It is thus, possible to check the status of the fridge interior in more detail. It is further possible to obtain a three-dimensional image by combining images captured in different views.

The image capturing block 702 may be provided on both the opening end side described in LAYOUT EXAMPLE 1 and the hinge side described in LAYOUT EXAMPLE 2 to compensate for the views of one another. In such case, the image capturing block 702 in the opening end side captures greater amount of an image of the fridge exterior as the rotational angle becomes greater. Thus, the image capturing block 702 in the opening end side and the image capturing block 702 in the hinge side may be configured to capture images of different rotational angles. Of note is that capturing multiple images includes capturing one image by each of the image capturing blocks 702 while the door 710 is being opened.

<Example of Estimating Storage Amount>

Next, a description will be given on the method of estimating the storage amount of the storage items.

For example, by performing image processing, etc. (such as color recognition and extraction of luminance difference) on a single image of the fridge interior captured from the front side using a storage amount estimating portion 708, it is possible to estimate the storage amount by obtaining the percentage that the storage items occupy in the entire space of the fridge interior.

It is possible to know the storage amount (the remaining amount in the following description) more precisely by estimating the storage amount based on multiple images.

For example, when estimating the remaining amount of a drink, etc. in a container (such as a PET bottle 720, etc.) in the storage chamber 709, the PET bottle 720 located substantially in the front side of the image capturing block 702 as illustrated in FIG. 34A for example will be deemed to have large amount remaining since the image captured from the front side (the direction indicated by arrow Y1) indicates a large amount of drink remaining (as schematically indicated by hatching) in the PET bottle 720 as illustrated in FIG. 34B. However, the actual amount remaining in the PET bottle 720 is small as illustrated in FIG. 34C viewed from the direction indicated by arrow Y2. Because the PET bottle 720 being placed on another item 721 is further slanted, the remaining amount in the PET bottle 720 may be improperly estimated to be large when the image captured from the front side is relied upon.

By capturing images from a different view (from the direction indicated by arrow Y3) when the door 710 is opened as illustrated in FIG. 34D and performing image processing of the captured image, it is possible to obtain an image viewed from the lateral direction as illustrated in FIG. 34E. It possible to know that remaining amount is actually becoming smaller when the remaining amount is estimated based on such image captured from the lateral direction.

In another example, when an image of the egg container 722 is captured substantially from the front side as illustrated in FIG. 35A, it may not be possible to determine whether there are any eggs 723 remaining in rows behind the eggs 723 in the forwardmost row. It is thus, possible to check the status in the back rows that is the actual amount of eggs 723 remaining by utilizing the image captured from a different view such as from the oblique direction as illustrated in FIG. 35B.

It is possible to estimate the remaining amount of a specific item in addition to the gross storage amount by capturing multiple images. It is further possible for the user to visually check the remaining amount by capturing images from different angles. It is further possible to check the portions which cannot be seen by the eye of the user from the front side by capturing images from different angles. It is thus, possible for the user to know the status of locations where the user will not be readily be aware of such as locations hidden behind other items when the user sees the fridge interior from the front side. For items such as the egg container 722 which is basically fixed to a specific location, the image capturing timing may be controlled so that the image capturing block 702 captures an image when located at a rotational angle in which an image of the back rows of the egg container 722 can be captured from the oblique direction. Alternatively, the image captured from such rotational angle may be extracted from a moving picture.

An image may be captured when the door 710 is closed. As a result, an image may be captured when the door 710 is opened when there is a possibility that the amount of food storage may change, then an image may be captured when the door 710 is closed. It is possible to detect the change in the storage amount by comparing these images. It is thus, possible to precisely detect the change in the storage amount.

An image may be captured at the moment when the door 710 is opened such as when an oscillation of the door 710 has been detected or when the degree of opening detected by the opening-degree detection block 705 has started to change, etc. Since it is basically not possible for the storage amount to change when the door 710 is neither opened/closed, images of the fridge interior may be captured periodically while the door 710 is closed. The latest image captured just before the door is opened may be compared with the image captured after the opened door 710 has been closed to detect the change in the storage amount or estimate storage amount.

The change in the storage amount may be notified to the user through the communication block 707. More specifically, supplementary information indicating that the storage amount has changed may be appended to the image information to be transmitted. The possible destination of such notification may be the so-called smart phone or tablet PC of the user, TV at user's home, etc.

Multiple image capturing blocks 702 may be provided in different locations in
the left and right or up and down locations. Images may be captured by working together with the camera device 300 for example installed in the fridge interior. Capturing images from different angles to check the remaining amount of storage items may be achieved by disposing multiple cameras (image capturing blocks) on different walls (such as the door and the sidewall) and capture an image using each of the cameras to capture multiple images as whole.

Fourth Embodiment

Figure 36A:
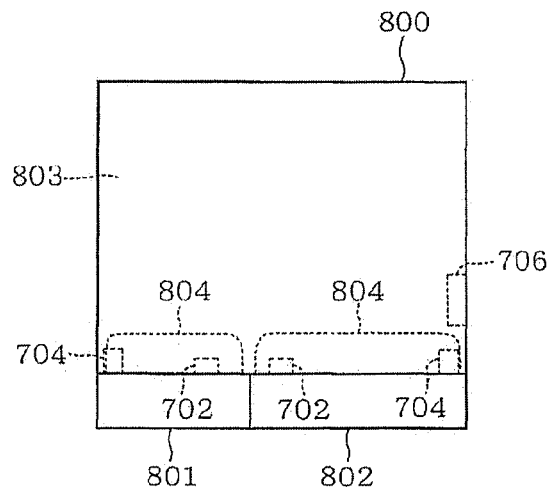

Next, a description will be given on a fourth embodiment with reference to FIGS. 36 to 39. In the fourth embodiment, a description will be given on an example in which a single storage chamber is opened/closed by two doors. The basic configurations of the functional blocks are identical to those of the third embodiment.
<Example 1 of Multiple Doors>
As illustrated in FIG. 36A, the refrigerator 800 of the present embodiment is structures so that a single storage chamber 803 (such as a refrigerator chamber) is opened/closed by a left-side door 801 and a right-side door 802 disposed next to one another in the left and right. The image capturing block 702 is provided on the opening end side of each of the left-side door 801 and the right-side door 802.

The image capturing block 702 of the right-side door 802 is provided in the opening end side and substantially at the central portion as viewed in the left and right direction of the refrigerator 800. Each of the doors are provided with one or more door pockets 804.

The effect of providing the image capturing block 702 to either of the doors has been explained in the third embodiment. Thus, the effect of providing the image capturing block 702 to each of the doors will be described hereinafter.

As illustrated in FIG. 36A, by providing the image capturing block 702 to each of the doors, it is possible to compensate for the image falling outside the view of one image capturing block 702 by the other image capturing block 702. As a result, it is possible to capture an image of a portion outside the view of one image capturing block 702 or an image of a location which is blocked by other storage items in the view of one image capturing block 702 by the other image capturing block 702 and thereby allow the status of the fridge interior to be checked in more detail.

Figure 36B:
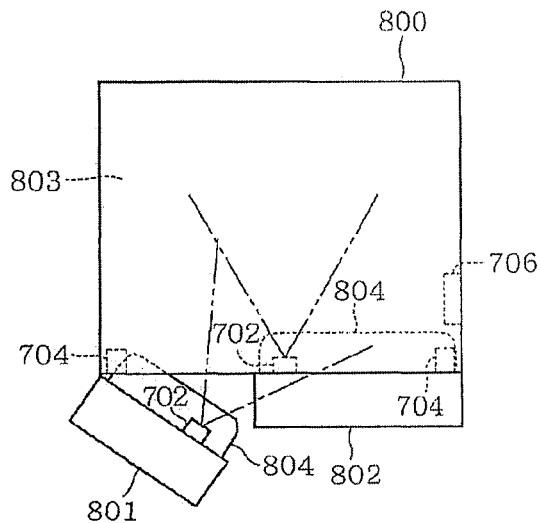

As illustrated in FIG. 36B, by capturing an image when opening the left-side door 801 for example, it is possible to capture an image of the storage items stored in the door pocket 804 in the right-side door 802 which is outside the view when the left-side door 801 is closed. In such case, it is possible to capture a relatively wider image of the door pocket 804 of the right-side door 802 by providing a recess (see recess 16 illustrated in FIG. 2) as was the case in the first embodiment to the vertical plate (see a vertical plate 15 illustrated in FIG. 2) of the right-side door 802. Similarly, it is possible to capture a relatively wider image of the left-side door 801 by providing a recess to the vertical plate of the left-side door 801.

It is possible to obtain images captured from different views such an image captured from the front side, an image captured from the lateral side (or from the oblique direction), etc. as described in the third embodiment by capturing images by the image capturing blocks 702 of the left-side door 801 and the right-side door 802 at the same timing. Because the locations of the image capturing blocks 702 are distanced from one another, there is a significant difference in the views provided by each of the image capturing. It is thus, possible to perform more precise detection of storage amount illustrated in FIGS. 34 and 35, etc. as compared to the image capturing carried out by a single image capturing block 702.

Figure 36C:
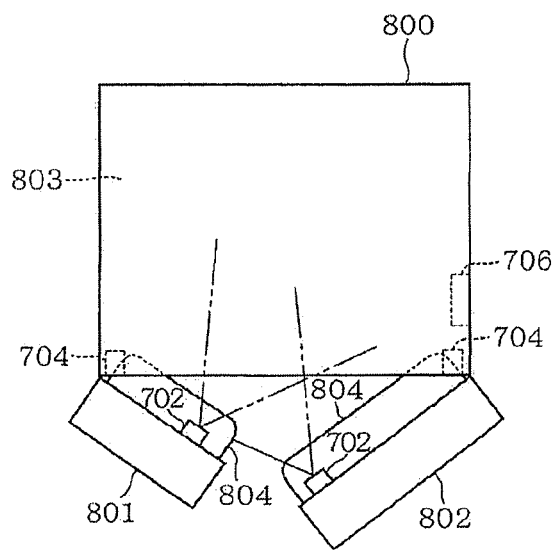

Further, as illustrated in FIG. 36C, it is possible to capture an image of substantially the entirety of the fridge interior by capturing images with both of the doors opened.

Figure 36D:
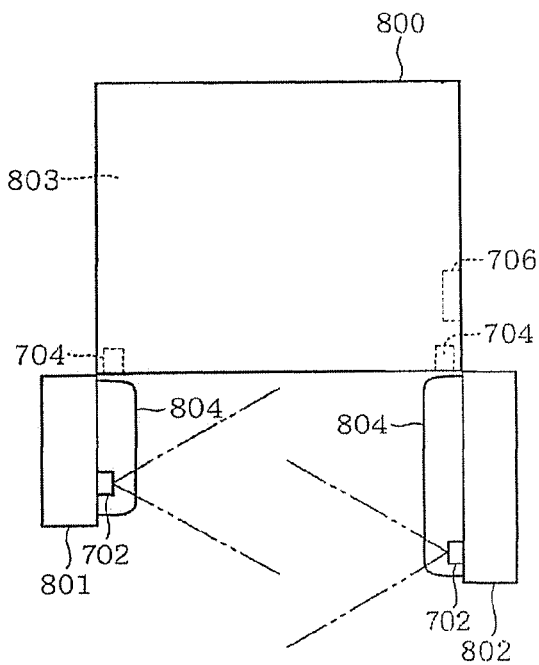

By capturing images when each of the doors are opened to 90 degrees, as illustrated in FIG. 36D, it is possible to capture images of the door pockets 804 from their front sides. By using the image of the fridge interior and the images captured for door pockets 804, it is possible to create a synthetic image of the refrigerator 800 seen from the front side as illustrated in the later described FIG. 28 that is, an image reflecting the state normally seen by the user.

By providing the image capturing block 702 at each of the doors for opening/closing the storage chamber, it is possible to capture an image of the range, which could not be captured by one image capturing block 702, by the other image capturing block 702.

At this instance, since the images are captured by multiple image capturing blocks 702, it is not necessary for each of the image capturing blocks 702 to employ a wide-angle lens. As a result, it is possible to reduce occurrence of image distortions. It is further possible to reduce the burden of processes such as distortion correction, image synthesis, estimation of storage amount, etc. by reducing occurrence of image distortions. It is possible to suppress battery consumption especially when image processing is carried out by the camera device 300 described in the second embodiment.

As illustrated in FIG. 37A, each of the image capturing blocks 702 may be equally distanced from the hinge side by distance L1 (the distance from the side surface of the refrigerator 800). That is, the image capturing blocks 702 may be disposed so that the center of the view of each image capturing block 702 is located at the central portion of the refrigerator 800 when the doors are opened by the same angle. By combining the images captured by the image capturing blocks 702 located at the same rotational angle, it is possible to obtain a synthesized three-dimensional image (readily recognizable by the user) as seen from the front side of the refrigerator 800 since the center of the synthesized image is located at the center of the refrigerator 800. As illustrated in FIG. 37B, one of the image capturing blocks 702 (of the left-side door 801 for example) may be provided in the opening end side and the other of the image capturing blocks 702 (of the right-side door 802 for example) may be provided in the hinge side. Further, as illustrated in FIG. 37C, the view of the image capturing blocks 702 may be slanted with respect to the doors.

<Example 2 of Multiple Doors>

In EXAMPLE 2, the refrigerator 810 is configured so that independent storage chambers 814A to 814D partitioned by a partition plate 813 are opened/closed by a left-side door 811 and a right-side door 812 disposed adjacent to one another as illustrated in FIG. 38A. Each of the doors open/close multiple and independent storage chambers 814A, 814B and 814C, 814D, respectively. Each door is provided with image capturing blocks 702 for capturing images of the independent storage chambers 814, respectively as also illustrated in FIG. 38B. The storage chamber 814C contains a shelf 815. In order to capture images of the upper side and the lower side of the shelf 815, two image capturing blocks 702 are provided in the corresponding locations of the right-side door 812 for opening/closing the storage chamber 814C. It is thus, possible to capture images of the fridge interior. The advantages achieved by capturing the images of the fridge interior are the same those described in the first embodiment. The advantages achieved by capturing images when the doors are opened are the same as those described in the third embodiment.

Further, as illustrated in FIG. 39A, the left-side door 811 may be configured to open/close multiple and independent storage chamber 814A and 814B while the right-side door 812 is configured to open/close a single independent storage chamber 814E. When storage containers 816 are provided inside the storage chamber 814E, the image capturing blocks 702 may be provided as many as the number of storage containers 816 as illustrated in FIG. 39B to allow the images of the storage containers 816 to be captured. It is possible to obtain the advantages similar to those described in EXAMPLE 1 by the refrigerator 810 configured as described above. The refrigerator 810 may also be configured to provide the image capturing blocks 702 in the hinge side and the opening end side as was the case in the third embodiment.

Fifth Embodiment

A description will be given hereinafter on a fifth embodiment with reference to FIGS. 40A to 42C. The fifth embodiment will be described through an example of a storage chamber which is opened/closed by a drawer type door. The basic configuration of the functional blocks are identical to those of the third embodiment.

The refrigerator 1 illustrated in FIG. 2, for example, is provided with a storage chamber which is opened/closed by a drawer type door 4a as provided in the vegetable chamber 4. Some chambers such as the vegetable chambers 4, may not be provided with an in-fridge lighting and thus, there may not be enough light intensity for capturing clear images for the same. Thus, by capturing an image when the door is opened, it is possible to carry out image capturing at a timing when there is a possibility of the storage amount being changed, while also being allowed to utilize exterior light coming into the chamber when the door is opened.

<Layout Example 1 of Image Capturing Block>

As illustrated in FIGS. 40A-40C, a storage chamber 901 of a refrigerator 900 is provided with a drawer-type door 902, a storage container 903 being drawn out with the door 902, a shelf 903a which is basically fixed unmovably, an image capturing block 702, a lighting block 703, and an illuminance detection block 706 (not illustrated) configured as one with the image capturing block 702. The image capturing block 702 is installed so that the center of its view is slanted with respect to the direction in which the door 902 is drawn. It is assumed in the present embodiment that the lighting block 703 is dedicated for image capturing.

When the door 902 is drawn out as illustrated in FIG. 40B, the illuminance of the chamber interior is increased by the incoming external light. It is thus, possible to obtain an image allowing the chamber interior to be checked by capturing the image at the timing when the incoming light is detected by the illuminance detection block 706.

When the door 902 is drawn out by a significant amount as illustrated in FIG. 40C, almost the entirety of the storage container 903 is exposed to external light and thus, allows capturing of clear images. Thus, an image may be captured when the illuminance detected by the illuminance detection block has exceeded a predetermined reference value. The lighting block 703 may be illuminated when the illuminance has not exceeded the predetermined reference value.

Further, since the view of the image capturing block 702 changes with respect to the shelf 903a as the door 902 is drawn out, it is possible to capture images of the storage items from different views as described earlier. The shelf 903a may be configured to move when the storage container 903 has been fully drawn out. The shelf 903a may be configured as an upper container located above the lower container and being configured to move by sliding along the upper end portions of the left and right sidewalls of the lower container.

The opening-degree detection block 705 may be provided for detecting the degree of opening (the amount being drawn in the present embodiment) of the door 902 and an image may be captured based on the degree of opening, that is, when the degree of opening of the door 902 has exceed a predetermined amount. The door 902 is expected to be opened during night time, etc. when the room light is not turned on. Thus, both the opening-degree detection block 705 and the illuminance detection block 706 may be employed. The lighting block 703 may be illuminated when an image is captured with the door 902 being closed for the purpose of detecting the change in storage amount.

Advantages similar to those achieved in the third embodiment may be achieved when opening/closing the storage chamber 901 by a drawer-type door 902.

The lighting block need not be dedicated for image capturing but may be used for as an in-fridge lighting as well.

<Layout Example 2 of Image Capturing Block>

In EXAMPLE 1, the image capturing block 702 is provided at the drawer-type door 902. Alternatively, the image capturing block 702 may be provided on an undersurface side of a door 910 located above the drawer-type door 902 as illustrated in FIGS. 41A-41C and so as to be capable of capturing an image of the interior of the drawn out storage container 903 as illustrated in FIG. 41B. As a result, exterior light is introduced to illuminate the interior of the storage container 903 when the door 902 is drawn out to allow image capturing to be carried out. Exterior light is introduced from the back side of the image capturing block 702 and thus, will not create back light.

When taking food, etc. in and out of the drawer-type storage chamber 901 the storage container 903 is generally expected to be drawn out until the intended location is exposed. Stated differently, the area near the location immediately below the image capturing unit 702 provided at the door 910 located above the storage container 903 is expected to be the location where food, etc. is taken in and out. Thus, the storage amount is expected to change in that location. It is thus, possible to detect the change in the storage amount more easily by providing the image capturing block 702 at the door 910 disposed above such location.

As for the lowermost drawer-type storage chamber 904 illustrated in FIG. 42A-42C, the image capturing block 702 may be provided so as to be oriented downward at a partition plate 905, etc. disposed between the storage chamber 901 and the storage chamber 904 as illustrated in FIG. 42A. By providing the image capturing block 702 in the opening side of the storage chamber 904 toward which the door 906 is drawn out (that is, in the door 906 side), it is possible to secure light intensity while facilitating the detection of change in storage amount as was the case in the image capturing block 702 for the storage chamber 901 illustrated in FIG. 42C.

When the door 902 of the storage chamber 901 is drawn out, the door 902 is moved away from the body of the refrigerator 900. Thus, it becomes difficult to establish a wire connection with the image capturing block 702. Thus, by providing the image capturing block 702 at the partition plate 905 it becomes possible to establish wire connection with the image capturing block 702 since the image capturing block 702 will not be moved away from the body of the refrigerator 900. The revolving door 910 described earlier is wired to the control panel through the hinge portion and thus, is relatively easier to establish wire connection with the image capturing block 702.

As illustrated in FIG. 43, an image capturing unit may be provided to a storage chamber 930 (hereinafter referred to as a cooking chamber for convenience of explanation) having a cooking feature. The cooking chamber is provided with a heating unit (cooking unit) such as a magnetron 931 and is provided with a cooking feature such as the so-called microwave oven feature. The cooking chamber is opened/closed along with storage containers and shelves (not illustrated) provided therein by a drawer-type door or a revolving door for example. Thus, by providing the image capturing block 702 on an upper partition plate 933, it is possible to capture an image of the chamber interior (including cooked food placed in the storage container and placed on the shelves) when the door 932 is opened.

The storage chamber 903 is surrounded by iron plate, etc. in order to suppress radiation of noise while the cooking feature is being used. Thus, if the image capturing block is configured to transmit image information over wireless communication, a control may be executed to: inhibit wireless communication when the cooking process is ongoing (when magnetron is driven); make multiple transmissions in anticipation of errors occurring from noise; time the transmission to take place after the cooking process has been completed. Though the door 932 will not be opened while the magnetron is driven, image capturing may be carried out while the cooking process is ongoing in order to check the cooking status or when the door 932 is opened after the cooking process has been completed in order to record the cooked food.

When transmitting images captured by a camera located outside the chamber, the number of times the refrigerator door was opened/closed, error information, etc. to external components over wireless communication (such as Bluetooth (registered trademark), WiFi, etc.), the transmission may fail by interference of microwaves. Thus, wireless transmission is preferably carried out while the magnetron is stopped. Image capturing instructions given to the camera while the magnetron is being driven are preferably retrieved again or resent after the magnetron has been stopped. Further, the wireless communication unit may be disposed outside the storage chamber (the above described cooking chamber) surrounded by an iron plate, etc. and being irradiated by microwaves discharged by the magnetron. As a result, image information, etc. may be readily transmitted to exterior components. The same is applicable when transmitting the detection result of a weight sensor which may be communicated by wire communication or wireless communication to external components or to the control portion of the refrigerator.

Sixth Embodiment

A description will be given hereinafter on a sixth embodiment with reference to FIGS. 44 to 55. Elements that are identical to those of the first embodiment are identified with identical reference symbols and are not described in detail. Appropriate image capturing timing may be employed from those exemplified in the foregoing embodiments.

A refrigerator 1 of the present embodiment is provided with a camera unit 1000 serving as an image capturing unit as illustrated in FIG. 44. The refrigerator 1 is connected to a home appliance network system 100 (see FIG. 1) as was the case in the first embodiment. The refrigerator 1 may be connected to the home appliance network system 100 by wireless communication method or by wire communication method as was the case in the first embodiment. PLC (Power Line Communication) is employed in the present embodiment. PLC is a wire communication method in which communication is performed through a power line configured to supply power to the refrigerator 1. A description will be given hereinafter on the places where the camera unit 1000 may be mounted with some examples.

Example 1

Camera unit 1000 of EXAMPLE 1 is provided on the door of the refrigerator 1. The camera unit 1000 is provided at a location capable of capturing an image of the central portion of the refrigeration chamber 3 interior for example. More specifically, the camera unit 1000 is provided on the right-side door 3*b* configured to open/close the refrigeration chamber 3 (storage chamber) which is the target of image capturing so as to be disposed at a location substantially at the vertical and lateral a center of the refrigeration chamber 3. As illustrated in FIGS. 45A and 45B, the camera unit 1000 is shaped substantially like a cuboid containing a camera module 1003 (one example of an image capturing module) in a space surrounded by a camera case 1001 (one example of a protection case) and a bottom plate 1002.

The camera unit 1000 is further provided with a connection cable 1004 configured to establish connection with the refrigerator 1 side and a flange portion 1005 for securing the camera unit 1000. The connection cable 1004 is used for receiving supply of power from the refrigerator 1 side, for transmission of image capturing instructions to the camera unit 1000, and for acquiring the captured image data. The camera unit 1000 is mounted on the fridge interior side of the door 3*b* through the flange portion 1005. Thus, in EXAMPLE 1 and later described EXAMPLES 2 to 4, the connection cable 1004 is wired inside the door 3*b* and is connected to the main control portion 30 (see FIG. 4) of the refrigerator 1 through the door hinge.

As illustrated in FIG. 46, the camera module 1003 is provided with a substrate 1012 and a lens unit 1013 mounted on the substrate 1012. The substrate 1012 is provided with an image capturing element 1010 such as a CCD sensor and CMOS sensor and circuit components 1011, etc. serving as a peripheral circuit of the image capturing element 1010. The image capturing element 1010 of the present embodiment is shaped like a rectangle. The lengthwise direction of the image capturing element 1010 is oriented in the same direction as the lengthwise direction (up and down direction of FIGS. 45A and 45B) of the camera unit 1000. The substrate 1012 is provided with a lens holder 1014 at a location where the image capturing element 1010 is provided. A female thread is provided on the inner peripheral surface of the lens holder 1014. A male thread is provided on one end of the lens unit 1013 in the substrate 1012 side. The distance between the lens unit 1013 and the image capturing element 1010 is adjusted by screwing the lens unit 1013 into the lens holder 1014.

Lens unit 1013 is provided with multiple lenses 1015, three lenses in the present embodiment, and each of the lenses 1015 is held inside a body made of a resin material for example. The camera unit 1000 establishes a view angle of approximately 120 degrees by the three lenses 1015 to enable a wide angle image capturing of the fridge interior. Lens unit 1013 is provided with an infrared filter 1016 substantially limiting the light detected by the image capturing element 1010 to the range of visible light. Thus, the camera unit 1000 is capable of capturing images of the fridge interior in vivid colors when image is captured in color. The number of lenses 1015, etc. described herein is merely an example and may be changed depending upon the required view angle.

As illustrated in FIG. 44B, the camera case 1001 of the camera unit 1000 is potted with a potting material such as urethane resin or epoxy resin, etc. so that the entire camera module 1003 is potted. Further, as illustrated in FIG. 46, an O ring 1018 is provided in the outer peripheral side of the lens unit 1013. The space between the lens unit 1013 and the camera case 1001 is sealed by the O ring 1018. The potting material 1017 is not illustrated in FIG. 46.

Thus, the intrusion of water and moisture into the camera case 1001 from the front surface side of the lens unit 1013 is inhibited. The bottom plate 1002 side of the camera case 1001 is also sealed including the portion where the connection cable extends through. Thus, the camera unit 1000 is entirely water proofed or drip proofed while the camera module 1003 provided therein is also protected from dew condensate, etc.

As illustrated in FIG. 47A, the camera unit 1000 is mounted on the inner plate 14 of the right-side door 3*b*. The camera unit 1000 is mounted so that the view is directed toward the fridge interior when the door 3*b* is closed. Thus, the camera unit 1000 is capable of capturing the image of the refrigeration chamber 3 from the front side at a location substantially centered in the vertical direction and in the lateral direction of the refrigeration chamber 3 when the right-side door 3*b* is closed. That is, it is possible to capture an image of the fridge interior providing a view which is close to the view available to the user when the user normally uses the refrigerator 1 when the camera unit 1000 is used. The door pocket 9*b* located adjacent to the camera unit 1000 is provided with a notch 9*b*1 as was the case in the first embodiment so as not to significantly block the view of the camera unit 1000.

As illustrated in FIG. 47B, the camera unit 1000 is oriented vertically so that the lengthwise direction is taken along the up and down direction. Thus, lengthwise direction of the image capturing element 1010 inside the camera unit 1000 is also taken along the up and down direction. Thus, the camera unit 1000 and the image capturing element 1010 are formed substantially in a cuboid form that are sized differently in the vertical and lateral directions. It is thus, possible to capture a vertically elongate image of a vertically elongate space of the refrigeration chamber 3. That is, it is possible to capture an image of the fridge interior while utilizing the image capturing range of a vertically oriented image capturing element 1010.

Example 2

In EXAMPLE 2, the camera unit 1000 is mounted in a recess 1020 provided in the inner plate 14 side of the right-side door 3*b* as illustrated in FIG. 48. The camera unit 1000 is oriented in the vertical direction in EXAMPLE 2 as well. The recess 1020 is formed in a size capable of storing the entire camera unit 1000. The camera unit 1000 stored in the recess 1020 is disposed so as not to project in the fridge interior side relative to the inner plate 14. As a result, it is possible to prevent contact with the camera unit 1000 when taking a PET bottle, etc. in and out of the lowermost door pocket 10*b* (see FIG. 44) of the right-side door 3*b*.

Because the entire camera unit 1000 is stored in the recess 1020, the possibility of contacting the user's hands is reduced to consequently reduce the possibility of contaminating the lens 1015.

Further, the location of the camera unit 1000 is displaced toward the fridge exterior; that is, toward the front side of the refrigerator 1 as compared to EXAMPLE 1 described above. As a result, it is possible to capture an image of the interior of the refrigeration chamber 3 in a greater view.

A transparent cover member made of acryl for example may be provided for example in the opened side of the recess 1020 so as to be flush with the inner plate 14. It is thus, possible to prevent contamination of the lens 1050, etc. and accumulation of dust in the recess 1020.

Example 3

In EXAMPLE 3, the camera unit 1000 is disposed inside the inner plate 14 of the right-side door 3*b* as illustrated in FIG. 49. The camera unit 1000 is mounted so as to be oriented in the vertical direction in EXAMPLE 3 as well. Only the lens surface of the camera unit 1000 is exposed to the refrigeration chamber 3 side. Thus, it is possible to prevent the camera unit 1000 from interfering with a PET bottle, etc. being taken in and out of the door pocket 10*b*.

In EXAMPLES 1 to 3, it is possible to capture an image of the fridge interior from the front side of the refrigerator 1 providing a view which is close to the view available to the user when the user normally uses the refrigerator 1 as illustrated in FIG. 50A by mounting the camera unit 1000. It is thus, possible to check the status of the fridge interior from a remote location by displaying the captured image through the communication terminal 103 etc. via the home appliance network system 100.

Example 4

In EXAMPLE 4, the camera unit 1000 is provided on a vertical partition 17 (see FIG. 44) provided on the left-side door 3a. The vertical partition is provided on the end portion in the opposite side of the hinge portion 3d of the left-side door 3a as illustrated in FIGS. 51A and 51B. The vertical partition changes its orientation by the rotary mechanism 17a when the door 3a is opened as illustrated in FIG. 51A and when the door 3a is closed as illustrated in FIG. 51B. The vertical partition is located substantially in the lateral center of a double door (the so-called French door), that is, substantially at the central portion of the refrigeration chamber 3. When the left-side door 3a and the right-side door 3b are closed, the fridge interior and the fridge exterior are sealed by a gasket 1030 as illustrated in FIG. 52A.

As illustrated in FIGS. 52A and 52B, the camera unit 1000 is mounted on a mount plate 1032, disposed inside a vertical partition 17 filled with a heat insulating material 1031, so as to be oriented in the vertical direction. The camera unit 1000 is disposed substantially at the vertical center of the vertical partition 17. Thus, the camera unit 1000 is capable of capturing an image of the refrigeration chamber 3 from the front side from a location substantially centered in the vertical direction and in the lateral direction of the refrigeration chamber 3 in EXAMPLE 4 as well. The vertical partition 17 rotates as described above. Thus, when the left-side door 3a is opened, the camera unit 1000 faces away toward the opposite side of the opened side of the left-side door 3a as illustrated in FIG. 51A so that the camera unit 1000 is parallel with the left-side door 3a. As a result, it is possible to prevent the user from contacting the lens surface of the camera unit 1000 when the left-side door 3a is opened.

When the left-side door 3a is closed, the camera unit 1000 faces the fridge interior as illustrated in FIG. 51B. Thus, it is possible to capture an image of the fridge interior from the front side and substantially the central portion as illustrated in FIG. 53. If the door pocket 9a blocks the view of the camera unit 1000, a notch similar to the one provided on door pocket 9b may be provided on the door pocket 9a.

EXAMPLE 4 also allows an image of the fridge interior to be captured as illustrated in FIG. 50B as was the case in EXAMPLES 1 to 3.

Example 5

In EXAMPLE 5, the camera unit 1000 is mounted in a recess 1040 provided on a sidewall 3c of the refrigeration chamber 3 as illustrated in FIG. 54. In example 5, the camera unit 1000 is provided on each of the left and right sidewalls 3c. The camera unit 1000 may be provided only on one of the sidewalls 3c.

Recess 1040 is provided on the forward side of the sidewall 3c relatively closer to the door. A sloped mounting surface 1041 for mounting the camera unit 1000 is provided on the sidewall 3c. In EXAMPLE 5, the cross section of the recess 1040 is substantially triangular. As a result, the view of the camera unit 1000, when mounted in the recess 1040, is directed substantially to the center of the refrigeration chamber 3.

In EXAMPLE 5, image of the fridge interior is captured from both the left and right sides. As a result, an image of a portion which was blocked by food, etc. in one of the camera unit 1000 may be captured by the other camera unit 1000. As a result, it is possible to capture an image of the entire fridge interior without being interfered by food, etc. and thereby allowing the fridge interior to be checked in more detail. Further, it is possible to display the fridge interior three dimensionally by producing a three-dimensional image by combining the images captured from two directions.

The camera unit 1000, establishing a wired connection with other components, is mounted on the sidewall 3c. Thus, it is possible to wire the connection cable 1004 through the sidewall 3c to allow the connection cable 1004 to be routed easily to the main control portion 30 (see FIG. 4) provided in the rear surface side of the refrigerator 1.

Example 6

In EXAMPLE 6, an LED light 1050 serving as a lighting unit is provided at the camera unit 1000 as illustrated in FIG. 55A. The front side of the camera unit 1000 is covered by a protection cover 1051 in which at least the portion corresponding to the LED light 1050 is transparent. The interior of the camera case 1001 of the camera unit 1000 is potted by a potting material 1017 as was the case in the camera units 1000 in EXAMPLES 1 to 5.

The camera unit 1000 of the present embodiment is disposed so that the protection cover 1051 and a mounting surface 1060 provided on a front surface thereof are coplanar. In other words, the camera unit 1000 is stored in the storing portion. The mounting surface 1060 corresponds to the inner plate 14 of the door, the vertical partition 17, and the sidewall 3c, etc. The forwardmost surface of the lens unit 1013 is located forward relative to the mounting surface 1060.

The LED light 1050, disposed inside the camera case 1001, is displaced in the front and rear direction from the image capturing element 1010 as illustrated in FIGS. 55A and 55B. More specifically, the LED light 1050 is disposed forward relative to the image capturing element 1010. In the present embodiment, the displacement is achieved by implementing the image capturing element 1010 on the substrate 1012 and implementing the LED light 1050 on an LED substrate 1052 disposed forward relative to the substrate 1012.

The LED light 1050 is disposed close to the front surface of the camera unit 1000 to prevent the light irradiated from the LED light 1050 from directly entering the lens unit 1013 or the image capturing element 1010 inside the camera case 1001. The LED light 1050 is surrounded by an opened wall 1053 spreading toward the forward direction and is located rearward relative to the front surface of the lens unit 1013. The forwardmost surface of the lens unit 1013 is located forward relative to the mounting surface 1060. Thus, even when light is reflected off the protection cover 1051 protecting the front surface of the LED, the reflected light will not enter the lens unit 1013 directly.

When the camera unit 1000 configured in the above described manner is mounted at the locations exemplified in EXAMPLES 1 to 5, it is possible to capture an image of the fridge interior by illuminating the LED light 1050 without illuminating the in-fridge lighting 13, etc.

The protection cover 1051 of the camera unit 1000 may be disposed so as to be located inward (rearward) relative to the mounting surface 1060. In such case, the forwardmost surface of the lens unit 1013 may be coplanar with the mounting surface 1060 or inward relative to the mounting surface 1060. The location of the lens unit 1013 inside the camera unit 1000 may be adjusted so that the forwardmost surface of the lens unit 1013 is coplanar with the protection cover 1051. That is, the tip portion of the body of the lens unit 1013 may be coplanar with the protection cover 1051. As a result, the camera unit 1000 will not project into the fridge interior when mounted on the sidewall 3c of the refrigeration chamber 3 or the inner plate 14, etc. of the door and thus, will not become an impediment in taking food in and out of the fridge. In such case, an opening comparably sized with the camera case 1001 may be provided on the mounting surface 1060. Alternatively, a round openings corresponding to the lens unit 1013 and the LED light 1050 may be provided. The camera case 1001 may be arranged to project from the mounting surface 1060 so that droplets of dew condensate streaming along the mounting surface 1060 will not flow to the lens surface.

Seventh Embodiment

A description is given hereinafter on a seventh embodiment with reference to FIGS. 56 to 64. In the seventh embodiment, the image capturing unit captures an image of the fridge interior in the freezing temperature zone. Elements that are identical to the first embodiment are identified with identical reference symbols and are not described in detail.

As illustrated in FIG. 56, the basic configuration of the refrigerator 1 of the present embodiment is substantially the same as the first embodiment. The refrigerator 1 is controlled by a main-control portion 30 provided on the rear surface side of the refrigerator 1. The main-control portion 30 is provided with a refrigeration chamber temperature sensor 1100, a freezer chamber temperature sensor 1101, a refrigeration chamber door switch 1102, a freezer chamber door switch 1103, a peripheral temperature sensor, and a communication portion 1105 configured for communication with exterior components as schematically indicated in FIG. 57. Though FIG. 57 only illustrates a single sensor and a single switch, a sensor and a switch is provided for each of the refrigeration chamber 3, the vegetable chamber 4, the ice maker chamber 5, the upper freezer chamber 6, and the lower freezer chamber 7. The main control portion 30 is connected to a camera unit 1110 serving as the image capturing unit by wire or wireless communication. The later described EXAMPLES, a wire communication is used in EXAMPLES 1 to 3, and a wireless communication is used in EXAMPLE 4.

The camera unit 1110 is provided with a camera control portion 1111, an image capturing portion 1112 connected to the camera unit 1110, a camera temperature sensor 1113, and an LED light 1114. The image capturing portion 1112 is provided with an image capturing element such as a CCD sensor and CMOS sensor and lens, etc. and is configured to capture an image of the fridge interior based on instructions given by the camera control portion 1111. The camera unit 1110 secures light intensity for image capturing by illuminating the LED light 1114. The camera unit 1110 is also water proofed or drip proofed and is capable of capturing images at wide angles as was the case in the camera unit 1000 of the first embodiment. The camera unit 1000 disclosed in EXAMPLE 6 of the sixth embodiment may be used.

In the refrigerator 1 configured in the above described manner, the images captured by the camera unit 1110 are transmitted to the server 104, etc. disposed outside the refrigerator through the communication portion 1105. It is possible to access the server 104 from external components such as the communication terminal 103 to allow status inside the refrigerator 1 to be checked from remote locations such as outdoors. A system configuration may be employed in which a display is provided on the body of the refrigerator 1 to allow the interior of the storage chamber belonging to the freezing temperature zone to be checked.

In the present embodiment, the camera unit 1110 is mounted at a location capable of capturing an image of the interior of a chamber belonging to the freezing temperature zone as described in each of the EXAMPLES described below.

Example 1

In EXAMPLE 1, the camera unit 1110 is mounted at location A indicated in FIG. 56. More specifically, the camera unit 1110 is mounted so as to project from the front surface of a partition plate 1120 partitioning the chamber belonging to the freezing temperature zone as illustrated in FIG. 58. Doors are not illustrated in FIG. 58 for simplicity. The camera unit 1110 is mounted on the partition plate 1120 so that its view is oriented slightly downward. The camera unit 1110 is mounted below a vertical partition plate 1121 that partitions the ice maker chamber 5 and the upper freezer chamber 6 so as to be located between a door 6a of the upper freezer chamber 6 and a door 7a of the lower freezer chamber 7a. As a result, the camera unit 1110 will not interfere with gaskets (not shown) provided at the doors 5a, 6a, and 7a even if the camera unit 110 is provided in a projecting manner.

The partition plate 1120 has a radiator pipe 1122 embedded therein as illustrated in FIG. 59. The radiator pipe 122 is provided for preventing development of dew condensate on the partition plate 1120 and dissipates heat when energized. The camera unit 1110 is mounted on the front surface of the partition plate 1120 so as to be surrounded by the radiator pipe 1122. It is thus, possible to elevate the temperature near the camera unit 1110, more specifically, near the lens surface by the heat dissipated by the radiator pipe 1122. The heat dissipating pipe 1122 serves as a heater unit for heating the image capturing unit. The camera unit 1110, being disposed in an environment near the freezing temperature zone, may develop frost or dew condensate. It is possible to prevent development of frost and dew condensate and remove frost and dew condensate by elevating the temperature near the lens.

A heater configured to dissipate heat when energized may be provided instead of the radiator pipe 1122. In such case, a camera temperature sensor 1113 may be disposed near the lens to monitor the temperature and the heater can be energized when required so that image capturing may be carried out after defrosting. It goes without saying that defrosting may be carried out by changing the operational status of the radiator pipe 1122 based on the temperature detected by the camera temperature sensor 1113. It is thus, possible to capture clear images.

The camera unit 1110 configured in the above described manner is configured to capture the image of the chamber interior when opening of the door 7a of the lower freezer chamber 7 has been detected by the freezer chamber door sensor and instructions have been received from the main-control portion 30. That is, the camera unit 1110 is configured to perform image capturing when there is a possibility of food, etc. being taken in and out of the fridge as the result of opening/closing of the door. It is possible to capture an image inside a storage case 7b when the door 7a of the lower freezer chamber 7 has been opened as illustrated in FIG. 60 since the camera unit 1110 is oriented slightly downward. It is further possible to perform image capturing multiple times for example so that an image inside a slide case 7c, being drawn out with the storage case 7b can be captured.

Because the camera unit 1110 projects from the front surface of the partition plate 1120, it is possible to prevent droplets of dew condensate developed on the vertical partition plate 1121 from attaching to the lens surface of the camera unit 1110.

It is possible to capture an image inside the storage chamber belonging to the freezing temperature zone by using the camera unit 1110 configured in the above described manner.

Example 2

In EXAMPLE 2, the camera unit 1110 is mounted in recess 1130 provided in the front surface side of the partition plate 1120 so as not to project from the front surface of the partition plate 1120a as illustrated in FIGS. 61A and 61B. As a result, the radiator pipe 1122 is disposed in close proximity of the lens surface to facilitate heating of the lens surface. It thus, possible to prevent development of frost and dew condensate more effectively and rapidly remove them if any.

The camera unit 1110 is disposed in a different location from the vertical partition plate 1121 and thus, droplets of dew condensate streaming down along the vertical partition will not attach to the lens surface.

Example 3

In EXAMPLE 3, the camera unit 1110 is mounted at location B illustrated in FIG. 56. More specifically, camera unit 1110 is mounted on the lower surface side of partition plate 1120 as illustrated in FIG. 62A. That is, the camera unit 1110 is installed inside the storage chamber. The camera unit 1110 is disposed inside the partition plate 1120 as illustrated in FIG. 62B.

Thus, the camera unit 1110 will not become an impediment when drawing the door 7a or when taking food, etc. in and out of the chamber. Instead of providing the camera unit 1110 inside the partition plate 1120, a recess 1130 may be provided on the partition plate 1120 and the camera unit 1110 may be provided inside the recess 1130. A heater 1115 is disposed in the periphery of the camera unit 1110. Thus, it is possible to elevate the temperature near the lens surface and perform image capturing after defrosting.

It is possible to capture images in wide angles in the camera unit 1110 of EXAMPLE 3. Thus, it is possible to capture an image of the slide case 7c when the door is closed and capture images of both the interior of the storage case 7b and the slide case 7c when the door is closed. By installing the camera unit 1110 in the location discussed in EXAMPLE 3, it is possible to capture an image of the chamber interior even when the door 7a is not opened, while further being capable of capable of capturing an image of the chamber interior in response to instructions given by the communication terminal 103 side as discussed in the first embodiment, etc. described above. The provision of the LED light 1114 allows an image of the chamber interior to be captured even when the door is closed.

Further, because images of both the storage case 7b and the slide case 7c can be captured when the door is opened and closed, it is possible to detect a change in the status of food storage, etc. and thus, extend the use of the system to food management application, etc. instead of limiting the use of the system for checking the interior of the chamber interior alone.

Because a wide-angle lens system is being used, it is possible to capture an image of the entirety of the storage case 7b and the slide case 7c from a relatively close distance.

Example 4

In EXAMPLE 4, the camera unit 1110 is mounted at location C illustrated in FIG. 56. More specifically, the camera unit 1110 is provided on an undersurface side of heat insulative partition plate 1140 dividing the storage chamber belonging to the refrigerating temperature zone and the storage chamber belonging to the freezing temperature zone, that is, the refrigeration chamber 3 and the upper freezer chamber 6 as illustrated in FIG. 63. Stated differently, the camera unit 1110 is provided on the ceiling of the storage chamber belonging to the freezing temperature zone so as to be oriented downward, that is, so as to be capable of capturing an image of the chamber interior. The camera unit 1110 is capable of capturing images in wide angles and thus, is capable of capturing an image of substantially the central portion of the chamber interior.

The camera unit 1110 is provided with LED 1114 and thus, is capable of image capturing when the door is closed. It is also possible to capture the image of the chamber interior when opening of the door 6a of the upper freezer chamber 6 has been detected by the freezer chamber switch 1103 as was the case in EXAMPLE 3. Further, by providing the camera temperature sensor 1113 and a heater near the lens, it is possible to elevate the temperature of the periphery of the lens and perform image capturing after defrosting.

Example 5

The camera unit 1200 of EXAMPLE 5 is provided with a communication portion 1201 and a battery 1202 therein as illustrated in FIG. 64. The communication portion 1201 is configured to transmit captured images to exterior components through wireless communication with the refrigerator 1, router 101 (see FIG. 1), or the like. The camera unit 1200 is further provided with an LED light 1203, a power supply button 1204, and a set button 1205 and thus, capable of capturing an image of the chamber interior by itself. The above described configuration allows the camera unit 1200 to be installed wherever the user desires without being constrained by wiring cables, etc.

Though not illustrated, camera unit 1200 is provided with a temperature sensor and a heater near the lens. It is thus, possible to elevate the temperature in the periphery of the lens and perform image capturing after defrosting.

The timing for capturing an image of the chamber interior by the camera unit 1200 may be instructed by the refrigerator 1 side through communication with the refrigerator 1. Alternatively, an illuminance sensor may be provided inside the camera unit 1200 as was the case in the first embodiment and image capturing may be performed when detecting that the in-fridge lighting has been illuminated or when detecting the incoming external light when the door has been opened, etc.

Other Embodiments

The present invention is not limited to the embodiments exemplified above but may be modified or expanded as follows. Some or all of the modified and expanded examples given below may be combined as required.

In the example discussed in the first embodiment, the image capturing camera is provided on the right-side door 3b. Alternatively, the image capturing camera 18 may be provided on the vertical partition 17 provided on the left-side door 3a as illustrated in FIGS. 26A and 26B. The vertical partition 17 rotates depending upon the opened/closed status of the left-side door 3a. When the left-side door 3a is closed as illustrated in FIG. 26A, the image capturing camera 18 faces the fridge interior and thus, is capable of capturing an image of the fridge interior. When the left-side door 3a is opened as illustrated in FIG. 26B, the image capturing camera 18 faces the inner plate side and thus, the lens surface will not be contaminated since the user will not come in contact with the image capturing camera 18.

A single image capturing camera 18 and a single image capturing light 19 was provided in the example given in the first embodiment. Alternatively, multiple image capturing units (an upper image capturing camera 60, a lower image capturing camera 62, a door image capturing camera 64) and multiple lighting units (an upper image capturing light 61, a lower image capturing light 63) may be provided as illustrated as illustrated in FIG. 27. In such case, an image of the upper side of the fridge interior may be captured by the upper image capturing camera 60 and an image of the lower side of the fridge interior may be captured by the lower image capturing camera 62. That is, multiple image capturing units may be provided for capturing images of a specific location in the fridge interior. In such case, a single image of the fridge interior such as the image illustrated in FIG. 7 for example may be obtained by combining each of the images.

It is possible to capture an image of the entire range of the fridge interior without using a wide-angle lens since only images of specific locations in the upper side or the lower side of the fridge interior, etc. need to be captured. It is possible to reduce the size of the views of the upper image capturing camera 60 and the lower image capturing camera 62 compared to the view required for wide-angle image capturing using a single image capturing camera 18. Stated differently, the possibility of the view being blocked will be smaller compared to the first embodiment even if the notch 9b1 is not provided in the door pocket 9b. It is thus, possible to capture an image of the fridge interior while maintaining the original storage capacity of the door pocket.

Further, the image capturing environment may be controlled by illuminating the appropriate lighting unit depending upon the targeted location of image capturing. For example, upper image capturing light 61 may be illuminated when images are captured using the upper image capturing camera 60 and lower image capturing light 63 may be illuminated when images are captured using the lower image capturing camera 62. An image capturing unit may be provided for each shelf 11 for example in addition to the upper side portion and lower side portion.

Further, a single image of the fridge interior may be produced by combining multiple images by, for example, reducing the illuminance of the ceiling light 13 when capturing an image of the upper side of the fridge interior and controlling the illuminance of the ceiling light 13 to a normal level when capturing an image of the lower side of the fridge interior. That is, it is not necessarily required to provide lighting dedicated for image capturing such as the image capturing light 19.

In the first embodiment, the image capturing environment is controlled by illuminating the image capturing light 19. Alternatively, the image capturing environment may be controlled for example to weaken the back light against the image capturing camera 18 by reducing the illuminance of the ceiling light 13, the side light 36, etc.

An image of the door pocket side may be captured using the door image capturing camera 64 which may be combined with and image of the fridge interior as illustrated in FIG. 28 to produce a synthetic image depicting the door of the refrigerator 1 being opened. The synthetic image may be displayed on the communication terminal 103. In such case, an image of the door pocket side may be captured by providing the door image capturing camera 64 in the fridge interior. Alternatively, the door image capturing camera 64 may be provided on each of the inner plates 14 of the doors. The door image capturing camera 64 may capture an image of the door pocket of the other door after the doors have been opened and an image may be captured after the doors have been closed. The images may be combined to obtain a single image of the fridge interior.

In the examples given in each of the embodiments, the captured images are stored in the server 104. However, the captured images may be transmitted directly to the communication terminal 103.

In each of the embodiments, the captured images are transmitted as they are. Alternatively, the images may be transmitted to the server 104 after correcting the image distortions caused by the use of the wide-angle lens. The image distortions may be corrected at the server 104.

In the examples given in each of the embodiments, an image of the fridge interior is captured at the timing when instructions to capture an image of the fridge interior from the communication terminal 103 has been received. However, an image of the fridge interior need not be captured upon receiving the instructions if an image has been captured after the elapse of the delayed image capturing time to serve as the latest image. That is, the image captured after the elapse of the delayed image capturing time is the latest image after the door of the refrigerator 1 has been closed. Thus, the state in which the image has been captured after the lapse of the delayed image capturing time may be deemed as the state in which the door has not been opened (the state in which the storage status has not changed) after the image has been captured. Hence, if the image captured after the elapse of the delayed image capturing time is the latest image, unnecessary power consumption can be prevented by refraining from further image capturing. When the communication terminal 103 acquires an image from the server 104, a notice may be issued indicating that the acquired image is the latest image.

In the first embodiment, the control portion 50 is provided independent of the main control portion 30. However, the main control portion 30 may be configured to control the image capturing camera 18, etc. It is thus, possible to reduce the number of components and cost. In such case, the captured images can be transmitted as they are to the server 104 as exemplified in the embodiment. This will eliminate the burdensome image processing and allow the control to be undertaken by the main control portion 30 alone.

In the first embodiment, a communication unit is provided in the image capturing camera 18 side. However, a communication unit may be provided in the refrigerator 1 side as was the case in the second embodiment so that the image capturing camera 18 side may communicate with the communication unit of the refrigerator 1 side. In such case, the communication unit provided in the refrigerator 1 side may be provided in the main control portion 30 of the refrigerator 1 or may be configured as a detachably attached component (an optional component) like the communication device 501 of the second embodiment illustrated in FIG. 25.

In the first embodiment, the refrigeration chamber 3 was given as an example of a storage chamber. Alternatively, images of other storage chambers such as the vegetable chamber 4 may be captured instead as was the case in the second embodiment.

In the first embodiment, the image capturing camera 18 is preinstalled in the refrigerator 1. Alternatively, the image capturing camera 18 may be configured to be detachably attached to the refrigerator 1. More specifically, the user may be allowed to attach the image capturing camera 18 after purchasing the refrigerator 1. That is, the image capturing camera 18 may be configured as detachably attached camera unit like the camera device 300 of the second embodiment.

The image capturing camera 18 and image capturing light 19 may be stored in one inside a unit case configured to be detachably attached to the refrigerator 1. The control portion 50 and the communication portion 52 may be provided integrally with the camera device. The lens heater 51 may also be provided integrally with the camera device along with the foregoing components. The control portion 50 and the communication portion 52 may be preinstalled to the refrigerator 1 and a separate communication unit for communicating with the control portion 50 and the communication portion 52, etc. may be provided in the camera device side. That is, any configuration may be employed to the camera device as long as it is at least provided with the image capturing camera 18.

The camera device and the refrigerator 1 may establish a wire communication or a wireless communication. Power may be supplied wirelessly to the camera device.

When the camera device is configured as detachably attachable device, a receiving portion may be provided on door pockets 8 to 10, the inner plate 14, the vertical partition 17, or the shelves, etc. of the refrigerator 1. A mounting portion to be mounted on the receiving portion may be provided on the camera device to allow the detachable attachment. More specifically, the mounting portion and the receiving portion may be engaged with one another. Alternatively, a clip may be provided on the camera device configured to clamp the door pockets which may come in different thicknesses (that is, a configuration in which the image capturing unit can be mounted on any location).

When employing a wireless method, a recess 600 may be provided on the inner plate 14 of the door of the refrigerator 1 for example as illustrated in FIGS. 29A and 29B. The recess 600 serves as a marking indicating the location where the camera device 300 is to be mounted. A magnet 601 may be provided on the camera device 300 side for mounting purposes. This is because the doors such as the right-side door 3b contains an iron plate 602 made of metal and the camera device 300 may be attached to the doors by magnetic force. The recess 600 may be provided with a mounting structure other than the magnet (a holding structure or an engagement structure for example). Further, a detection magnet 603 like the magnet 206 of the second embodiment may be provided alternatively. A magnet may be provided on the door side and a metal portion may be provided on the camera device 300 side.

If it is possible to attach the camera device to any given location, markings may be provided to indicate locations where appropriate images of the fridge interior may be captured such as locations where the camera view is less likely to be blocked by shelves, door pockets, or the like. Markings may be provided even if the location where the camera device is to be mounted is predetermined to provide guidance to the user.

A dedicated spot for storing the camera device may be formed in the door pocket and the camera device may be stored in such spot.

A detection unit such as an IC chip, etc. configured to detect the presence and absence of the camera device maybe provided in specific locations inside the refrigerator 1. The operation of the communication portion 52 for example may be permitted depending upon the presence/absence of the camera device. The specific locations include at least the interior of the refrigerator 1. An input may be made from the control panel 33 indicating that the camera device has been mounted.

An identifying unit may be provided in the refrigerator 1 for identifying the camera device. The operation of the camera device (including the operation of the communication device 52, etc.) may be permitted only when a specific camera device has been identified. As a result, it is possible to permit operation of only a reliable camera device (a camera device made by the manufacturer of the refrigerator or a compatible camera device). The preexisting in-fridge lighting may be used as a notifying unit for notifying the timing of image capturing to eliminate the need for additional components and thereby achieve cost reduction.

A detection unit may be provided in the camera device side for detecting whether or not the refrigerator 1 is eligible for operation of the camera device. A detection subject unit may be provided in the refrigerator 1 side which is configured to be detected by the detection unit. The detection unit and the detection subject unit may be implemented physically for example as connectors having mating shapes or for example by exchanging identification information.

Alternatively, the refrigerator 1 may communicate with the camera device 300 for example to identify whether or not the camera device 300 is eligible for operation with the refrigerator 1. In such case, the communication device 501 of the refrigerator 1 serves as an identification unit and the communication module 306 serves as an identification subject unit which is identified by the refrigerator 1 for judging that the camera device 300 is eligible for operation with the refrigerator 1.

Further, the identification unit and the identification subject unit may also serve as the detection unit and the detection subject unit. That is, if the camera device 300 can be stored in the holding portion 202, the camera device 300 can be identified as to be eligible for use with the refrigerator 1. The polarity of the magnet 206 provided at the holding portion 202 may be detected by the camera device 300 and the result of detection may be notified to the refrigerator side 1 to judge whether the camera device 300 has been stored in the holding portion 202. Alternatively, the in-fridge lighting may be flickered by the refrigerator 1 side and the camera device 300 side may be configured to issue some kind of response, etc. to enable identification.

A pocket mounting portion for mounting a door pocket may be provided on the inner plate 14 of the refrigerator 1 so that door pocket 9b (the same is applicable to the door pocket 200 of the second embodiment) itself is detachably attached. That is, when the camera device is detachably attached, users who do not wish to use the camera device may increase storage capacity by attaching wide door pockets such as the door pocket 8, whereas users who wish to use the camera device may capture images of the fridge interior without the view of the camera device being blocked by attaching the door pocket 9b (or the door pocket 200) which is relatively narrower.

As illustrated in FIG. 3, a wide (i.e. substantially as wide as the width of the right-side door 3b) door pocket covering the spot where the image capturing camera 18 is mounted (or a door pocket shaped so as to make up for the notch 9b1 of the door pocket 9b) may be mounted on the pocket mounting portion. When the camera device is not in use, the mounting portion of the camera device may be covered by the door pocket so that the user is inhibited from inadvertently touching the mounting portion, etc.

The control of the timing of image capturing by the control portion 309 in the second embodiment may be carried out by judging image capturing conditions 1 to 4, etc. as was the case in the first embodiment by acquiring the opened/closed status of the door through communication with the refrigerator 1. In such case, both or either of the timing detection by the illuminance sensor 313 and image capturing conditions 1 to 4 may be employed. More specifically, image was not captured when the user has opened the door in the second embodiment. The moment when the in-fridge lighting has been continuously illuminated may be judged as the moment when the door has been opened and the moment when the in-fridge lighting has been thereafter turned off may be judged as the moment when the door has been closed. Image capturing condition 1 will be met by capturing the image of at the moment when the in-fridge lighting has been turned off. By using the communication module 306 to acquire the opened/closed status of the door through communication with the main-control portion 30 of the refrigerator 1, it is possible to employ image capturing conditions 1 to 4.

The removing unit for removing dew condensate may be provided to the camera device 300 of the second embodiment.

The predetermined time period mentioned in the second embodiment may be specified to a time period in which the dew condensate is removed based on temperature and humidity (or at least a time period equal to or greater than such time period). It goes without saying that a fixed time period such as 2 hours may be specified.

The camera device 300 of the second embodiment may be configured so as not to be provided with the image capturing lamp 302. For example, the refrigeration chamber 3 is provided with a ceiling light 13, etc. and thus, image capturing may be carried out using such in-fridge lighting. In such case, instructions to illuminate the in-fridge lighting may be transmitted to the refrigerator 1 side through the communication module, etc. Both the image capturing lamp 302 and the in-fridge lighting may be used during image capturing.

In the examples given in the above described embodiments, images of the fridge interior are captured. Images of closed spaces provided in the fridge interior (such as an egg container room which is closed or encapsulated by a cover or drawer configuration, a special purpose room 12 of the chiller chamber, and a low pressure preservation chamber placed in a sealed state) for example may be captured by forming a window in a portion of such closed space structure using a transparent material and capturing images of the interior of the closed space through the window.

Power may be supplied to the camera device 300 from the refrigerator 1 side by wired or wireless feed. As a result, it is possible to eliminate battery shortages and thereby improve usability. Because a continuous supply of power is given to the refrigerator 1, it will not affect the operation of the refrigerator 1 even if a power supplying circuit, etc. for supplying power to the camera device 300 is provided. By configuring the power supplying circuit to be detachably attached to the refrigerator 1 like the camera device 300, it is possible to inhibit unnecessary supply of power.

In the second embodiment, the magnets are disposed at holding portions provided in two different locations so that polarity of one side of the magnet facing the camera device 300 differs between the two magnets. However, the magnets may be disposed so that relative positioning with respect to the detecting portion 307 differ. In such case, the output of the detection sensor will increase if disposed closer to the magnet, whereas the output will decrease if disposed farther from the magnet (however, the positive and negative nature of the magnetic field will not change). It is thus, possible to provide three or more holding portions.

The temperature sensor 310, the magnetic sensor 311, the acceleration sensor 312, and the illuminance sensor 313 may be provided as required and thus, some may be absent. For example, if the orientation of the camera is detected by the magnetic sensor 311, the acceleration sensor 312 is not necessarily required.

In the example of the third embodiment, image capturing is performed when the door is opened. This may be combined with the first and the second embodiments in which image capturing is performed when the door is closed.

Apart from the example given in the third embodiment, the opening-degree detection block may be configured to estimate the degree of opening of the door based on the illuminance of the fridge interior detected by the illuminance detection block. The degree of opening of the door may be estimated based on, for example, where stationary elements such as the in-fridge lighting are located within the image captured by the image capturing block. Alternatively, an oscillation sensor configured to detect the oscillation of the door may be provided to make a judgment that the door has been opened when oscillation of the door has been detected. Still alternatively, a judgement that a door has been opened may be made when, rotary motion, linear movement, etc. have been detected by the acceleration sensor 312 such as was the case in the camera device 300 of the second embodiment.

The illuminance detection block may be configured to estimate the illuminance based on the degree of opening detected by the opening-degree detection block.

In the third embodiment, the in-fridge lighting is given as an example of a lighting unit. However, a dedicated image capturing light 19 may be provided instead. The external light (such as the lighting of the room in which the refrigerator is provided and sun light) introduced when the door is opened also serves as the lighting. Further, the image capturing block may be installed in the fridge interior and not on the door and may be configured to capture images when the door is opened.

When the door is opened and the cooled lens is exposed to the warm outside air, the lens may fog or develop dew condensate. Thus, the condition for allowing image capturing may be specified by time instead of the rotational angle of the door. The time may be specified to a duration in which dew condensate does not develop on the lens. Such time may be estimated by taking the in-fridge temperature and outside temperature into consideration.

It is further possible to provide a removing unit for removing dew condensate. For example, when the storage amount of a storage item estimated by the storage amount estimation unit has exceeded a predetermined reference storage amount, the moisture inside the storage chamber is expected to have increased. In such case, a circulation fan provided for facilitating air circulation may be driven in a manner that achieves increased amount of air circulation as compared to normal operation.

A heat generating unit configured to generate heat may be provided near the image capturing unit. The heating unit may be a heater, etc. or a component that produces heat such as a microcomputer.

In the third embodiment, the in-fridge lighting is employed as the lighting block. However, a dedicated image capturing light may be provided and illuminated to increase the light intensity when the light intensity is deemed to be insufficient as indicated in FIG. 31B, when operating in the power save mode, etc.

In the third embodiment, the in-fridge lighting was configured to be illuminated when the degree of opening is less than the predetermined amount. However, in-fridge lighting need not be illuminated. In such case, it is possible to refrain from image capturing when the degree of opening of the door is less than the predetermined amount.

The recess given as an example in the fourth embodiment may be applied to the third embodiment.

The "door in the opened state" includes the timing when the door is being closed.

In some of the embodiments of the present invention a marking indicating a location for installing the image capturing unit is provided.

In some of the embodiments of the present invention a detection subject unit is configured to allow the image capturing unit to detect that the refrigerator, being provided with a communication unit capable of transmitting an image captured by the image capturing unit to an external device, is eligible for operation with the image capturing unit.

In some of the embodiments of the present invention an identifying unit is configured to identify whether image capturing unit is eligible for use with the refrigerator.

In some of the embodiments of the present invention an exterior environment acquiring unit is configured to acquire information pertaining an environment outside the refrigerator, wherein the control unit is configured to specify the predetermined time period based on the information pertaining to the environment outside the refrigerator acquired by the exterior environment acquiring unit.

In some of the embodiments of the present invention the control unit is configured to capture an image of the interior of the refrigerator by the image capturing unit at a timing after a door has been closed and at a timing after a door has been opened and combining plural images having been captured to generate an image of the interior of the refrigerator.

In some of the embodiments of the present invention the image capturing unit is a camera device detachably attachable to the refrigerator, wherein the communication unit is provided at the refrigerator and is configured by a refrigerator-side communication unit configured to receive instructions for capturing an image of the interior of the refrigerator from an external device, and a camera-side communication unit configured to transmit image information to an external device, and wherein the camera device is configured to capture an image of the interior of the refrigerator when image capturing instructions have been notified from the refrigerator having received instructions for capturing an image of the interior of the refrigerator and transmits the captured image information to an external device from the camera-side communication unit.

In some of the embodiments of the present invention the control unit is configured to capture an image of the interior of the refrigerator when a go-out switch for changing an operational status of the refrigerator to a power save mode is operated at a remote location.

In some of the embodiments of the present invention the control unit is configured to prepare the image capturing environment by illuminating, among the plural lighting units, the lighting unit being disposed in a location not confronting the image capturing unit and being configured to illuminate a direction in which a view of the image capturing unit is oriented when capturing an image of the interior of the refrigerator by the image capturing unit.

In some of the embodiments of the present invention the control unit is configured to capture an image of the interior of the refrigerator by the image capturing unit whenever the lighting unit for illuminating a specific location of the interior of the refrigerator is illuminated, and generate an image of the interior of the refrigerator by combining multiple captured images.

In some of the embodiments of the present invention the image capturing unit is provided in plural, the image capturing unit being configured to generate an image of the interior of the refrigerator by combining multiple images capturing by the image capturing unit.

In some of the embodiments of the present invention the receiving portion is provided on a door and the image capturing unit is mounted on the door.

In some of the embodiments of the present invention the image capturing unit is provided at a vertical partition provided on a door.

In some of the embodiments of the present invention the image capturing unit is provided at an inner plate of a door.

In some of the embodiments of the present invention the image capturing unit is provided adjacent to a door pocket provided at a door, the door pocket located adjacent to the image capturing unit being shaped so as to extend along an outer edge of a view of the image capturing unit configured to capture an image of the interior of the refrigerator or disposed outside the view of the image capturing unit.

In some of the embodiments of the present invention the image capturing unit is provided in a location capable of capturing an image of at least a portion of a door pocket provided on a door.

In some of the embodiments of the present invention the communication unit is configured to transmit image information to an external device, the image information being transmitted after image distortions originating from use of the wide-angle lens has been corrected.

In some of the embodiments of the present invention the image distortions are corrected by the control unit and the communication unit is configured to transmit the image information to an external device after the image information is corrected by the control unit.

In some of the embodiments of the present invention a front surface of a door is made of nonmetallic material.

In some of the embodiments of the present invention a camera-side lighting unit is configured to illuminate the interior of the refrigerator, the camera-side lighting unit being illuminated when capturing an image of the interior of the refrigerator by the image capturing unit.

In some of the embodiments of the present invention a mounting portion is configured for attachment to a receiving portion provided at the refrigerator to mount the image capturing unit to the refrigerator.

In some of the embodiments of the present invention a detection unit is configured to detect whether or not the refrigerator being provided with the image capturing unit is eligible for image capturing using the image capturing unit.

In some of the embodiments of the present invention the refrigerator is provided with a communication unit configured to communicate with an external device, the camera-side communication unit being configured to transmit image information of the interior of the refrigerator to an external device through the communication unit, and wherein the detection unit judges whether or not the refrigerator is eligible for operation of the image capturing unit by communicating with the communication unit.

In some of the embodiments of the present invention the communication unit is configured to communicate with the communication unit provided at the refrigerator by wireless communication.

In some of the embodiments of the present invention the refrigerator is provided with a magnet at a location corresponding to where the image capturing unit is installed, the camera device further comprising a magnetic sensor configured to detect magnetism of the magnet, and wherein the detection unit is configured to detect whether the refrigerator is eligible for operation with the camera device by detecting the magnetism exerted from the magnet.

In some of the embodiments of the present invention the receiving portion is provided in plural at the refrigerator, the plural receiving portions have magnets disposed thereto, the magnets being disposed so that one side of each of the magnets facing the image capturing unit has a different polarity from the other magnet or a relative positioning of the image capturing unit and the magnets are rendered different depending upon the mounting portion, and wherein the detection unit is further configured to detect a location and/or a direction in which the image capturing unit is installed based on a polarity of the magnets or the relative positioning of the image capturing unit and the magnets.

In some of the embodiments of the present invention an acceleration sensor is configured to detect acceleration imparted on the image capturing unit, wherein the detection unit is configured to detect an orientation in which the image capturing unit is installed based on an acceleration detected by the acceleration sensor.

In some of the embodiments of the present invention a temperature sensor is configured to detect temperature of an environment in which the image capturing unit is installed, the detection unit being configured to detect presence of the image capturing unit inside the refrigerator and/or a storage chamber in which the image capturing unit is installed based on temperature detected by the temperature sensor.

In some of the embodiments of the present invention an illuminance sensor is configured to detect an illuminance of an environment in which the image capturing unit is installed, wherein a timing for image capturing by the image capturing unit is controlled based on an illuminance detected by the illuminance sensor.

In some of the embodiments of the present invention an identification subject unit is configured to cause the refrigerator to identify that the camera device is eligible for use with the refrigerator.

In some of the embodiments of the present invention a refrigerator door pocket is provided at a door of a refrigerator shaped so as to avoid a receiving portion configured for mounting an image capturing unit configured to capture an image of an interior of the refrigerator.

In some of the embodiments of the present invention a refrigerator door pocket is provided at a door of a refrigerator comprising a notch formed at a portion blocking a view of an image capturing unit configured for capturing an image of an interior of the refrigerator.

In some of the embodiments of the present invention the image capturing unit is provided with a magnetic sensor configured to detect magnetism and a detection unit configured to detect where the image capturing unit itself is installed based on magnetism detected by the magnetic sensor, wherein the receiving portion is provided with a magnet serving as a detection subject configured to exert magnetism being detected by the magnetic sensor.

In some of the embodiments of the present invention the image capturing unit is provided with a magnetic sensor configured to detect magnetism and a detection unit configured to detect where the image capturing unit itself is installed based on magnetism detected by the magnetic sensor, wherein the holding portion is provided with a magnet serving as a detection subject configured to exert magnetism being detected by the magnetic sensor.

In some of the embodiments of the present invention the holding portion is formed integrally with a refrigerator door pocket provided at a door of a refrigerator.

In some of the embodiments of the present invention the storage chamber is a refrigerator.

In some of the embodiments of the present invention the image capturing unit is configured to capture an image with a door opened.

In some of the embodiments of the present invention a door opening detection unit is configured to detect opening of a door, wherein an image is captured when opening of the door is detected by the door opening detection unit.

In some of the embodiments of the present invention a lighting unit is illuminated for lighting the interior of the refrigerator when capturing an image while a door is opened.

In some of the embodiments of the present invention the door opening detection unit is provided with a switch configured to be turned on when the door is opened by a predetermined amount or more, an image being captured when the switch is turned on.

In some of the embodiments of the present invention the door opening detection unit is provided with a switch configured to be turned on when the door is opened by a predetermined amount or more, an image being captured by illuminating a lighting unit configured for lighting the interior of the refrigerator before the switch is turned on.

In some of the embodiments of the present invention an illuminance detection unit is configured to detect an illuminance of the interior of the refrigerator, wherein an image is captured when an illuminance detected by the illuminance detection unit exceeds a predetermined reference value.

In some of the embodiments of the present invention the image capturing unit is provided at least at an end portion located in an opening side of a door.

In some of the embodiments of the present invention an image is further captured when a door is closed.

In some of the embodiments of the present invention the image capturing unit is provided at least at an end portion located in a hinge side of a door.

In some of the embodiments of the present invention an image is captured multiple times while the door is opened.

In some of the embodiments of the present invention comprising a storage amount estimation unit is configured to estimate an amount of storage items stored in the interior of the refrigerator based on an image captured by the image capturing unit.

In some of the embodiments of the present invention a notification unit is configured to notify at least either of a storage amount of a storage item estimated by the storage amount estimation unit or a change in a storage amount.

In some of the embodiments of the present invention a circulation fan configured to circulate air of the storage chamber is driven in a manner to provide increased amount of air circulation compared to normal operation when a storage amount estimated by the storage amount estimation unit has exceed a predetermined reference storage amount.

In some of the embodiments of the present invention a heat generating unit configured to generate heat is provided near the image capturing unit.

In some of the embodiments of the present invention an opening-degree detection unit is configured to detect a degree of opening of a door, the opening-degree detection unit being configured to detect an angle in which a revolving door is opened, wherein an image is captured when an angle in which the door is opened detected by the opening-degree detection unit is less than 90 degrees.

In some of the embodiments of the present invention an opening-degree detection unit is configured to detect a degree of opening of a door, wherein an image is captured when an angle in which the door is opened detected by the opening-degree detection unit is within a range capable of image capturing.

In some of the embodiments of the present invention the refrigerator is configured to open/close a single storage chamber by plural doors disposed adjacent to one another.

In some of the embodiments of the present invention the image capturing unit is disposed at least one of multiple doors, wherein when a door provided with the image capturing unit is opened, an image is captured when a door pocket provided at the other of the multiple doors is located within an image capturing view.

In some of the embodiments of the present invention the refrigerator is configured to open/close each of independent storage chambers by multiple doors disposed adjacent to one another.

In some of the embodiments of the present invention at least one of the doors is configured to open/close multiple independent storage chambers.

In some of the embodiments of the present invention the independent storage chambers are provided with a shelf and/or a storage container and the image capturing unit configured to capture an image of the shelf and/or interior of the storage container.

In some of the embodiments of the present invention the refrigerator is provided with a drawer-type storage chamber, an image being captured when the drawer-type storage chamber is opened.

In some of the embodiments of the present invention an opening-degree detection unit is configured to detect an amount of opening of the drawer-type door, wherein an image is captured when an amount in which the door is opened exceeds a predetermined reference value.

In some of the embodiments of the present invention the image capturing unit is provided so as to be slanted with respect to a direction in which the drawer-type storage chamber is drawn.

In some of the embodiments of the present invention another storage chamber is disposed above the drawer-type storage chamber, the image capturing unit configured to capture an image of the drawer-type storage chamber being provided at a door of the storage chamber being disposed above the drawer-type storage chamber.

In some of the embodiments of the present invention another storage chamber is disposed above the drawer-type storage chamber, the image capturing unit configured to capture an image of the drawer-type storage chamber being provided at a partition plate provided between the drawer-type storage chamber and the storage chamber being disposed above the drawer-type storage chamber.

In some of the embodiments of the present invention the image capturing unit is provided in a location capable of capturing a center of the interior of the refrigerator.

In some of the embodiments of the present invention the image capturing unit is provided on a door configured to open/close a storage chamber being a target of image capturing, the image capturing unit being located substantially at a center of an up and down direction and a left and right direction of the storage chamber.

In some of the embodiments of the present invention the image capturing unit is provided inside a vertical partition provided on a door for opening and closing a storage chamber being a target of image capturing, the image capturing unit being located substantially at a central portion in an up and down direction inside the vertical partition.

In some of the embodiments of the present invention the image capturing unit is provided in a storage chamber being a target of image capturing.

In some of the embodiments of the present invention the image capturing unit is provided at a sidewall of a storage chamber being a target of image capturing.

In some of the embodiments of the present invention the image capturing unit is provided at left and right sidewalls of the storage chamber being the target of image capturing.

In some of the embodiments of the present invention a storage chamber being a target of image capturing is formed substantially in a shape of a cuboid in which a vertical dimension and a lateral dimension differ, wherein the image capturing unit is provided with a rectangular image capturing element and is disposed so that a lengthwise direction of the image capturing element and a lengthwise direction of a storage chamber are oriented in the same direction.

In some of the embodiments of the present invention the image capturing unit is drip proofed or water proofed.

In some of the embodiments of the present invention the image capturing unit comprises a protection case and an image capturing module stored in the protection case, the image capturing module configured by a substrate provided with circuit components and a lens unit provided thereon, and wherein an O ring is provided to seal a space between the lens unit and the protection case.

In some of the embodiments of the present invention the image capturing unit comprises a protection case and an image capturing module stored in the protection case, the image capturing module configured by a substrate provided with circuit components and a lens unit provided thereon, and wherein an interior of the protection case is potted by a potting material.

In some of the embodiments of the present invention the image capturing unit is configured to capture an image of an interior of a chamber belonging to a freezer temperature zone.

In some of the embodiments of the present invention a heating unit is provided near the image capturing unit.

In some of the embodiments of the present invention the image capturing unit is provided at a portion plate partitioning the storage chambers, wherein the heating unit is a radiation pipe provided at the partition plate.

In some of the embodiments of the present invention a temperature detection unit is configured to detect temperature of the image capturing unit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

EXPLANATION OF REFERENCE SYMBOLS

In the figures, reference symbol 1 represents a refrigerator; 3, a refrigerator (storage chamber); 3a, a left-side door (door); 3b, a right-side door (door); 4, a vegetable chamber (storage chamber); 4a to 7a, a door; 5, an ice maker chamber (storage chamber); 6, an upper freezer chamber (storage chamber); 7, a lower freezer chamber (storage chamber); 8 to 10, a door pocket; 9b1, a notch; 13, a ceiling light (lighting unit); 14, an inner plate (receiving portion); 17, a vertical partition; 18, an image capturing camera (image capturing unit); 19, an image capturing light (lighting unit); 30, a control portion (control unit); 33b, switches (go-out switch); 33c, an outside fridge sensor; 36, a side light (lighting unit); 50, a control portion (control unit); 51, a lens heater (removing unit); 52, a communication portion (communication unit); 60, an upper image capturing camera (image capturing unit); 61, an upper image capturing light (lighting unit); 62, a lower image capturing camera (image capturing unit); 63, a lower image capturing light (lighting unit); 64, a door image capturing camera (image capturing unit); 100, a home appliance network system; 102, a communication line; 103, a communication terminal (external device); 104, a server (external device); 200, a door pocket (refrigerator door pocket, refrigerator holder); 202, a holder (receiving portion); 206, a magnet (detection subject unit); 300, a camera device (image capturing unit); 302, an image capturing lamp (lighting unit, camera-side lighting unit); 306, a communication module (communication unit, camera-side communication unit, identification subject unit); 307, a detecting portion (detection unit); 308, an image capturing portion (image capturing unit); 310, a temperature sensor; 311, a magnetic sensor; 312, an acceleration sensor; 313, an illuminance sensor; 311, a magnetic sensor; 312, an acceleration sensor; 313, an illuminance sensor; 400, a refrigerator holder; 401, a holding portion; 405, a magnet (detection subject unit); 500, a home appliance network system; 501, a communication device (communication unit, fridge-side communication unit, identifying unit); 700, a refrigerator; 701, a control block (control unit); 702, an image capturing block (image capturing unit); 703, a lighting block (lighting unit); 704, an opening detection block (an opening detection unit); 705, an opening-degree detection block (opening-degree detection block); 706, an illuminance detection block (illuminance detection unit); 707, a communication block (communication unit); 708, a storage amount estimating portion (storage amount estimation unit); 710, a door (revolving door); 720, a PET bottle (storage item); 723, eggs (storage item); 800, a refrigerator; a left-side door (revolving door); 802, a right-side door (revolving door); 810, a refrigerator; 811, a left-side door (revolving door); 812, a right-side door (revolving door); 814A to 814E, storage chamber (independent storage chamber); 815, a shelf; 816, a storage container; 900, a refrigerator; 902, a door (drawer-type door); 904, a storage chamber (drawer-type door); 905, a partition plate; 906, a door (drawer-type door); 910, a door; 930, a storage chamber; 932, a door; 933, a partition plate; 1000, a camera unit (image capturing unit); 1001, a camera case (protection case); 1003, a camera module (image capturing module); 1010, an image capturing element; 1011, a circuit component; 1012, a substrate; 1013, a lens unit; 1017, a potting material; 1018, an O ring; and 1050, an LED light (lighting unit); 1105, a communication portion (communication unit); 1110, a camera unit (image capturing unit); 1113, a camera temperature sensor (temperature detection unit); 1114, an LED light (lighting unit); 1115, a heater (heating unit, removing unit); 1120, a partition plate; 1122, a radiator pipe (heating unit, removing unit); 1140, a thermally insulative partition plate (partition plate); 1200, a camera unit (image capturing unit); 1201, a communication portion (communication unit); and 1203, an LED light (lighting unit).

What is claimed is:

1. A refrigerator comprising:
    a camera mount within the interior of the refrigerator, the camera mount including a detection subject;
    a camera configured to capture an image of an interior of the refrigerator, the camera comprising a sensor configured to:
        determine that the interior of the refrigerator is eligible for image capture based on detecting a proximity of the camera to the detection subject in the camera mount, determining a storage chamber in which the camera is placed from among a plurality of storage chambers based on the detecting, the detecting not based on contact between the camera and the detection subject, and detecting an orientation of the camera and the storage chamber in which the camera is placed, and
        enable the camera to capture the image in response to determining that the interior of the refrigerator is eligible for image capture; and
    a transceiver configured to transmit image information of the interior of the refrigerator captured by the image capturing unit and a result of detection by the detection subject to an external device.

2. The refrigerator according to claim 1, wherein the transceiver is configured to transmit image information of the interior of the refrigerator captured by the camera mounted on the mount to an external device.

3. The refrigerator according to claim 1, further comprising a processor configured to control a timing for capturing an image of the interior of the refrigerator by the camera.

4. The refrigerator according to claim 3, wherein the processor is configured to capture an image of the interior of the refrigerator by the camera at a timing after a door has been closed.

5. The refrigerator according to claim 3, wherein the processor is configured to capture an image of the interior of the refrigerator by the camera at a timing after a predetermined time period has elapsed after a door has been closed.

6. The refrigerator according to claim 3, further comprising a lens heater configured to remove dew condensate from a lens surface of the camera, wherein the processor is configured to capture an image of the interior of the refrigerator by the camera at a timing after the dew condensate has been removed from the lens surface.

7. The refrigerator according to claim 3, wherein the transceiver is configured to receive instructions for capturing an image of the interior of the refrigerator from an external device, and wherein the processor is configured to capture an image of the interior of the refrigerator by the camera at a timing based on the instructions given from the external device.

8. The refrigerator according to claim 3, wherein the processor is further configured to prepare an image capturing environment when capturing an image of the interior of the refrigerator by the camera.

9. The refrigerator according to claim 8, wherein the processor is configured to prepare the image capturing environment by illuminating a light when capturing an image of the interior of the refrigerator by the camera.

10. The refrigerator according of claim 9, wherein the light is provided in plural in the interior of the refrigerator, the processor being configured to prepare the image capturing environment by illuminating one or more lights configured to illuminate a specific location of the interior of the refrigerator.

11. The refrigerator according to claim 9, wherein the processor is configured to prepare the image capturing environment by controlling an illuminance of the light disposed in a location confronting the camera when capturing an image of the interior of the refrigerator by the camera.

12. The refrigerator according to claim 1, wherein the camera is configured to capture an image of the fridge interior using a wide-angle lens.

13. A camera device comprising:
a camera mount within an interior of a refrigerator, the camera mount including a detection subject;
a camera configured to capture an image of the interior of the refrigerator, the camera comprising a sensor configured to:
determine that the interior of the refrigerator is eligible for image capture based on detecting a proximity of the camera to the detection subject in the camera mount, determining a storage chamber in which the camera is placed from among a plurality of storage chambers based on the detecting, the detecting not based on contact between the camera and the detection subject, and detecting an orientation of the camera and the storage chamber in which the camera is placed, and
enable the camera to capture the image in response to determining that the interior of the refrigerator is eligible for image capture; and
a camera-side transceiver configured to communicate a result of detection by the detection subject with an external device.

14. A home appliance network system comprising:
a camera mount within an interior of a storage chamber configured to store goods, the camera mount including a detection subject;
a camera configured to capture an image of the interior of the storage chamber configured to store goods, the camera comprising a detecting portion configured to detect a proximity to the detection subject and a control portion configured to:
determine that the interior of the storage chamber is eligible for image capture based on the detecting the proximity of the camera to the detection subject in the camera mount, determining a storage chamber in which the camera is placed from among a plurality of storage chambers based on the detecting, the detecting not based on contact between the camera and the detection subject, and detecting an orientation of the camera and the storage chamber in which the camera is placed, and
enable the camera to capture the image in response to determining that the interior of the storage chamber is eligible for image capture;
a server comprising a processor, a transceiver, and a memory, the server being configured to communicate with the camera through a communication line, the transceiver being configured to acquire image information of the interior of the storage chamber, and the memory being configured to store image information acquired by the transceiver; and
a communication terminal comprising a display, the communication terminal being configured to communicate with the server through the communication line, and the display being configured to acquire and display image information of the interior of the storage chamber stored in the memory of the server.

* * * * *